(12) United States Patent
Sato et al.

(10) Patent No.: US 7,093,137 B1
(45) Date of Patent: Aug. 15, 2006

(54) DATABASE MANAGEMENT APPARATUS AND ENCRYPTING/DECRYPTING SYSTEM

(75) Inventors: Makoto Sato, Tachikawa (JP); Tsuneharu Takeda, Hamura (JP); Junji Mori, Akishima (JP); Kazuo Kurosawa, Kawasaki (JP)

(73) Assignee: Casio Computer Co., Ltd., Tokyo (JP)

( * ) Notice: Subject to any disclaimer, the term of this patent is extended or adjusted under 35 U.S.C. 154(b) by 801 days.

(21) Appl. No.: 09/670,424

(22) Filed: Sep. 26, 2000

(30) Foreign Application Priority Data

| Sep. 30, 1999 | (JP) | ................... 11-279208 |
| Oct. 19, 1999 | (JP) | ................... 11-296669 |
| Jul. 25, 2000 | (JP) | ................... 2000-224534 |

(51) Int. Cl.
*G06F 11/30* (2006.01)

(52) U.S. Cl. ............................. 713/193; 380/277; 707/6

(58) Field of Classification Search ................ 713/193; 717/193; 707/1–10
See application file for complete search history.

(56) References Cited

U.S. PATENT DOCUMENTS

| 4,605,820 | A | * | 8/1986 | Campbell, Jr. ............... 705/71 |
| 5,295,188 | A | * | 3/1994 | Wilson et al. ................ 380/30 |
| 5,363,449 | A | * | 11/1994 | Bestock ........................ 705/72 |
| 5,677,953 | A | * | 10/1997 | Dolphin ........................ 705/51 |
| 5,740,246 | A | * | 4/1998 | Saito ............................. 705/52 |
| 5,915,025 | A | * | 6/1999 | Taguchi et al. ............... 380/44 |
| 5,963,642 | A | * | 10/1999 | Goldstein ................... 713/193 |
| 6,169,802 | B1 | * | 1/2001 | Lerner et al. ................. 380/44 |

OTHER PUBLICATIONS

Davida, George; Wells, David; Kam, John; A Database Encryption System with Subkeys, ACM Transactions on Database system, vol. 6, No. 2, Jun. 1981, pp. 312-328.*

* cited by examiner

*Primary Examiner*—Ayaz Sheikh
*Assistant Examiner*—Pramila Parthasarathy
(74) *Attorney, Agent, or Firm*—Frishauf, Holtz, Goodman & Chick, P.C.

(57) ABSTRACT

In a database, a frequently retrieved column is encrypted using a common key, and other columns are encrypted using a specific row key. Thus, a retrieving process can be performed at a high speed, and the security can be improved. Then, the row and column of the database are encrypted by assuming the plaintext to be encrypted as a bit string, and performing a binary operation with a random bit string. A random bit string is obtained by sequentially generating multidimensional vectors using a nonlinear function by defining a predetermined bit length as 1 word and a plurality of words as components of the multidimensional vector.

8 Claims, 35 Drawing Sheets

(a)

| number | name | state | weight | height | age | phone |
|---|---|---|---|---|---|---|
| 1 | Jhon | New York | 63 | 130 | 22 | 407-228-6611 |
| 2 | Chris | Florida | 72 | 190 | 21 | 123-456-7890 |
| 3 | Michael | Minnesota | 65 | 163 | 27 | 101-202-3030 |
| 4 | David | Iowa | 63 | 145 | 34 | 523-761-0045 |
| 5 | Mark | New York | 65 | 152 | 30 | 832-962-9001 |
| 6 | Daniel | Iowa | 68 | 170 | 25 | 231-981-9454 |
| 7 | George | Idaho | 69 | 180 | 31 | 561-545-4389 |
| 8 | Henry | Florida | 71 | 165 | 22 | 239-203-9800 |
| 9 | Joe | New Jersey | 66 | 163 | 27 | 239-129-9898 |

ENCRYPTION | COLUMN KEY  
ROW KEY (b)

| number | name | state | weight | height | age | phone |
|---|---|---|---|---|---|---|
| 1 | wJls | noevjolc | qw | ywe | jh | igdltytfhDSk |
| 2 | ddGGa | h*/fDD | lr | Erw | hg | LKtYtDSkoKow |
| 3 | 1jkjl+P | gah{6xpVd | RK | Tyi | tY | hkliiydageQk |
| 4 | 3eK@s | kHHS | kd | DHH | KI | d+fDlKnBerJf |
| 5 | erlN | noevjolc | jD | iOO | Gv | wsdERfvW2Sdf |
| 6 | F>sSlu | kHHS | 8u | Iki | ij | 1xcVlmFmkjpo |
| 7 | (:ld?k | IJHFD | HH | lpa | LK | kjwDkJGvfDoa |
| 8 | rhJKd | h*/fDD | ew | Aii | jh | e419h-ka+qwH |
| 9 | ifd | ASoChijlO- | Df | lky | tY | qLFUiCVkj@kl |

DECRYPTION | COLUMN KEY  
ROW KEY (c)

| number | name | state | weight | height | age | phone |
|---|---|---|---|---|---|---|
| 1 | Jhon | New York | 63 | 130 | 22 | 407-228-6611 |
| 2 | Chris | Florida | 72 | 190 | 21 | 123-456-7890 |
| 3 | Michael | Minnesota | 65 | 163 | 27 | 101-202-3030 |
| 4 | David | Iowa | 63 | 145 | 34 | 523-761-0045 |
| 5 | Mark | New York | 65 | 152 | 30 | 832-962-9001 |
| 6 | Daniel | Iowa | 68 | 170 | 25 | 231-981-9454 |
| 7 | George | Idaho | 69 | 180 | 31 | 561-545-4389 |
| 8 | Henry | Florida | 71 | 165 | 22 | 239-203-9800 |
| 9 | Joe | New Jersey | 66 | 163 | 27 | 239-129-9898 |

FIG.5

COLUMN KEY

| number | name | state | weight | height | age | phone |
|--------|------|-------|--------|--------|-----|-------|
| NONE | "apple" | "orange" | ROW KEY | ROW KEY | "lemon" | ROW KEY |

ROW KEY

| number | |
|--------|---|
| 1 | "tiger" |
| 2 | "dog" |
| 3 | "cat" |
| 4 | "mouse" |
| 5 | "elephant" |
| 6 | "cow" |
| 7 | "pig" |
| 8 | "rabbit" |
| 9 | "lion" |

| number | name | state | weight | height | age | phone |
|---|---|---|---|---|---|---|
| 1 | Jhon | New York | 63 | 130 | 22 | 407-228-6611 |
| 2 | Chris | Florida | 72 | 190 | 21 | 123-456-7890 |
| 3 | Michael | Minnesota | 65 | 163 | 27 | 101-202-3030 |
| 4 | David | Iowa | 63 | 145 | 34 | 523-761-0045 |
| 5 | Mark | New York | 65 | 152 | 30 | 832-962-9001 |
| 6 | Daniel | Iowa | 68 | 170 | 25 | 231-981-9454 |
| 7 | George | Idaho | 69 | 180 | 31 | 561-545-4389 |
| 8 | Henry | Florida | 71 | 165 | 22 | 239-203-9800 |
| 9 | Joe | New Jersey | 66 | 163 | 27 | 239-129-9898 |

ENCRYPTION | COMPOSITE KEY (b)

| number | name | state | weight | height | age | phone |
|---|---|---|---|---|---|---|
| 1 | wJls | noevjolc | xo | qwe | jh | dfghaJ;lkqlu |
| 2 | ddGGa | h*/fDD | wi | kIA | hg | qwTyIBnDFiKj |
| 3 | 1jkjl+P | gah{6xpVd | hi | IKJ | tY | DafgiqIkimD- |
| 4 | 3eK@s | kHHS | s? | SGA | KI | hi*khaTygfXd |
| 5 | erIN | noevjolc | d- | ASD | Gv | 8uyDBmAkolka |
| 6 | f>sSlu | kHHS | l* | qoK | ij | jhtvbnMKJASW |
| 7 | (:ld?k | IJHFD | df | sLL | LK | IQwSRyuiokjq |
| 8 | rhJKd | h*/fDD | Ws | tyH | of | Dfha*kaqil |
| 9 | ifd | ASoChijlO- | qo | H2a | Ga | IkjHYAGoiuq |

DECRYPTION | COMPOSITE KEY (c)

| number | name | state | weight | height | age | phone |
|---|---|---|---|---|---|---|
| 1 | Jhon | New York | 63 | 130 | 22 | 407-228-6611 |
| 2 | Chris | Florida | 72 | 190 | 21 | 123-456-7890 |
| 3 | Michael | Minnesota | 65 | 163 | 27 | 101-202-3030 |
| 4 | David | Iowa | 63 | 145 | 34 | 523-761-0045 |
| 5 | Mark | New York | 65 | 152 | 30 | 832-962-9001 |
| 6 | Daniel | Iowa | 68 | 170 | 25 | 231-981-9454 |
| 7 | George | Idaho | 69 | 180 | 31 | 561-545-4389 |
| 8 | Henry | Florida | 71 | 165 | 22 | 239-203-9800 |
| 9 | Joe | New Jersey | 66 | 163 | 27 | 239-129-9898 |

FIG.7

COMPOSITE KEY

| number | name | state | weight | height | age | phone |
|---|---|---|---|---|---|---|
| NONE | "apple" | "orange" | "bananatiger" | "lycheetiger" | "lemon" | "apricottiger" |
| NONE | "apple" | "orange" | "bananadog" | "lycheedog" | "lemon" | "apricotdog" |
| NONE | "apple" | "orange" | "bananacat" | "lycheecat" | "lemon" | "apricotcat" |
| NONE | "apple" | "orange" | "bananamouse" | "lycheemouse" | "lemon" | "apricotmouse" |
| NONE | "apple" | "orange" | "bananaelephant" | "lycheeelephant" | "lemon" | "apricotelephant" |
| NONE | "apple" | "orange" | "bananacow" | "lycheecow" | "lemon" | "apricotcow" |
| NONE | "apple" | "orange" | "bananapig" | "lycheepig" | "lemon" | "apricotpig" |
| NONE | "apple" | "orange" | "bananarabbit" | "lycheerabbit" | "lemon" | "apricotrabbit" |
| NONE | "apple" | "orange" | "bananalion" | "lycheelion" | "lemon" | "apricotlion" |

COLUMN KEY

| number | name | state | weight | height | age | phone |
|---|---|---|---|---|---|---|
| NONE | "apple" | "orange" | "banana"+ROW KEY | "lychee"+ROW KEY | "lemon" | "apricot"+ROW KEY |

ROW KEY

| number | |
|---|---|
| 1 | "tiger" |
| 2 | "dog" |
| 3 | "cat" |
| 4 | "mouse" |
| 5 | "elephant" |
| 6 | "cow" |
| 7 | "pig" |
| 8 | "rabbit" |
| 9 | "lion" |

FIG.8

BASIC KEY PARAMETER TABLE

| POSITION OF BUTTON | BASIC PARAMETER VALUE |
|---|---|
| 1 | 5 |
| 2 | 7 |
| 3 | 9 |
| 4 | 11 |
| 5 | 13 |
| 6 | 15 |
| 7 | 17 |
| 8 | 19 |
| 9 | 21 |
| 10 | 23 |
| 11 | 25 |
| 12 | 27 |
| 13 | 29 |
| 14 | 31 |
| 15 | 33 |
| 16 | 35 |

—416a

KEY SPECIFICATION TABLE

| COLUMN NAME | COLUMN NUMBER | ENCRYPTED KEY |
|---|---|---|
| (code) | 1 | 0 |
| (name) | 2 | ROW KEY |
| (state) | 3 | COLUMN KEY |
| (age) | 4 | COLUMN KEY |
| (phone) | 5 | ROW KEY |

416c

(a)

| number | name | state | age | phone |
|---|---|---|---|---|
| 1001 | Jhon | New York | 22 | 407-228-6611 |
| 1002 | Chris | Florida | 21 | 123-456-7890 |
| 1003 | Michael | Minnesota | 27 | 101-202-3030 |
| 1004 | David | Iowa | 34 | 523-761-0045 |
| 1005 | Mark | New York | 30 | 832-962-9001 |
| 1006 | Daniel | Iowa | 25 | 231-981-9454 |
| 1007 | George | Idaho | 31 | 561-545-4389 |
| 1008 | Henry | Florida | 22 | 239-203-9800 |
| 1009 | Joe | New Jersey | 27 | 239-129-9898 |

ENCRYPTION | COLUMN KEY ROW KEY

(b)

| number | name | state | age | phone | line key |
|---|---|---|---|---|---|
| 1001 | wJls | noevjolc | jh | igdltytfhDSk | 9658 |
| 1002 | ddGGa | h*/fDD | hg | LKtYtDSkoKow | 9143 |
| 1003 | 1jkjl+P | gah{6xpVd | tY | hkliiydageQk | 8278 |
| 1004 | 3eK@s | kHHS | Kl | d+fDIKnBerJf | 4358 |
| 1005 | erlN | noevjolc | Gv | wsdERfvW2Sdf | 5784 |
| 1006 | f>sSlu | kHHS | ij | 1xcVlmFmkjpo | 9743 |
| 1007 | (:ld?k | IJHFD | LK | kjwDkJGvfDoa | 3935 |
| 1008 | rhJKd | h*/fDD | jh | e419h-ka+qwH | 7412 |
| 1009 | ifd | ASoChijlO- | tY | qLFUiCVkj@kl | 9593 |

DECRYPTION | COLUMN KEY ROW KEY

(c)

| number | name | state | age | phone |
|---|---|---|---|---|
| 1001 | Jhon | New York | 22 | 407-228-6611 |
| 1002 | Chris | Florida | 21 | 123-456-7890 |
| 1003 | Michael | Minnesota | 27 | 101-202-3030 |
| 1004 | David | Iowa | 34 | 523-761-0045 |
| 1005 | Mark | New York | 30 | 832-962-9001 |
| 1006 | Daniel | Iowa | 25 | 231-981-9454 |
| 1007 | George | Idaho | 31 | 561-545-4389 |
| 1008 | Henry | Florida | 22 | 239-203-9800 |
| 1009 | Joe | New Jersey | 27 | 239-129-9898 |

FIG.20

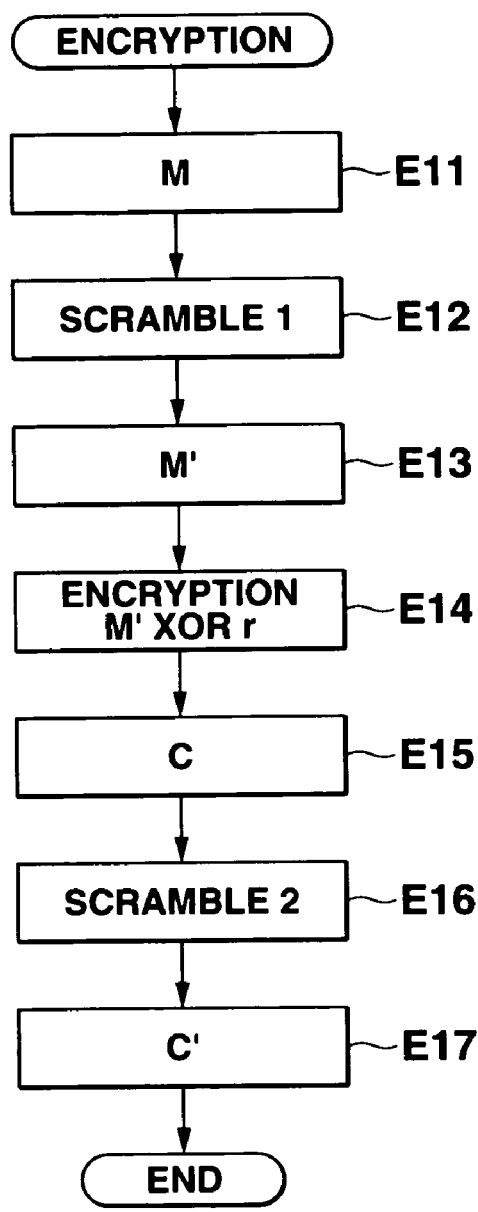 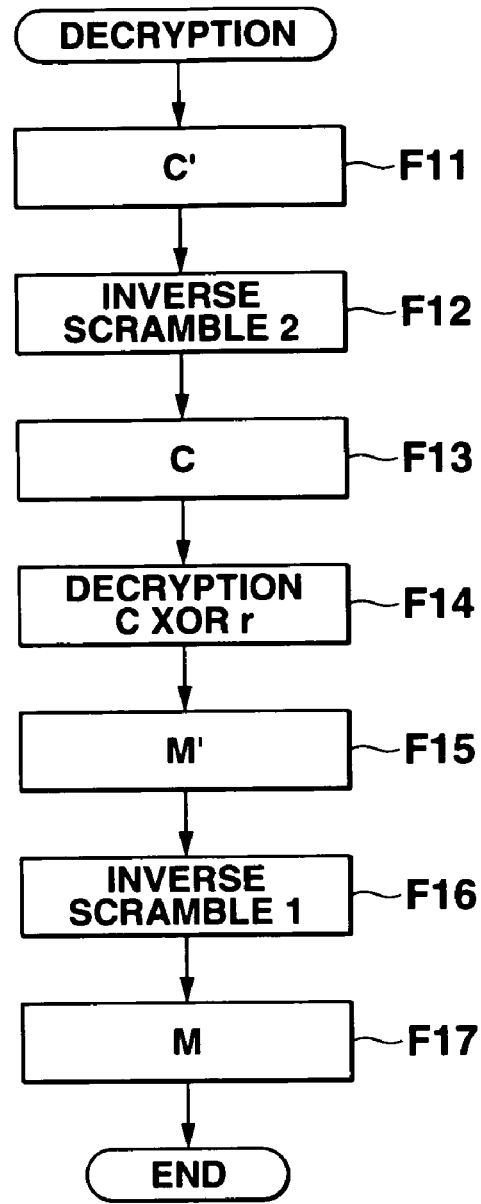
FIG.28A  FIG.28B

DATABASE MANAGEMENT APPARATUS AND ENCRYPTING/DECRYPTING SYSTEM

BACKGROUND OF THE INVENTION

1. Field of the Invention

The present invention relates to an encryption/decryption system used in a system for performing encrypted data communications, and to a database management apparatus for encrypting and managing a database.

2. Description of the Related Art

In an information system such as a computer and a network used by a large number of general users, there is a serious problem that some malicious users illegally access and amend information. Therefore, the encryption technology has been widely adopted as an effective countermeasure. A well-known encryption technology is disclosed in detail by the following document.

'Communications of the ACM Vol. 21, No.2 (1978) P120. A Method for Obtaining Digital Signatures and Public Key Crypto systems: R. L. Rivest, A. Shamir, and L. Adleman, MIT Laboratory for Computer Science and Department of Mathematics'

The encrypting method published in this document is generally accepted as a considerably reliable method, and is referred to as an RSA (Rivest-Sharmir-Adleman) method. A system derived from this RSA method has been developed as an authentication system for a signature used in an electronic trading system, and has been put to practical use.

The RSA method is a public key (asymmetric) encryption system based on the difficulty in factorization in prime numbers, and obtains as ciphertext a remainder obtained by dividing a result of raised data by a large integer. The feature of the RSA method is that it is difficult to find two original primes (p and q) from the product of the two original primes. Even if the product of the two primes can be detected, it is very difficult to detect the p and the q, or estimate the decoding operation. The above mentioned RSA method is practical in a sense, and highly reliable when the bit length of data as an encryption key is long enough. To guarantee the reliability, it is normal to use encryption key data of 256 bits in length. However, it is not long enough in some cases, and the necessity of an encryption key of 512 or 1024 bits in data length is actually discussed. However, since the data length is practically limited by the operation precision and operation speed of a computer, it is not efficient to have a long bit.

That is, there has been the problem with the RSA method and the encrypting method derived from the RSA method that the reliability of these methods is limited by the performance of a computer. There also is the problem that the methods require a considerable change in the reliability test, etc. of the authentication system based on the change in bit length of an encryption key.

In addition, since the database management apparatus has to encrypt and store the database which is managed therein to guarantee the security of the database.

To improve the security, a more complicated encrypting process can be performed, but it also requires a long time to perform operations.

A database contains a large volume of data. In a data retrieving process, data relating to a specific item and matching given conditions is selected from the large volume of data, and a record (row data) containing an item data matching the condition is output. Therefore, in a data retrieval system for processing a large volume of data, a prolonged operation time lowers the performance of the system.

As described above, a database containing a confidential data is required to guarantee security, and an encrypting process to improve the security has the problem that the process can lower the availability of the database.

Conventionally, when a database is encrypted, it is normal that the entire target file is encrypted using a fixed encryption key generated by, for example, a password, etc.

However, as described above, since an encrypting process has been performed using a fixed encryption key according to the conventional system, the security level of each data item is averaged. In addition, when there are a plurality of items containing the same data, the same encryption results are output, thereby causing the possibility that the encryption key can be decrypted.

SUMMARY OF THE INVENTION

The present invention aims at providing an encryption/decryption apparatus capable of performing an encrypting process without a precision operation result and realizing a general purpose encrypting/decrypting process which is highly reliable and easily adds and changes an application.

Another object of the present invention is to provide a database management apparatus capable of guaranteeing the security of a database, and quickly retrieving data.

A further object of the present invention is to provide a database management apparatus capable of encrypting a specific data item in a database with the security improved more than that of another data item. That is, the database management apparatus according to the present invention encrypts data of a column item used in a retrieving process using a column key commonly used for the column item, and encrypts data of other column items using a row key specific to each row.

The encryption device according to the present invention includes: a plaintext data obtaining unit for obtaining plaintext data to be encrypted; a vector generation unit for sequentially generating vectors defined in a closed area of an $n(n \geq 1)$-dimensional space; and a logical operation unit for generating encrypted data with a logical operation performed on the plaintext data obtained by the plaintext data obtaining unit and the vector element generated by the vector generation unit in bit units. On the other hand, a decryption device according to the present invention also includes the vector generation unit; and an inverse logical operation unit for decoding the plaintext data by an inverse operation of the logical operation using the ciphertext data.

The database management apparatus uses the encryption device according to the present invention in a data encrypting process, and uses the decryption device according to the present invention when ciphertext data is decrypted into plaintext data.

The encryption system according to the present invention includes: a vector generation unit for generating a vector $r_j$ using each element of a vector defined in a closed area of the $n(n \geq 1)$-dimensional space, and an angle $\Omega_n$ determined by a parameter set P in such a way that each of the vectors $r_j (j \geq 0)$ sequentially generated using a non-linear function containing at least the n-dimensional rotation matrix $R_n(\Omega_n)$ for rotation of the vector cannot match each other in the n-dimensional space; and a binary operation unit for generating encrypted data using a binary operation of plaintext data and the element of the vector $r_j$ generated by the vector generation unit.

The decryption system according to the present invention includes: a vector generation unit for generating a vector $r_j$ using each element of a vector defined in a closed area of the n(n≧1)-dimensional space, and an angle $\Omega_n$ determined by a parameter set P in such a way that each of the vectors $r_j(j≧0)$ sequentially generated using a non-linear function containing at least the n-dimensional rotation matrix $R_n(\Omega_n)$ for rotation of the vector cannot match each other in the n-dimensional space; and an inverse binary operation unit for receiving encrypted data generated in a binary operation of plaintext data and the element of a vector $r_j$ generated in a method similar to that of the vector generation unit, and decrypting the plaintext data in an inverse binary operation corresponding to an inverse operation of the binary operation using the vector $r_j$ generated by the vector generation unit and the encrypted data.

With the above mentioned configuration, the vectors defined in the closed area of the n(n≧1)-dimensional space are sequentially generated, and ciphertext data is generated in a logical operation of plaintext data to be encrypted and the element of the vector.

Thus, by encrypting plaintext data using elements of multidimensional vector, an encrypting process can be performed without a precision operation such as the RSA method, etc., and a reliable general-purpose encrypting/decrypting process capable of easily adding and changing an application can be realized.

The database management apparatus according to the present invention includes: an encryption unit for encrypting data of a predetermined column item of a database using a column key common among the column items, and encrypting data of other column items using a column key specific to each row; and a storage unit for storing a database encrypted by the encryption unit.

With the configuration, the security can be improved by assigning a different key to each row when a database is encrypted. When a retrieving process is performed, a high-speed retrieving process can be realized by encrypting data input for retrieval using a column key common among the predetermined column items, and comparing the item data of the encrypted retrieving data and the item data of the encrypted database.

In addition, the security can be furthermore reinforced by encrypting the data of the column items other than the column item used in the retrieving process using the combination of the row key specific to each row and the column key common among the column items.

Furthermore, a database can be stored in a separate place to generate a database system so that a request for a retrieving process can be issued from a separate information terminal through a network. In this case, the data of a predetermined column item (column item used in a retrieving process) is encrypted using a column key common among the column items, and the data of other column items is encrypted using a row key specific to each row. When a request to retrieve a database is issued from another information terminal, the retrieving data is encrypted using a column key common among the column items, and the encrypted retrieving data is transmitted through a network. By receiving the retrieving data, the process of retrieving the encrypted database can be performed, and the encrypted data obtained as a retrieval result is returned to the information terminal through the network. Therefore, since data is transmitted constantly in an encrypted state, the database security can be guaranteed.

When a database is encrypted, the database management apparatus according to the present invention encrypts the data of the column items used in a retrieving process using a column key common among the column items, encrypts the data of other column items requiring high security using a row key specific to each row with the row key further encrypted using another key common among the rows.

Practically, the database management apparatus according to the present invention includes: a first encryption unit for encrypting data of predetermined column items of a database using a column key common among the column items, and encrypting data of other column items using a row key specific to each row; a second encryption unit for encrypting the row key used in encrypting the data of other column items in the database encrypted by the first encryption unit using another key common among the rows; and a storage unit for storing the database encrypted by the first encryption unit together with the row key encrypted by the second encryption unit.

With the configuration, when a database is encrypted, the data of the column items other than a predetermined column item used in a retrieving process can be encrypted using a different key for each row so that different values can be obtained as encryption results of the data having the same values in the column items. Furthermore, higher security can be realized by complicating the decryption of the key by re-encrypting the key (row key), which is used in encrypting the column items, using another key.

In addition, when the row key is generated using a row number assigned to each row of the database and a random number, which makes the encryption of the key furthermore difficult, the security can be successfully reinforced.

Furthermore, a database system can be configured by a first terminal device for managing a database, and a second terminal device for searching the database independent of the first terminal device.

In the database, the first terminal device encrypts the database, stores the encrypted database in a storage medium and distributes the storage medium, and the second terminal device retrieves data in the stored encrypted database stored in the distributed storage medium, decrypts the data obtained as the retrieval result, and displays the resultant data. In this case, the data of the predetermined column item of the database is encrypted using a column key common among the column items, the data of other column items is encrypted using a row key specific to each row, and the row key is encrypted using another key common among the rows, thereby storing the database in a storage medium and distributing the storage medium with the security successfully guaranteed.

BRIEF DESCRIPTION OF THE DRAWINGS

FIG. 5 shows the configuration of the database according to the first embodiment of the database management apparatus of the present invention; FIG. 5(a) shows the state before encryption; FIG. 5(b) shows the state after encryption; and FIG. 5(c) shows the state after decryption;

FIG. 6 shows the configuration of the column key and the row key according to the first embodiment of the database management apparatus;

FIG. 7 shows the configuration of the database according to the second embodiment of the database management apparatus; FIG. 7(a) shows the state before encryption; FIG. 7(b) shows the state after encryption of the present invention; and FIG. 7(c) shows the state after decryption;

FIG. 8 shows the configuration of the composite key according to the second embodiment of the database management apparatus of the present invention;

FIG. 20 shows the configuration of the database in the database management apparatus; FIG. 20(a) shows the state before encryption; FIG. 20(b) shows the state after encryption of the present invention; and FIG. 20(c) shows the state after decryption;

FIGS. 28A and 28B are flowcharts of the operations of the encrypting and decrypting processes in the embodiment;

DESCRIPTION OF THE PREFERRED EMBODIMENTS

An embodiment of the present invention is described by referring to the attached drawings.

Figure 1:
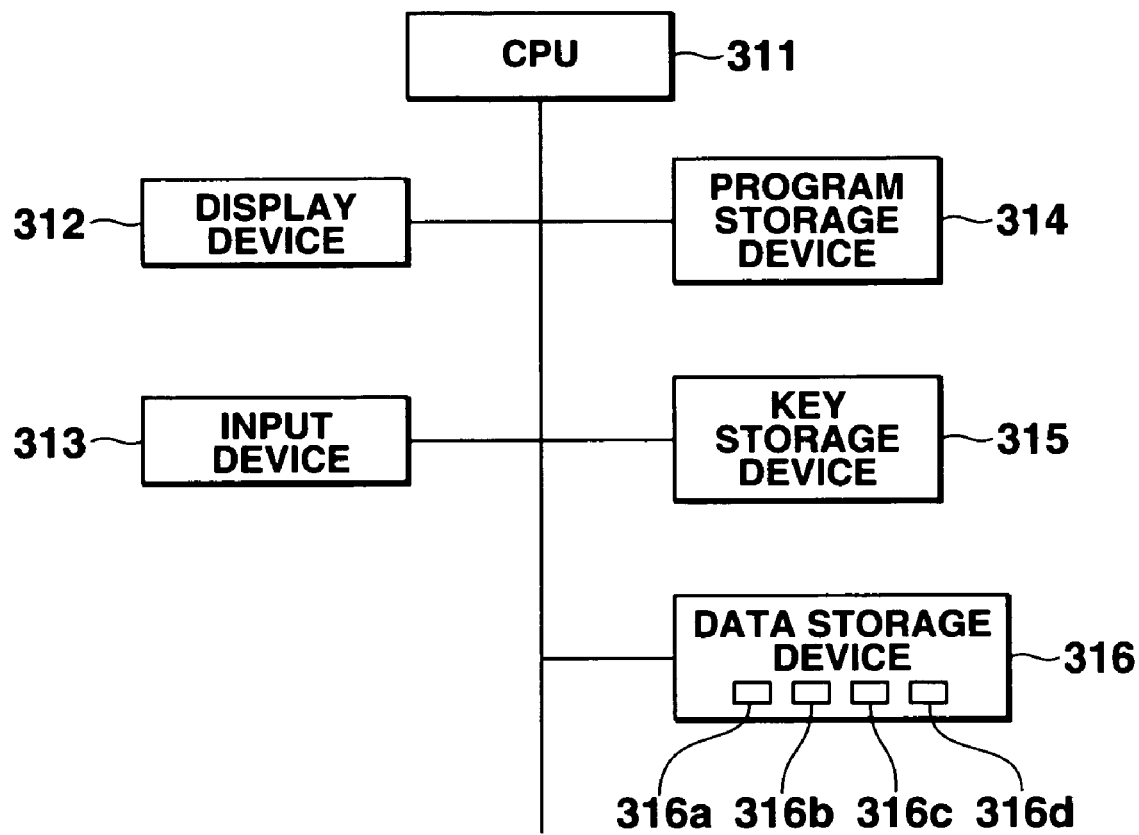
FIG. 1 shows the configuration of the database management apparatus according to the first embodiment of the present invention.

FIG. 1 shows the configuration of the database management apparatus according to the present invention.

The apparatus includes a database in a matrix form in rows and columns, and has the functions of encrypting and managing the database, encrypting input retrieving data, and searching the database according to the encrypted retrieving data. It reads a program stored in a storage medium such as a magnetic disk, etc., and is realized by a computer whose operation is controlled by the program.

As shown in FIG. 1, the apparatus comprises a CPU 311, a display device 312, an input device 313, a program storage device 314, a key storage device 315, and a data storage device 316.

Figure 2:
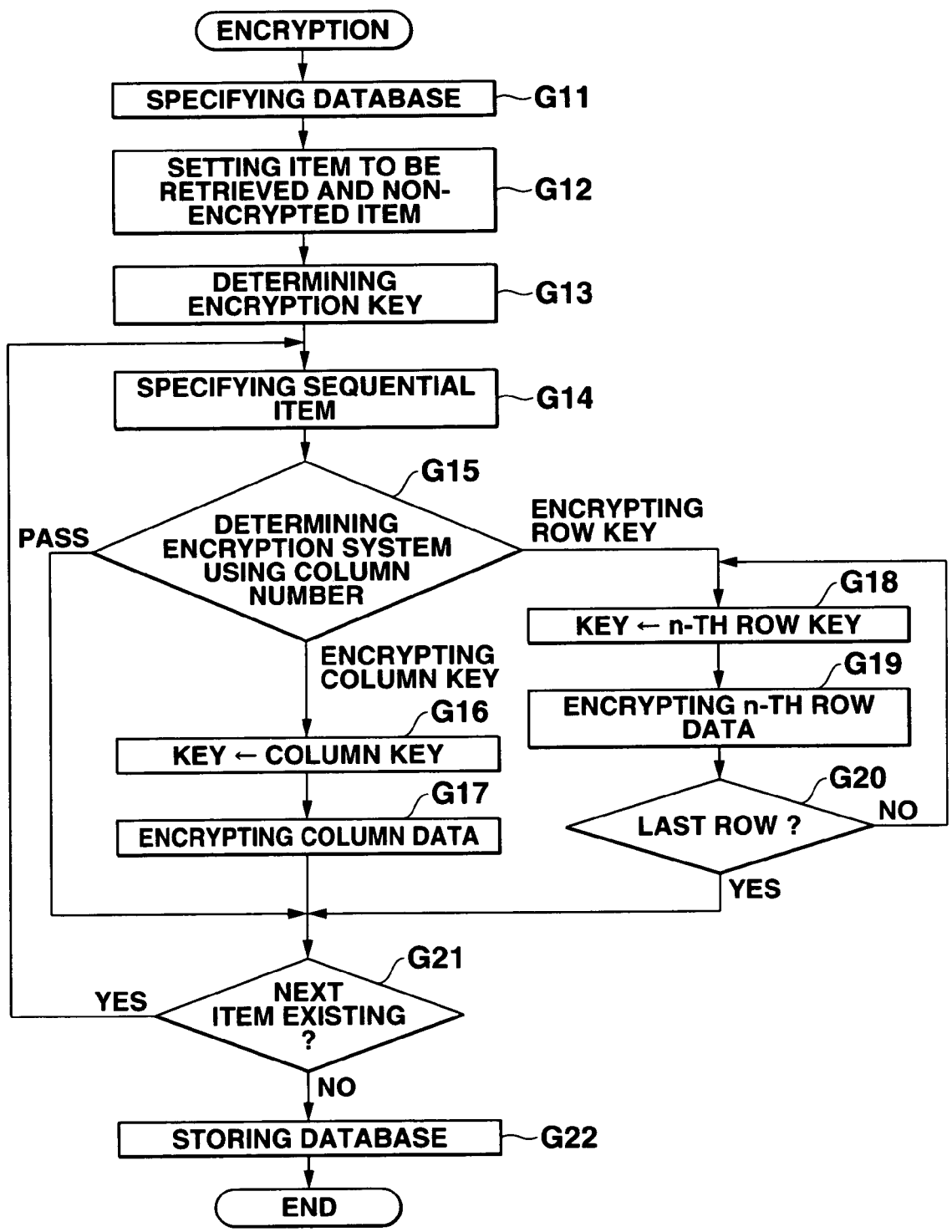
FIG. 2 is a flowchart of the operations of the database encrypting process performed by the database management apparatus.

The CPU 311 controls the entire apparatus, reads the program stored in the program storage device 314, and performs various processes according to the program. According to the present embodiment, the CPU 311 performs a database encrypting process as shown in FIG. 2, and a database searching process as shown in FIGS. 3A through 4B.

The display device 312 is a device for displaying data. For example, an LCD (liquid crystal display), a CRT (cathode-ray tube), etc. are used. The input device 313 is a device for inputting data, and can be, for example, a keyboard, a mouse, etc.

The program storage device 314 comprises, for example, ROM, RAM, etc. and stores a necessary program for the apparatus. The apparatus requires a program such as a database management program, an encryption program, etc.

The program storage device 314 can comprise, in addition to semiconductor memory, a magnetic and an optical storage medium. The storage medium includes a portable medium such as CD-ROM, etc. and a fixed medium such as a hard disk, etc. All or a part of the program stored in the storage medium can be received from a transmission control unit of a server and a client through a transmission medium such as a network circuit, etc. The storage medium can be a storage medium of a server provided in a network. Furthermore, the program can be designed to be installed in the appliances of a server and a client after being transmitted to the server and the client through a transmission medium such as a network circuit, etc.

The key storage device 315 comprises, for example, RAM, etc. and stores a key (a row key and a column key) used when a database is encrypted.

The data storage device 316 is a device for storing various data necessary for the apparatus, and comprises, for example, RAM or an external storage device such as a magnetic disk device, etc. The data storage device 316 is provided with a database storage area 316*a* for storing a database, an encryption setting information storage area 316*b* for storing information (an item to be retrieved, a non-encrypted item, etc.) set by an operator when a database is stored, a retrieval setting information storage area 316*c* for storing information (a target column item, a retrieval character string, etc.) set by an operator when a database is searched, a comparison character string storage area 316*d* for storing a comparison character string when a database is searched, etc.

Before describing the operations of the apparatus, the database encrypting method used by the apparatus is first described below.

If a different key is used for each row (record) when a database is encrypted, it becomes more difficult to decrypt a key, thereby improving the security. However, since the encrypted data has to be decrypted using a key for each row or the input retrieving data (keyword) has to be encrypted using a key for each row when a database is searched, it takes a long time to obtain a retrieval result. On the other hand, if a database is encrypted using a different key for each column, retrieving data is encrypted using only a key corresponding to a column item to be retrieved, thereby searching a database at a high speed. However, when there are the same data in the same column, the same encryption results are output, which may allow the key to be decrypted.

The feature of the present invention resides in that the data of a column item frequently used in a retrieving process is encrypted using a common column key, and the data of other column items is encrypted by assigning a different key to each row when a database is encrypted. That is, the security can be improved by using a different key for each row, and a high-speed retrieving process can be realized by encrypting the data input to a retrieving item using a column key, and comparing the encryption result with the encrypted data in the database.

FIG. 5 shows the configuration of the database according to the first embodiment of the database management apparatus of the present invention; FIG. 5(*a*) shows the state before encryption; FIG. 5(*b*) shows the state after encryption; and FIG. 5(*c*) shows the state after decryption. FIG. 6 shows the configuration of the column key and the row key according to the first embodiment of the database management apparatus.

As shown in FIG. 5(*a*), the apparatus has a matrix in rows and columns. FIG. 5(*a*) shows personal data as a database. The database has a record comprising the items of: 'number', 'name', 'weight', 'height', 'age', and 'phone'.

The database is encrypted using a column key and a row key. That is, when a column item frequently used in a retrieving process comprises 'name', 'state', and 'age', the data of each row of the column item is encrypted using a column key common among column items such as the 'apple', 'orange', 'lemon', etc. as shown in FIG. 6, and the data of each row of other column items 'weight', 'height', and 'phone' is encrypted using a key specific to each row.

It is assumed that the row of the 'number' is not encrypted. As a row key, 'tiger', 'dog', 'cat', 'mouse', 'elephant', 'cow', 'pig', 'rabbit', 'lion', etc. are used.

These column keys and row keys determine a predetermined nonlinear function, and an encrypting (decrypting) process is performed by a binary operation (inverse binary operation) of the function and the vector mathematically generated using the function. In this case, the encryption/decryption system according to the present invention can be used as described below.

FIG. 5(*b*) shows the result of encrypting the database shown in FIG. 5(*a*) using the column key and the row key. The database storage area 316*a* of the data storage device 316 stores the database in the state as shown in FIG. 5(*b*).

When the database is searched, the retrieving data is encrypted using a column key corresponding to the column item used in the retrieval, and then a retrieving process is performed. For example, when the data such as 'Florida' in the 'State' is to be retrieved, the 'Florida' input as a retrieving data is encrypted using the column key 'apple' of the 'state', thereby obtaining 'h*/fDD'. The data such as the 'h*/fDD' is retrieved from each row of the column of the 'state'. Thus, it is determined that the data corresponding to the 'number2' and 'number8' exist.

In addition, when the encrypted database is restored to the original state, the column key and the row key used in the encrypting process are used. When the data is decrypted using the column key and the row key used in the database encrypting process as shown in FIG. 5(*b*), the original data can be obtained as shown in FIG. 5(*c*).

Described below are the operations of the apparatus.

The process (a) of encrypting a database, and the process (b) of retrieving a database are separately described below. The program for realizing each function shown in the flowchart in FIGS. 2 through 4 is stored in a storage medium of the program storage device 314 in program code readable by the CPU. The program can also be transmitted through a transmission medium such as a network circuit.

(a) When a database is encrypted:

FIG. 2 is a flowchart of the operations of the database encrypting process performed in the apparatus. FIG. 5(*a*) shows the state of the non-encrypted database stored in the database storage area 316*a* of the data storage device 316.

First, on the database encryption setting screen, a database to be encrypted is specified (step G11).

Then, in the column items provided in the database, a column item used in a retrieving process and a column item not to be encrypted are set (step G12). In the example shown in FIG. 20(*a*), the column items used in a retrieving process are 'name', 'state', and 'age', and the column item not to be encrypted is 'number'. The set information is stored in the encryption setting information storage area 316*b* of the data storage device 316.

Then, the row key and the column key used when the database is encrypted are determined (step G13). The information about the determined row key and column key is stored in the key storage device 315.

When the column items in the database are sequentially specified after the above mentioned setting operations (step G14), the encryption system for the column item is determined according to the setting information (step G15). In this case, since the column item of the 'number' in the database is set as a non-encrypted item, no process is performed. That is, the item of the 'number' is unchanged as the original data.

When the specified column item is set as a column item to be used in a retrieving process, a common column key for the column item stored in the key storage device 315 is read (steps G15 and G16), and the data in each row of the column item is encrypted using the column key (step G17). That is, the data of each row of each item of the 'name', 'state', and 'age' of the database is encrypted using a key specific to each column such as 'apple', 'orange', 'lemon', etc. as shown in FIG. 6.

If the specified column item is not set as a column item for use in a retrieving process, that is, the other column items, then a row key corresponding to each row stored in the key storage device 315 is read (steps G15 through G18), and the data of each row of the column item is encrypted using a specific row key (steps G19 and G20). That is, as for the data of each item of the 'state', 'weight', and 'height' of the database, the data in row 1, 2, 3, 4, 5, 6, 7, 8, and 9 is encrypted respectively using the corresponding row keys 'tiger', 'dog', 'cat', 'mouse', 'elephant', 'cow', 'pig', 'rabbit', and 'lion' as shown in FIG. 6.

Thus, the encrypting process is repeatedly performed for each column item of the database. When the data encrypting process is completed on each row of all column items, the encrypted database is overwritten in the database storage area 316a of the data storage device 316 (step G22). FIG. 5(b) shows this state.

Figure 3A:
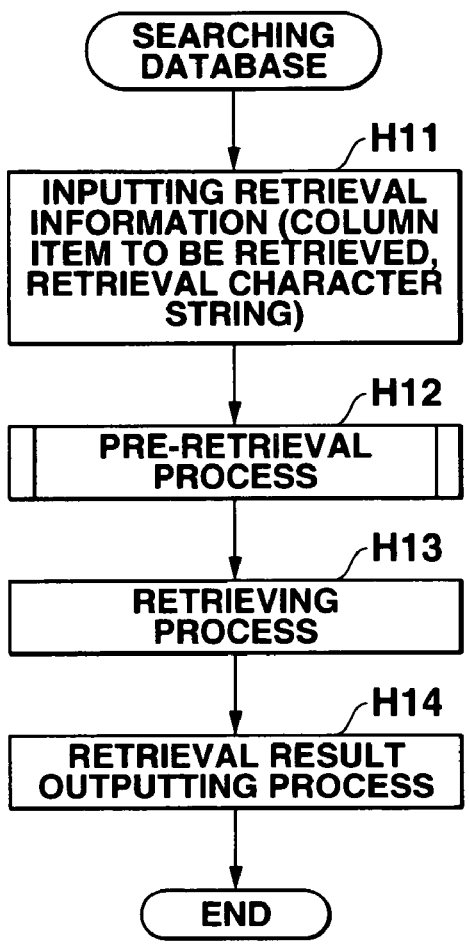
FIGS. 3A and 3B are flowcharts of the operations of the database searching process performed by the database management apparatus.
Figure 3B:
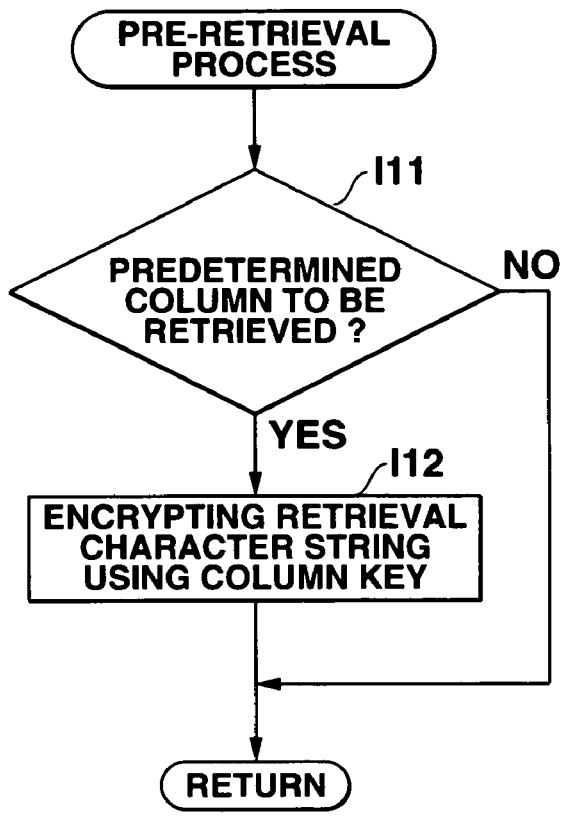

(b) When a database is retrieved:

FIGS. 3A and 3B are flowcharts of the operations of the database retrieving process performed by the apparatus.

Assume that a database is encrypted in the encrypting process described above in (a) above, and stored in the data storage device 316.

First, as shown in the flowchart shown in FIG. 3A, the database retrieval setting screen, retrieval information is input (step H11). Inputting retrieval information refers to inputting an item category title (hereinafter referred to as "column item") to be retrieved (that is, an item category title referring to a category of items to be retrieved), and a retrieving character string (keyword). The input information is stored in the retrieval setting information storage area 316c of the data storage device 316. When the retrieval information is input through the input device 313, a pre-retrieval process is performed (step H12).

In this pre-retrieval process, as shown in the flowchart shown in FIG. 3B, it is determined whether or not the column item input to be retrieved is a pre-retrieval process column item (step I11). If yes (YES in step I11), then the retrieving character string is encrypted using a common column key for the column item (step I12).

A predetermined column item refers to an item to be retrieved (item used in a retrieving process) set when the database is encrypted, and practically corresponds to each of the items 'name', 'state', and 'age'. The information relating to the item to be retrieved is stored in the encryption setting information storage area 316b of the data storage device 316. Therefore, in step I11, it is determined whether or not an input column item is a predetermined column item by referring to the encryption setting information storage area 316b. A common column key item to the column items is stored in the key storage device 315. Therefore, in step I12, a column key corresponding to the column item is read from the key storage device 315, and a retrieving character string is encrypted. For example, if the specified item is 'state', then a retrieving character string can be encrypted using the column key such as 'orange', etc.

If an input column item to be retrieved is not a predetermined column item (NO in step I11), then the retrieving character string is not encrypted.

After the above mentioned pre-retrieval process, the database is searched (refer to FIG. 4A)(step H13), and the data obtained as a retrieval result is displayed on the display device 312 (step H14).

Figure 4A:
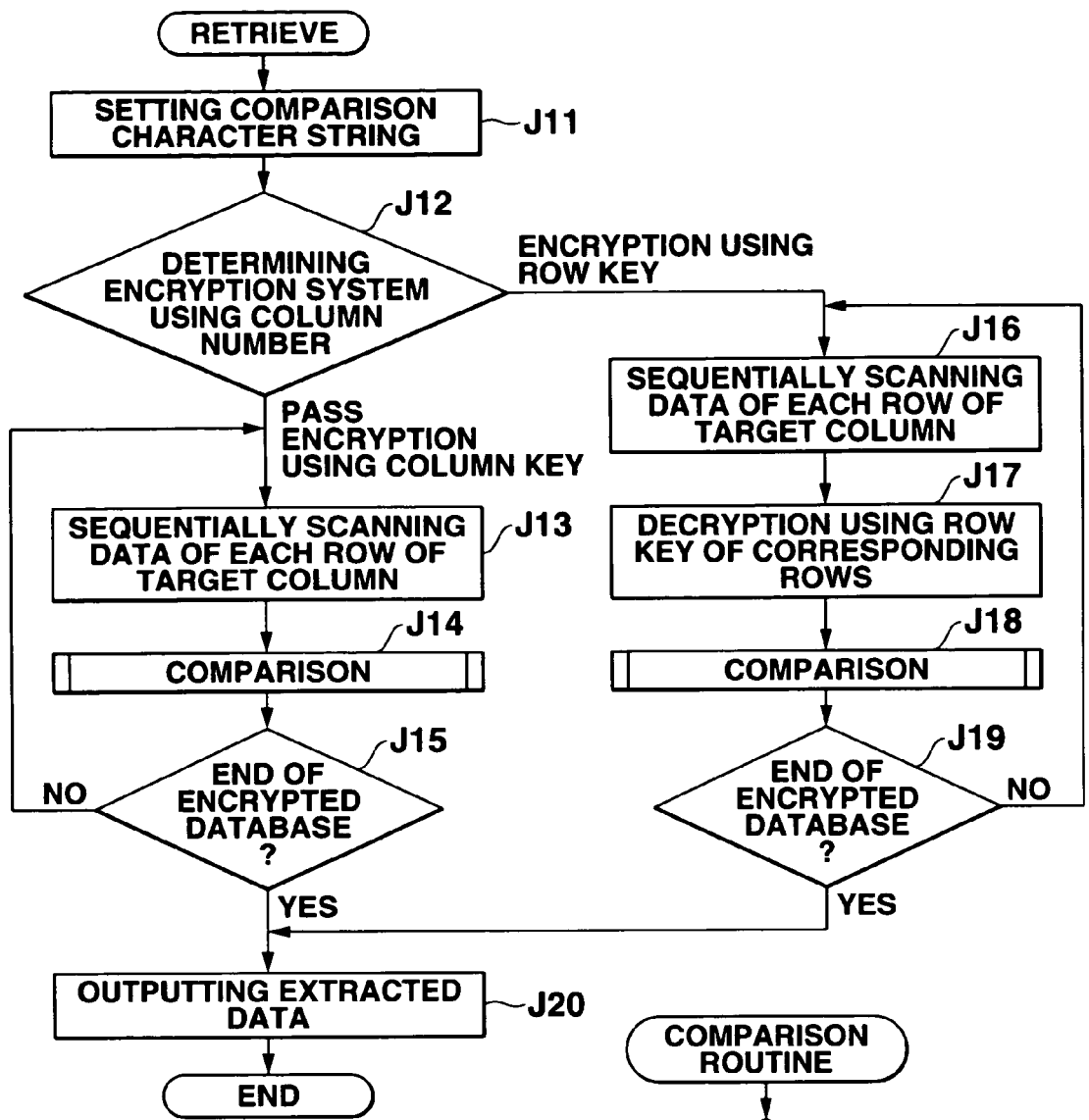
FIGS. 4A and 4B are flowcharts of the practical operations of the retrieving process in step H13 shown in FIG. 18A.
Figure 4B:
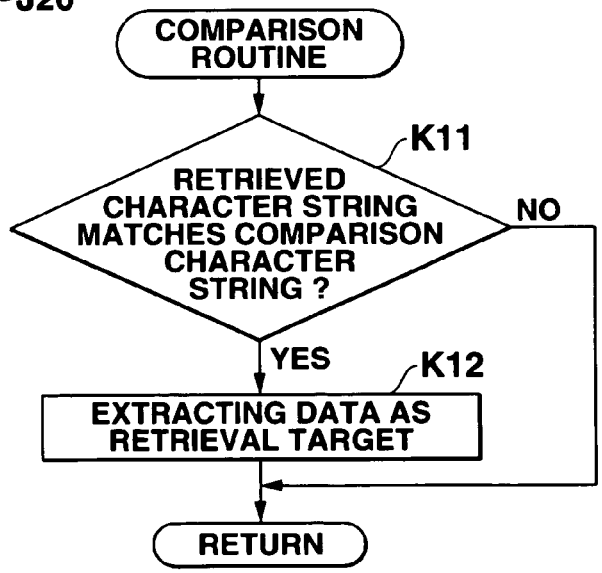

FIGS. 4A and 4B show a database searching process.

FIGS. 4A and 4B are flowcharts of the practical operations of the retrieving process in step H13.

First, as shown in the flowchart shown in FIG. 4A, a retrieving character string is set in the comparison character string storage area 316d of the data storage device 316 as a character string to be compared with the database (step J11). In this case, as described above, if a column item input to be retrieved is a predetermined column item 'name', 'state', and 'age'), then the retrieving character string is encrypted using the column key corresponding to the column item, and set in the comparison character string storage area 316d in the pre-retrieval process. If the input item is not a predetermined column item, it is not encrypted, remains unchanged, and set in the comparison character string storage area 316d.

Then, the encryption system is determined by a column number of the encrypted database stored in the database storage area 316a of the data storage device 316 (step J12). Thus, when an item to be retrieved is a predetermined column item encrypted using a column key, the data in each row of the target column is sequentially scanned (steps J12 and J13), and the character string of the data of the target item contained in the specified row is compared with the retrieving character string (encrypted character string) set in the comparison character string storage area 316d (step J14).

In the comparing process, as shown in the flowchart shown in FIG. 4B, the encrypted character string of the data of a target item retrieved from the database is compared with the encrypted character string for use in a retrieving process, and it is determines whether or not they match each other (step K11). When they match each other (YES in step K11), the record data containing the matching items is extracted as a database search result (step K12).

The process is repeated until the end of the encrypted database, the corresponding data is sequentially extracted (step J15), and the extracted data is output as a retrieval result (step J20).

Practically, in the example of the encrypted database shown in FIG. 5(b), for example, if the data such as 'Florida' in the item 'state', etc. is specified for retrieval, then the 'Florida' input as retrieving data is encrypted using the column key 'apple' of the 'state', thereby obtaining 'h*/fDD'. The data such as the 'h*/fDD', etc. is retrieved from the column of the 'state'. Thus, it is determined that the data corresponding to both 'number 2' and 'number 8' exists.

On the other hand, when an item to be retrieved corresponds to one of other column items encrypted using a row key, the data in each row of the target column is sequentially scanned (steps J12 through J16), the data of a target item contained in a specified row is decrypted using a row key specific to each row (step J17), and then the result is compared with the retrieving character string (non-encrypted character string) set in the comparison character string storage area 316d (step J18).

In the comparing process, as shown in the flowchart shown in FIG. 4B, it is determined whether or not the decrypted character string of the data in a target column retrieved from the database matches the non-encrypted character string for use in a retrieving process (step K11). If they match each other (YES in step K11), then the record data containing the matching item is extracted as a database retrieval result (step K12).

The process is repeated to the end of the encrypted database, the corresponding data is sequentially extracted (step J19), and the extracted data is output as a retrieval result (step J20).

Practically, in the example of an encrypted database shown in FIG. 5(b), for example, when the data such as '163' in the item 'eight' is specified to be retrieved, the data in row 1 of the 'weight' is decrypted using a row key such as the 'tiger', etc. Similarly, the data in rows 2, 3, 4, 5, 6, 7, 8, and 9 is decrypted respectively using the corresponding row keys 'tiger', 'dog', 'cat', 'mouse', 'elephant', 'cow', 'pig', 'rabbit', and 'lion' as shown in FIG. 6. Then, based on the '163' input as retrieving data, the column of the 'state' or the corresponding data is retrieved. Thus, it is determined that the data corresponding to the 'number 3' and 'number 9' exists.

Thus, when a database is encrypted, a predetermined column item used in a retrieving process is encrypted using a common column key. In a retrieving process, retrieving data is encrypted using the common column key, and compared with the encrypted data in the database, thereby realizing high-speed retrieval. In addition, a column item other than the predetermined column item is assigned a different key for each row and encrypted to improve the security. In this case, when a retrieving process is performed, the decryption using a key for each row is required. Therefore, it takes a longer time than in the retrieving process on the predetermined column item, which, however, is not a problem because the item is not frequently used in the retrieving process.

According to the first embodiment, the data of the column items other than a predetermined column item is encrypted using a specific row key for each row. However, according to the second embodiment, a specific row key for each row and a common column key for a corresponding column item are used in combination in an encrypting process to furthermore improve the security.

FIG. 7 shows the configuration of the database according to the second embodiment; FIG. 7(a) shows the state before encryption; FIG. 7(b) shows the state after encryption; and FIG. 7(c) shows the state after decryption. FIG. 8 shows the configuration of the composite key according to the second embodiment.

As shown in FIG. 7(a), the apparatus has a matrix in rows and columns. Here shows personal data as a database. The database has a record comprising the items of: 'number', 'name', 'weight', 'height', 'age', and 'phone'.

The database is encrypted using a composite key. That is, when a column item frequently used in a retrieving process comprises 'name', 'state', and 'age', the data of each row of the column item is encrypted using a column key common among column items such as the 'apple', 'orange', 'lemon', etc. as shown in FIG. 8, and the data of each row of other column items 'weight', 'height', and 'phone' is encrypted using a composite key of a column key and a row key such as 'banana+a row key', 'lychee+a row key', 'apricot+a row key', etc.

It is assumed that the row of the 'number' is not encrypted. As a row key, 'tiger', 'dog', 'cat', 'mouse', 'elephant', 'cow', 'pig', 'rabbit', 'lion', etc. are used.

These column keys and row keys determine a predetermined nonlinear function, and an encrypting (decrypting) process is performed by a binary operation (inverse binary operation) of the function and the vector mathematically generated using the function. In this case, the encryption/decryption system according to the present invention can be used as described below.

FIG. 7(b) shows the result of encrypting the database shown in FIG. 7(a) using a composite key. The database storage area 316a of the data storage device 316 stores the database in the state as shown in FIG. 7(b).

When the database is searched, as in the above mentioned first embodiment, the retrieving data is encrypted using a common column key corresponding to the column item used in the retrieval, and then a retrieving process is performed. For example, when the data such as 'Florida' in the 'State' is to be retrieved, the 'Florida' input as a retrieving data is encrypted using the column key 'apple' of the 'state', thereby obtaining 'h*/fDD'. The data such as the 'h*/fDD' is retrieved from each row of the column of the 'state'. Thus, it is determined that the data corresponding to the 'number2' and 'number8' exist.

In addition, when the encrypted database is restored to the original state, the composite key used in the encrypting process is used. When the data is decrypted using the composite key used in the database encrypting process as shown in FIG. 7(b), the original data can be obtained as shown in FIG. 7(c).

Since the processes performed when a database is encrypted or when an encrypted database is searched are the same as those of the above mentioned first embodiment (FIGS. 2 through 4B) except the data of each row of the column items other than a predetermined column item is encrypted using a combination of a column key and a row key, the explanation of the processes are omitted here.

Thus, the column items frequently used in a retrieving process are encrypted using a column key common among the column items, thereby realizing high speed retrieval as in the above mentioned first embodiment. Other column items are encrypted using a column key and a row key as a composite key, thereby furthermore reinforcing the security.

According to the first and second embodiments, the present invention is designed as a single apparatus, but can also be designed as a database system for requesting a retrieving process from another information terminal through a network with the database stored in separate places.

Described below is the above mentioned database system.

Figure 9:
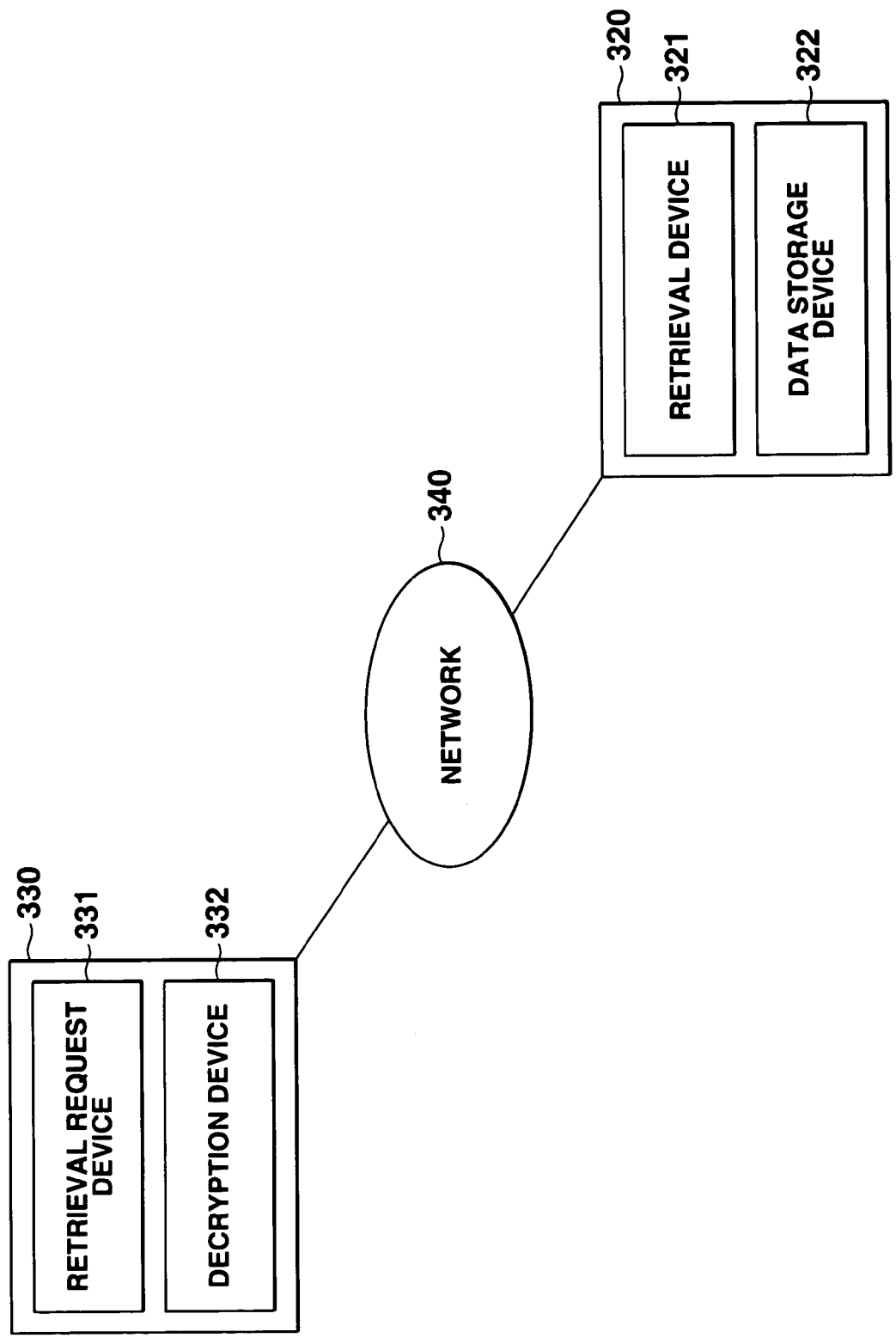
FIG. 9 is a block diagram of the configuration of the database system according to the third embodiment of the database management apparatus of the present invention.

FIG. 9 is a block diagram of the configuration of the database system according to the third embodiment of the present invention.

The system comprises a first terminal device 320 and a second terminal device 330. The first terminal device 320 is connected to the second terminal device 330 through a network 340.

The first terminal device 320 is used as a server computer for providing a database service, and comprises a retrieval device 321 for searching a database, and a data storage device 322 for storing a database. The second terminal device 330 requests the first terminal device 320 to search a database, receives the result from the first terminal device 320 as a client computer, and comprises a retrieval request device 331 and a decryption device 332.

With the database system, the first terminal device 320 encrypts the data of each row of a predetermined column item of a database using a column item common among corresponding column items as described above by referring to FIG. 2, encrypts the data of each row of other column items using a row key specific to each row, and stores the result in the data storage device 322.

When the second terminal device 330 requests the first terminal device 320 to search a database, the second terminal device 330 performs the processes up to the pre-retrieval process shown in FIG. 3A. That is, the retrieval request device 331 of the second terminal device 330 determines whether or not a column item input to be retrieved is a predetermined column item, and encrypts a retrieving character string (keyword) using a column key common among corresponding column items when the input column item is a predetermined column item. When the input column item is not the predetermined column item, the encrypting process is not required.

After the pre-retrieval process, the second terminal device 330 transmits a retrieving character string to the first terminal device 320 through the network 340. The first terminal device 320 performs the retrieving process as described above by referring to FIGS. 4A and 4B by receiving the retrieving character string.

That is, the retrieval device 321 of the first terminal device 320 determines whether or not a column item to be retrieved is a predetermined column item, compares the retrieving character string (encrypted character string) obtained from the second terminal device 330 with the data of each row of the corresponding column item in the encrypted database in the data storage device 322 if the column item is a predetermined column item, and extracts the corresponding data. In addition, if a column item to be retrieved is an item other than the predetermined, then the data of the corresponding column item of the encrypted database in the data storage device 322 is decrypted using a key for each row, the retrieving character string (non-encrypted character string) obtained from the second terminal device 330 is compared with the decrypted data of each row, and the corresponding data is extracted.

When a retrieval result can be obtained, the first terminal device 320 returns the data obtained as the retrieval result as encrypted data to the second terminal device 330 through the network 340. The second terminal device 330 shares an encryption key with the first terminal device 320. Therefore, when the second terminal device 330 receives a retrieval result from the first terminal device 320, the decryption device 332 can decrypt the data using the encryption key. In this case, since encrypted data is communicated between the first terminal device 320 and the second terminal device 330, the security of the database can be guaranteed.

Thus, even in a database system having a database on the first terminal device 320 to search the database by access from the second terminal device 330, the data of a column item frequently used in a retrieving process is encrypted using a column key common among the corresponding column items, and the data of other column items are encrypted using a row key specific to each row, thereby improving the security and realizing high-speed retrieval.

The data of the column items other than the predetermined column item can be encrypted using a composite key of a row key specific to each row and a column key common among the corresponding column items as in the above mentioned second embodiment, thereby furthermore improving the security.

Described below is a further embodiment of the database management apparatus according to the present invention.

Figure 10:
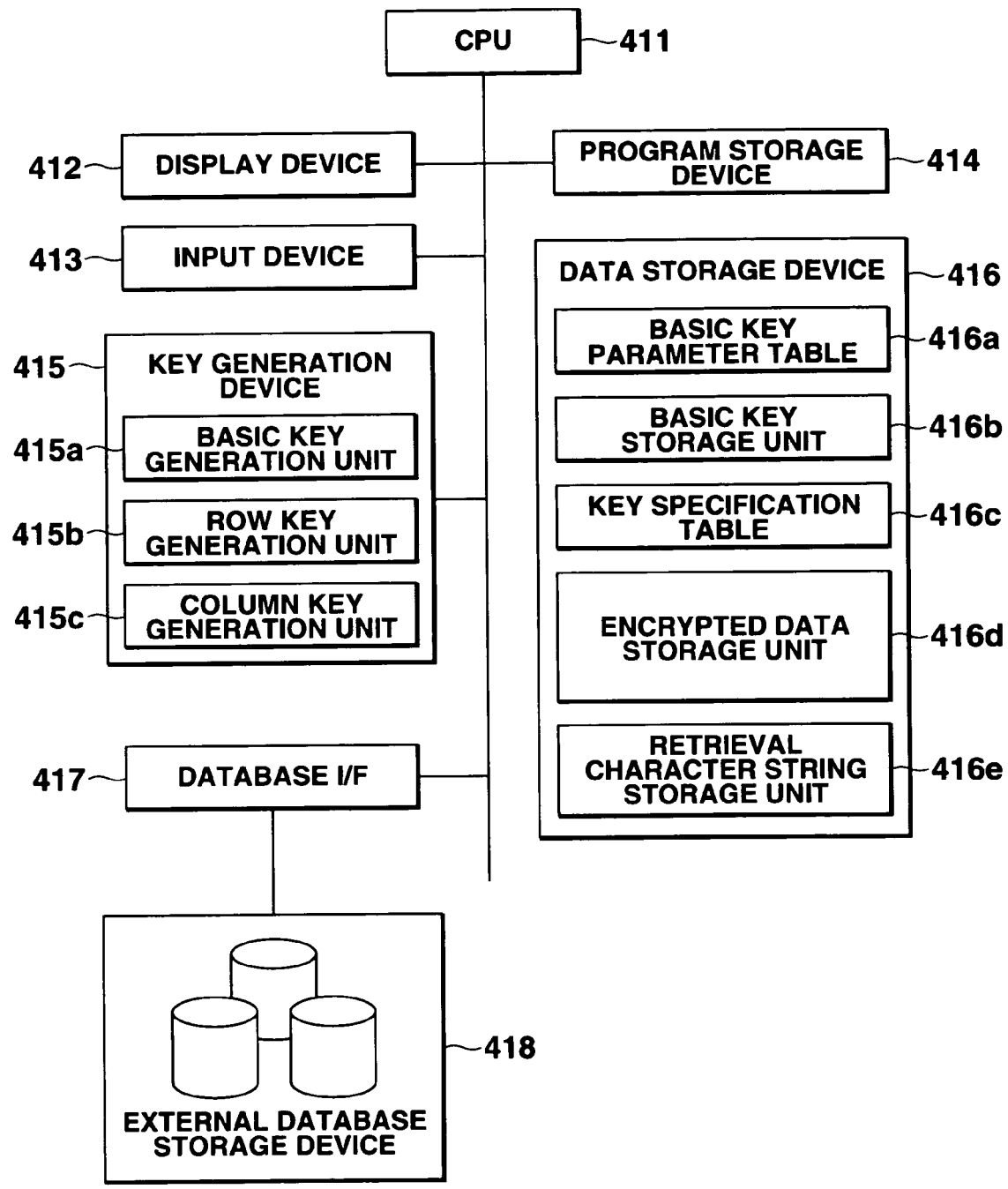
FIG. 10 shows the database management apparatus according to the fourth embodiment of the present invention.

FIG. 10 shows the configuration of the database management apparatus according to the fourth embodiment of the present invention.

The apparatus encrypts and manages a database arranged as a matrix in rows and columns, and searches the encrypted database. It can be realized by a computer for reading a program which is stored in a storage medium such as a magnetic disk, etc., and controls the operations of the computer.

As shown in FIG. 10, the apparatus comprises a CPU 411, a display device 412, an input device 413, a program storage device 414, a key generation device 415, a data storage device 416, and a database I/F 417.

Figures 17A, 17B:
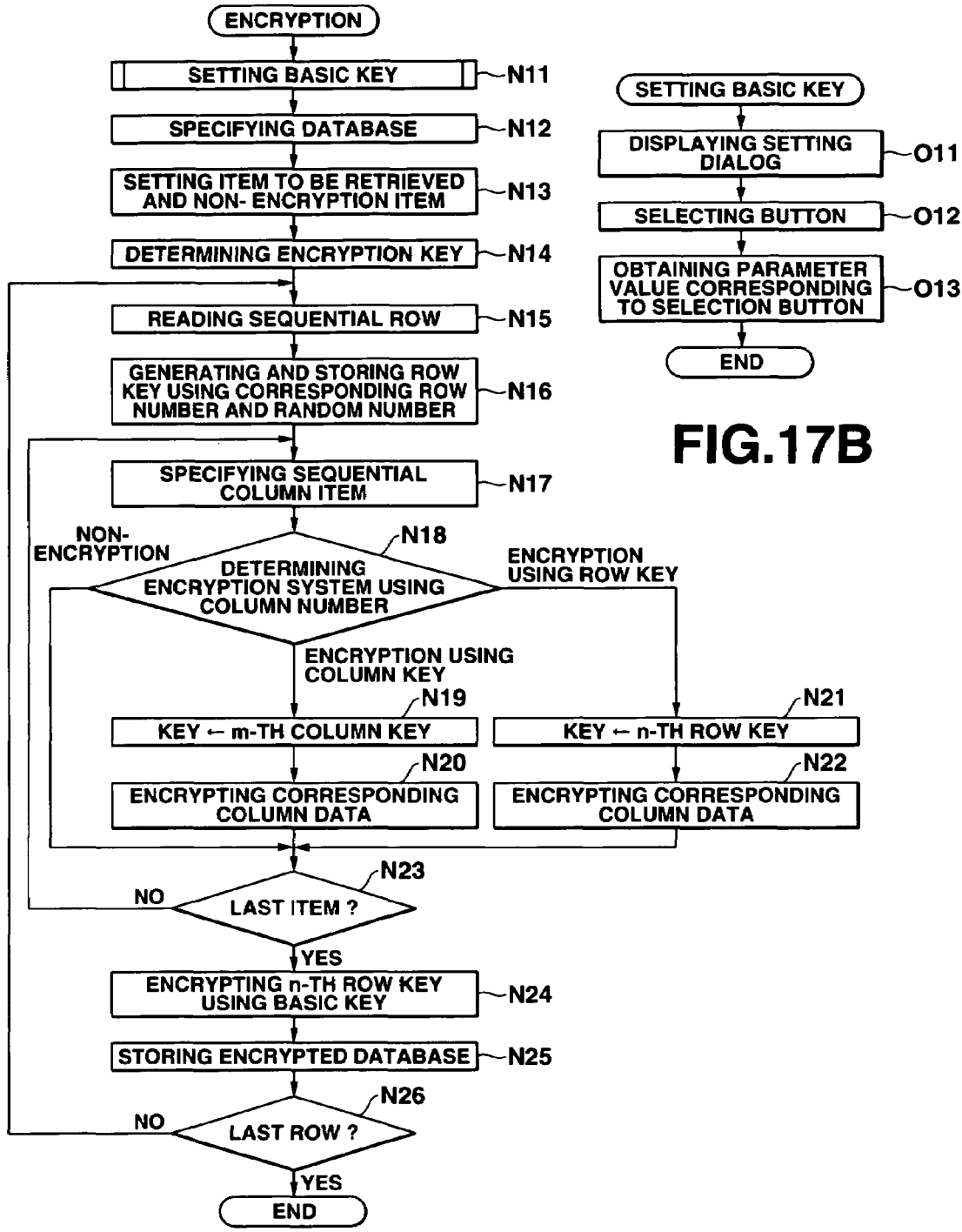
FIGS. 17A and 17B are flowcharts of the operations of the database encrypting process performed by the database management apparatus.
Figure 18A:
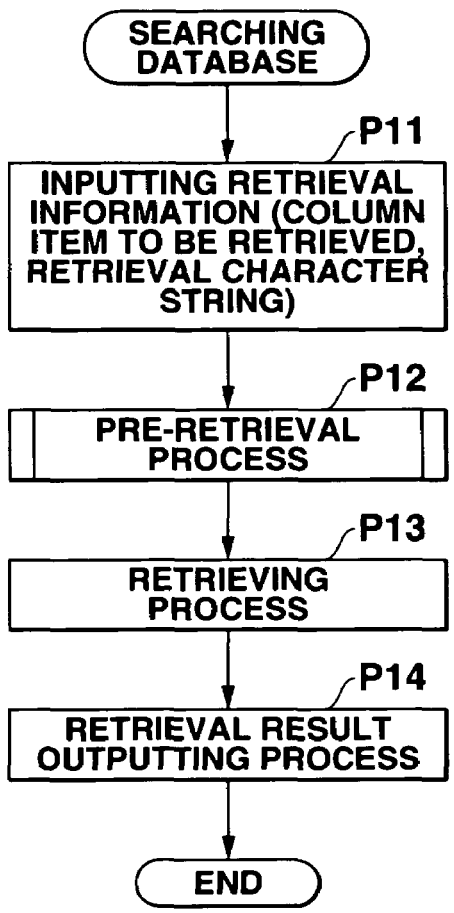
FIGS. 18A and 18B are flowcharts of the operations of the database searching process performed by the database management apparatus.

The CPU 411 controls the entire apparatus, reads a program stored in the program storage device 414, and performs various processes according to the program. According to the present embodiment, the CPU 411 performs an encrypting process for a database as shown in FIGS. 17A and 17B, and a retrieving process for the database as shown in FIGS. 18A through 19.

The display device 412 is a device for displaying data, and can be, for example, an LCD (liquid crystal display), a CRT (cathode-ray tube), etc. The input device 413 is a device for inputting data, and can be, for example, a keyboard, mouse, etc.

The program storage device 414 comprises for example, ROM or RAM, etc., and stores a program required by the apparatus. A program required by the apparatus can be, a database encryption program, a database search program, etc.

The program storage device 414 can be, in addition to semiconductor memory, magnetic and optical storage media. The storage medium includes a portable medium such as CD-ROM, etc. and a fixed medium such as a hard disk, etc. A program stored in the storage medium can be designed such that a part or all of the program can be transmitted from a server or a client to a transmission control unit through a transmission medium such as a network circuit, etc. Furthermore, the storage medium can be that of a server provided in a network. Furthermore, the program can be transmitted to a server or a client through a transmission medium such as a network circuit, etc.

The key generation device 415 is a device for generating an encryption key used in encrypting a database, and comprises, in this embodiment, a basic key generation unit 415a, a row key generation unit 415b, and a column key generation unit 415c for generating three encryption keys, that is, a basic key, a row key, and a column key respectively.

The data storage device 416 stores various data and tables required for the apparatus, and comprises RAM, or an external storage device such as a magnetic disk device, etc. The data storage device 416 comprises a basic key parameter table 416a, a basic key storage unit 416b, a key specification table 416c, an encrypted data storage unit 416d, and a retrieval character string storage unit 416e.

Figures 12, 13:
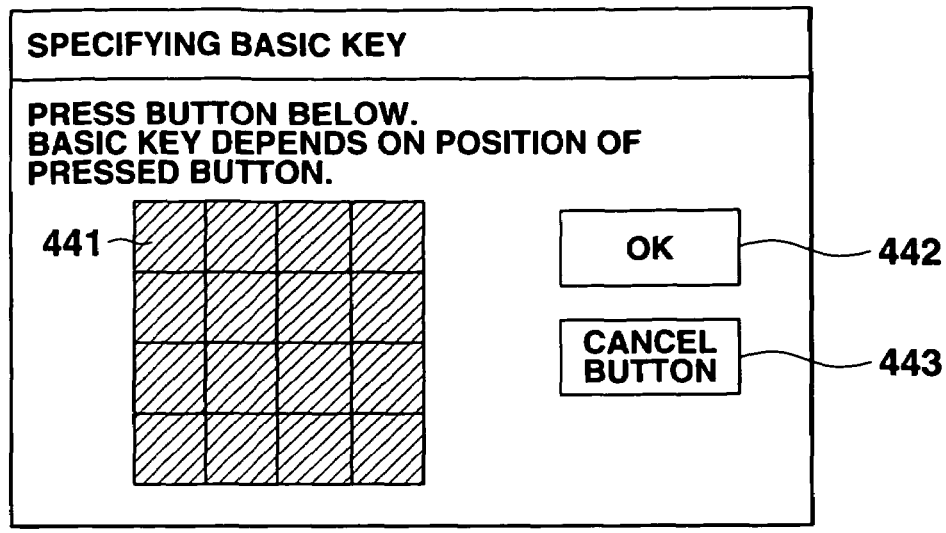
FIG. 12 shows the configuration of the dialog for setting a basic key in the database management apparatus.
FIG. 13 shows an example of a basic key parameter table in the database management apparatus.

The basic key parameter table 416a is a table in which a parameter value of a basic key is entered (refer to FIG. 13). The basic key storage unit 416b stores a parameter value of a basic key obtained in a specifying operation by an operator. The key specification table 416c is a table storing the types (non-encryption, a row key, a column key) of encryption system defined for each column (field) of a database (refer to FIG. 15). The encrypted data storage unit 416d stores an encrypted database. The retrieval character string storage unit 416e stores a retrieving character string specified by an operator when a database is searched.

The database I/F 417 is an interface for transmitting and receiving data to and from an external database storage device 418 provided independent of the apparatus. The external database storage device 418 contains a plurality of database files (original data), and these database files are designed to be selectively read by access from the apparatus.

Described below is the method of applying the above mentioned encryption system to a database in the apparatus.

When a database is encrypted, it is difficult to decrypt a key if a different key is used for each row (record), thereby improving the security. However, since the encrypted data has to be decrypted using a key for each row or the input retrieving data (keyword) has to be encrypted using a key for each row when a database is searched, it takes a long time to obtain a retrieval result if a different key is used for any row. On the other hand, if a database is encrypted using a different key for each row (field), retrieving data is encrypted using only a key corresponding to a column item to be retrieved, thereby searching a database at a high speed. However, when there are the same data in the same column, the same encryption results are output, which may allow the key to be decrypted.

The feature of the present invention resides in that the data of a column item frequently used in a retrieving process is encrypted using a common key (column key), the data of other column items is encrypted using a different key (row key) for each row, and the key (row key) different for each row is encrypted using another common key (basic key) among the rows. The encrypting process (decrypting process) using a basic key can determine a predetermined nonlinear function, and an encrypting (decrypting) process is performed by a binary operation (inverse binary operation) of the function and the vector mathematically generated using the function. In this case, the encryption/decryption system according to the present invention can be used as described below.

FIG. 20 shows a practical example.

FIG. 20 shows the configuration of the database of the apparatus according to the present invention; FIG. 20(a) shows the state before encryption; FIG. 20(b) shows the state after encryption of the present invention; and FIG. 20(c) shows the state after decryption.

As shown in FIG. 20(a), the apparatus encrypts a database arranged in a matrix in rows and columns. In this example, personal data is processed as a database. The database contains column items (fields) of 'code', 'name', 'state', 'age', and 'phone'.

The database is encrypted using a column key and a row key. That is, when a column item frequently used in a retrieving process comprises 'state' and 'age', the data (record) of each row of the column item is encrypted using a column key common among column items, and the data of each row (record) of other column items 'name' and 'phone' is encrypted using a specific row key for each row. Thus, the results are stored in a record file. At this time, a row key used when the corresponding column item is encrypted is encrypted using a basic key, and the encrypted row key is added to each record, and the result is stored. The data of the column item 'code' is not encrypted.

FIG. 20(b) shows the result of encrypting the database shown in FIG. 20(a) using the column key and the row key. In this case, the column item such as 'line key' is added, and row keys (9658, 9143, 8278, . . . ) are added to the column item. The encrypted data storage unit 416d of the data storage device 416 shown in FIG. 10 stores a database in the state shown in FIG. 20(b).

When the database is searched, the retrieving data is encrypted using a column key corresponding to the column item used in the retrieval, and then a retrieving process is performed. For example, when the data such as 'Florida' in the 'State' is to be retrieved, the 'Florida' input as a retrieving data is encrypted using the column key of the 'state', thereby obtaining 'h*/fDD'. The data such as the 'h*/fDD' is retrieved from each row of the column of the 'state'. Thus, it is determined that the data corresponding to the 'code 1002' and 'code 1008' exist.

In addition, when the encrypted database is restored to the original state, the column key, the row key, and the basic key used in the encrypting process are used. When the data is decrypted using the column key, the row key, and the basic key used in the database encrypting process as shown in FIG. 20(b), the original data can be obtained as shown in FIG. 20(c).

Described below is the practical configuration for encrypting/decrypting a database.

Figure 11:
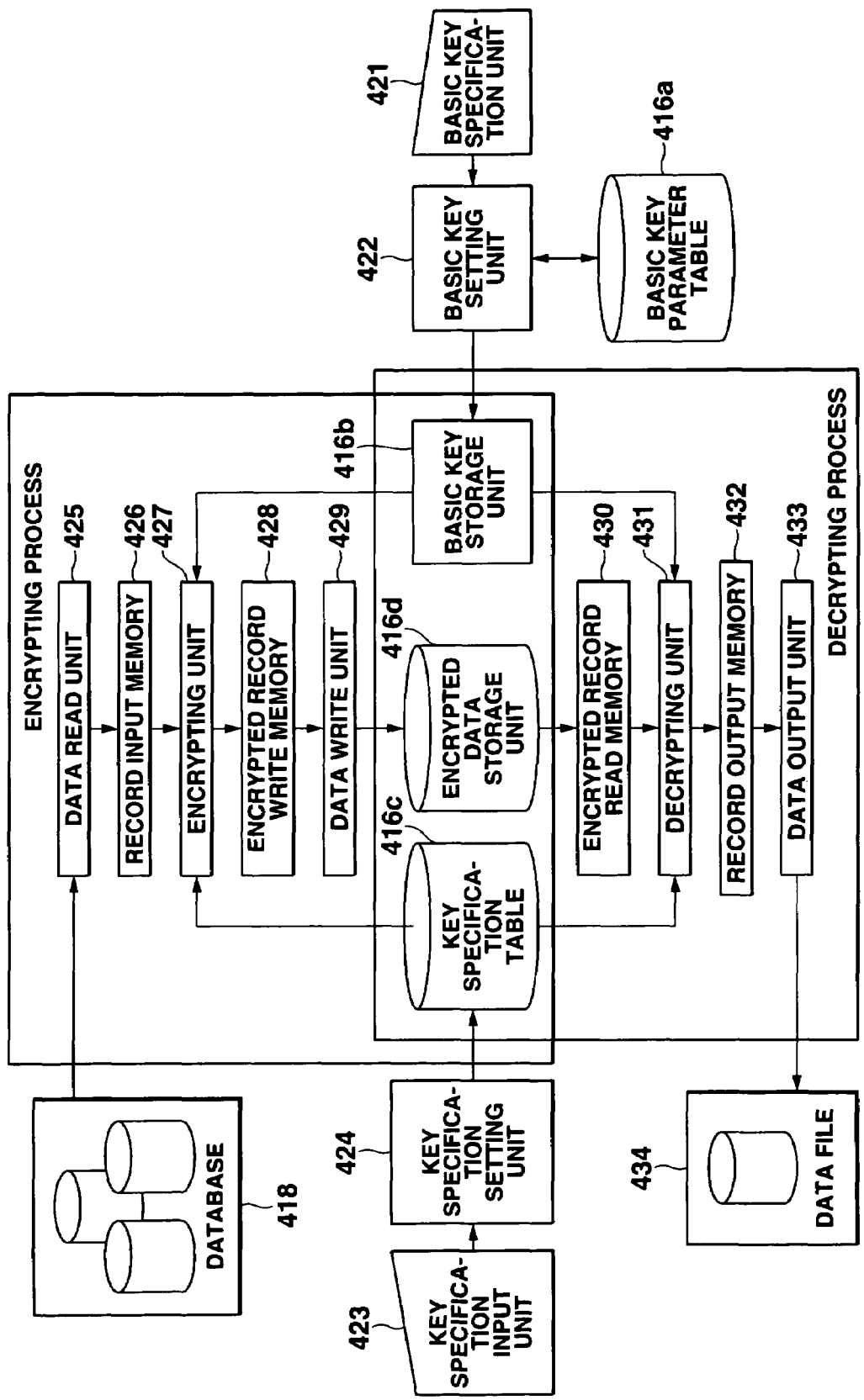
FIG. 11 is a block diagram of the configuration of the functions of the database management apparatus.

FIG. 11 is a block diagram of the configuration of the functions of the apparatus according to the present invention.

The input process system of the apparatus comprises a basic key specification unit 421, a basic key setting unit 422, a key specification input unit 423, and a key specification setting unit 424. The encryption process system of the apparatus comprises a data read unit 425, a record input memory 426, an encrypting unit 427, an encrypted record write memory 428, and a data write unit 429. The encryption process system of the apparatus comprises an encrypted record read memory 430, a decrypting unit 431, a record output memory 432, and a data output unit 433. In addition, the above mentioned basic key parameter table 416a, the basic key storage unit 416b, the key specification table 416c, and the encrypted data storage unit 416d are used. The basic key parameter table 416a is used for the basic key setting unit 422. The basic key storage unit 416b, the key specification table 416c, and the encrypted data storage unit 416d are used for both encrypting unit 427 and decrypting unit 431.

Various types of memory 426, 428, 430, and 432 shown in FIG. 11 is a group of registers, and provided in a predetermined area of the data storage device 416.

When a database is encrypted with the configuration, a basic key is specified in an operation of an operator through the basic key specification unit 421. The basic key setting unit 422 reads the parameter value of the basic key specified by the basic key specification unit 421 from the basic key parameter table 416a, and sets it in the basic key storage unit 416b.

Practically, the basic key is specified through the basic key setting dialog as shown in FIG. 12. The basic key setting dialog is a screen for optional specification of a basic key by an operator. On the screen, a basic key specification button unit 441, an OK button 442, and a cancel button 443 are provided. The basic key specification button unit 441 comprises a plurality of buttons. When an operator presses an optional button among these buttons, a parameter value of the basic key is determined depending on the position of the pressed button. The OK button 442 is used to guarantee the specification of a basic key, and the cancel button 443 is used to cancel the specification of the basic button.

For example, assume that 16 buttons 1 through 16 are arranged on the basic key specification button unit 441 sequentially from left to right. As shown in FIG. 13, the parameter value of the basic key is defined corresponding to the positions of these buttons on the basic key parameter table 416a. When an operator presses the button 1 on the basic key specification button unit 441, the parameter value of 5 of the basic key is determined according to the basic key parameter table 416a. Similarly, when the button 2 on the basic key specification button unit 441 is pressed, the parameter value of 7 of the basic key is determined.

Then, the external database storage device 418 is accessed, and the database to be encrypted is specified from among various databases stored in the external database storage device 418. After specifying the database, the operator specifies a key specification for each data item of the database through the key specification input unit 423. The key specification setting unit 424 enters the key specification information in the key specification table 416c in the specifying operation of the key specification by the key specification input unit 423.

Figures 14, 15:
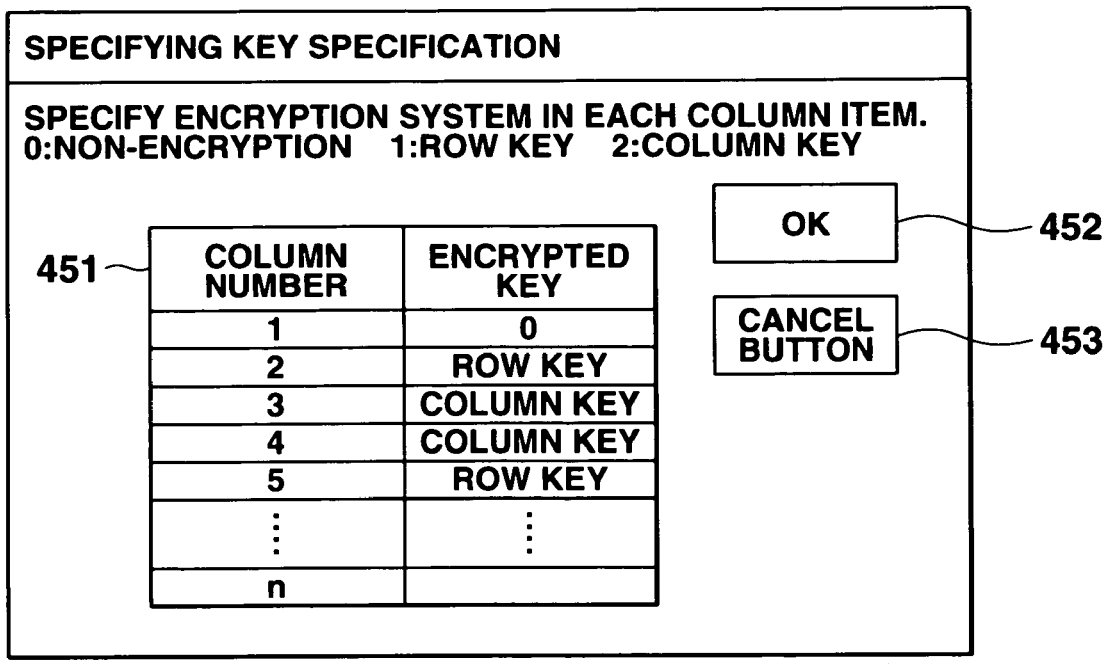
FIG. 14 shows the configuration of the dialog for setting a key specification in the database management apparatus.
FIG. 15 shows an example of an entry in the key specification table in the database management apparatus.

Practically, the key specification is entered through the key specification setting dialog as shown in FIG. 14. The key specification setting dialog is a screen on which an encryption system (type of key used in encryption) is optionally specified by an operator for each array item (field) of the database. On the screen an encryption system specification column 451, an OK button 452, and a cancel button 453 are provided.

As an encryption system, a key (row key) can be used for each row, or a key (row key) common among the columns can be used. In this example, a value can be input as an encryption system for each column item of a database to the encryption system specification column 451. The value can be 0 (non-encryption), 1 (a row key), or 2 (a column key). The OK button 452 is used to set the key specification. The cancel button 453 is used to cancel the setting of the key specification. When the encryption system is specified in the key specification setting dialog, the contents of the specification are entered in the key specification table 416c as the key specification information for each column item.

FIG. 15 shows an example of an entry in the key specification table 416c.

In this example, non-encryption is set as the item of the column number 1 of the database, a row key is set as the item of the column number 2, a column key is set as the item of the column number 3, a column key is set as the item of the column number 4, and a column key is set as the item of the column number 5. The item having the column number of 1 is 'code'. The item having the column number of 2 is 'name'. The item having the column number of 3 is 'state', the column having the column number of 4 is 'age', and the item having the column number of 5 is 'phone'.

When a basic key is set in the basic key storage unit 416b, and when key specification information for each column item is set in the key specification table 416c, the database is encrypted in the following procedure according to the setting information That is, as shown in FIG. 11, a database specified from the external database storage device 418 is read in row units (record units) by the data read unit 425, and sequentially stored in the record input memory 426. The encrypting unit 427 encrypts a record stored in the record input memory 426 using the basic key parameter table 416a and the basic key storage unit 416b. The encrypting process is described below in detail by referring to FIG. 16.

After a record is encrypted by the encrypting unit 427 and stored in the encrypted record write memory 428, it is written to the encrypted data storage unit 416d through the data write unit 429. Thus, the encrypted database is generated in the encrypted data storage unit 416d.

The database is decrypted in the inverse procedure.

That is, first, the encrypted database stored in the encrypted data storage unit 416d is read in row units (record units), and sequentially stored in the encrypted record read memory 430. The decrypting unit 431 decrypts the encrypted record stored in the encrypted record read memory 430 using the key specification table 416c and the basic key storage unit 416b. The decrypting process is described below in detail by referring to FIG. 16. The record decrypted by the decrypting unit 431 is stored in the record output memory 432, and is then output to a data file 434 through the data output unit 433. Thus, a decrypted database is generated in the data file 434. The data file 434 is provided in a predetermined area of the data storage device 416 shown in FIG. 10.

Figure 16:
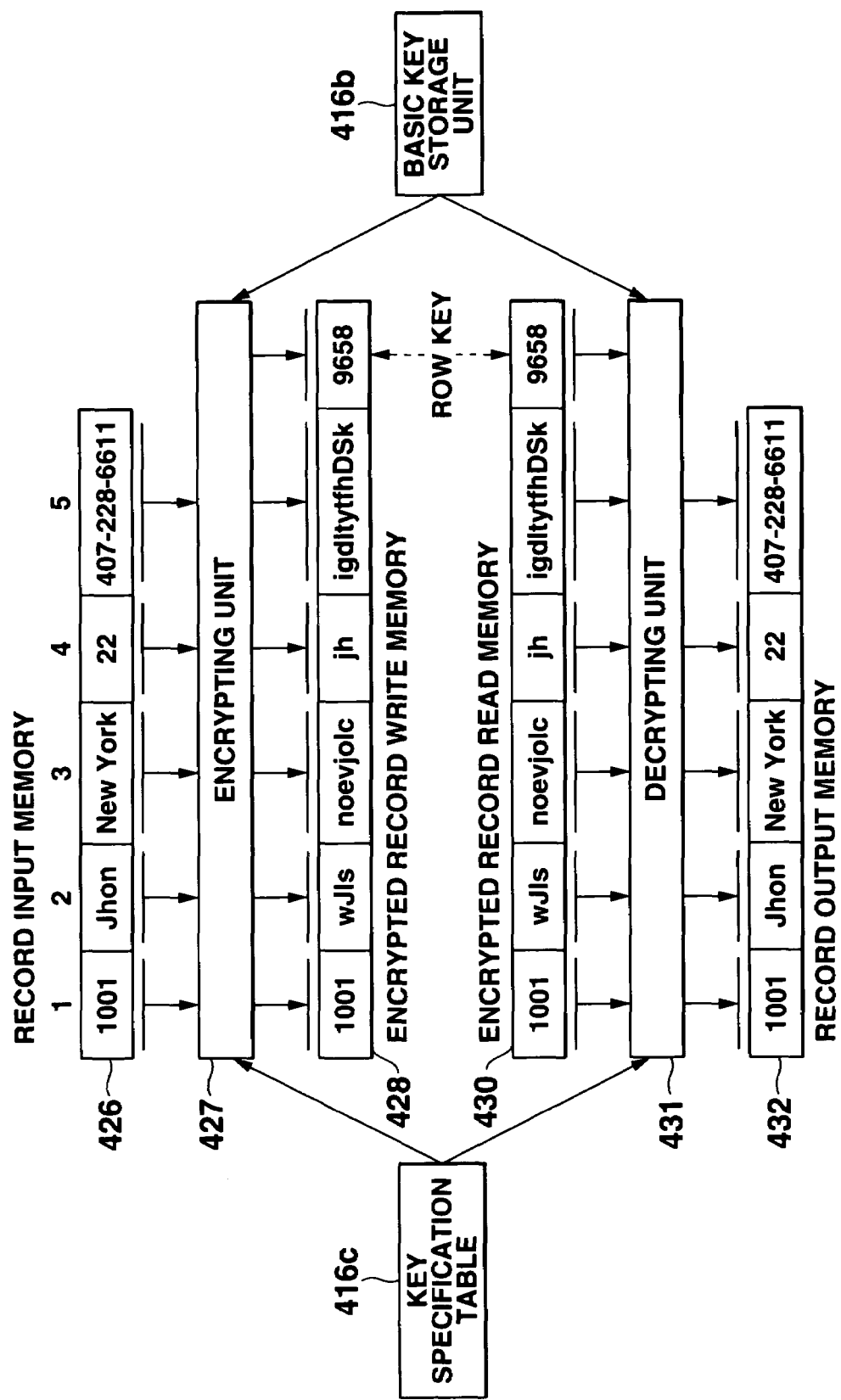
FIG. 16 shows the data flow when the database is encrypted and decrypted in the database management apparatus.

FIG. 16 shows a practical example.

FIG. 16 shows the flow of data when a database is encrypted and decrypted in the apparatus according to the present invention.

Assume that the record in row 1 of the database specified to be encrypted is read by the data read unit 425, and stored in the record input memory 426. In this case, using the database shown in FIG. 20(a) as an example, the data having 5 items, that is, '1001', 'John', 'New York', '22', '407-228-6611' in row 1 of the database is sequentially stored in record input memory 426.

The encrypting unit 427 encrypts the 5-item record for each item by referring to the key specification table 416c. For example, when the contents set in the key specification table 416c are as shown in FIG. 15, the first item ('code') data of the record corresponding to the column number 1 is not encrypted, and is written as is to the encrypted record write memory 428.

In addition, the second item ('name') data of the record corresponding to the column number 2 is encrypted using a row key, and is written to the encrypted record write memory 428. A row key is generated at random using the row number and random numbers, and a different value is used for each row. The data of the third item ('state') of the record corresponding to the column number 3 is encrypted using a column key. The column key has a value common among the columns.

Similarly, the data of the fourth item ('age') of the record corresponding to the column number 4 is encrypted using a column key, and the data of the fifth item ('phone') of the record corresponding to the column number 5 is encrypted using a row key. Then, they are written to the encrypted record write memory 428. Thus, a 1-row encrypted data of '100i', 'wjls', 'noevjolc', 'jh', and 'jgdltytfhDSk' is generated in the encrypted record write memory 428.

Furthermore, the encrypting unit 427 encrypts a row key used when the record is encrypted using the parameter value set in the basic key storage unit 416b and a basic key common among the rows, and then the row key after the encryption is added to the encrypted record write memory 428. In the example shown in FIG. 16, the data '9568' is a row key after the encryption.

The above mentioned process is repeatedly performed on each row of the database, and the encrypted database is stored in the encrypted data storage unit 416d. FIG. 20(b) shows this state.

When an decrypting process is performed, the process inverse to the encrypting process is performed.

That is, the encrypted database stored in the encrypted data storage unit 416d is read in a record unit to the encrypted record read memory 430. Assuming that the encrypted record in row 1 is read to the encrypted record read memory 430, in the above mentioned example, a 6-item encrypted data of '1001', 'wjls', 'noevjolc', 'jgdltytfhDSk', and '9568' containing a row key is sequentially stored in the encrypted record read memory 430.

The decrypting unit 431 decrypts the 6-item data record corresponding to each item by referring to the key specification table 416c. In the example shown in FIG. 15, the data of the first item ('code') corresponding to the column number 1 is non-encrypted, the data is written as is to the record output memory 432.

The data of the second item ('name') corresponding to the column number 2 is decrypted using a row key, and the result is written to the record output memory 432. Since the row key is encrypted in the encrypting process using a basic key, the row key is decrypted using the basic key to restore it to the original data. In addition, the data of the second item ('name') corresponding to the column number 3 is decrypted using a column key and written to the record output memory 432.

Similarly, the data of the fourth item ('age') corresponding to the column number 4 is decrypted using a column key, and the data of the fifth item 'phone') corresponding to the column number 5 is decrypted using a row key. The results are written to the record output memory 432. Thus, 1-row decrypted data (original data), that is, '1001', 'John', 'New York', '22', '407-228-6611' is generated in the record output memory 432.

The above mentioned process is repeatedly performed on each row of the encrypted database, and the decrypted database is stored in the data file 434. FIG. 20(c) shows this state.

The operations of the apparatus according to the present invention are described below by referring to the flowchart.

In this example, the process (a) performed when a database is encrypted, and the process (b) performed when a database is searched are separately described below. The program for realizing each function in the flowchart is stored as CPU-readable program code in the storage medium of the program storage device 414. The program can be transmitted as program code through a transmission medium such as a network circuit.

(a) When a database is encrypted:

FIGS. 17A and 17B are flowcharts of the operations of the database encrypting process performed by the apparatus according to the present invention. Assume that a non-encrypted database is stored in the external database storage device 418. FIG. 17A shows this state.

When a database is encrypted, a basic key is first set as shown in the flowchart in FIG. 17A (step N11). The basic key is set through the basic key setting dialog as described above.

That is, as shown in the flowchart in FIG. 17B, the basic key setting dialog shown in FIG. 12 is displayed on the display device 412 when a database is encrypted (step O11). The basic key setting dialog is provided with the basic key specification button unit 441, and the operator specifies a basic key by pressing an optional button in a plurality of buttons arranged on the basic key specification button unit 441.

If the operator pressed the OK button 452 to specify a basic key after the operator presses an optional button in the basic key specification button unit 441 (step O12), then the parameter value of the basic key corresponding to the position of the button is read from the basic key parameter table 416a shown in FIG. 13, and is set in the basic key storage unit 416b (step O13).

Then, a database to be encrypted is specified (step N12). According to the present invention, the external database storage device 418 independent of the present apparatus stores various databases (original data). Therefore, when an encrypting process is performed, the external database storage device 418 is accessed through the database I/F 417, and a database is to be encrypted should be specified.

After a database to be encrypted is specified, a column item for use in a retrieving process in the database and a column item not to be encrypted are set (step N13), and an encryption key (a row key and a column key) for each column item is determined (step N14).

The setting process is performed through the key specification setting dialog as shown in FIG. 14. The key specification setting dialog is a screen on which an encryption system (type of key used in encryption) is optionally specified by an operator for each column item (field) of the database. The screen is displayed on the display device 412 when a database to be encrypted is specified. In this example, a value can be input as an encryption system for each column item of a database to the encryption system specification column 451 provided in the key specification setting dialog shown in FIG. 31. The value can be 0 (non-encryption), 1 (a row key), or 2 (a column key).

In this case, in the database shown in FIG. 20(a), the column items used in a retrieving process are 'state ' in column 3, and 'age' in column 4. A column key is specified for these column items, and a row key is specified for other items 'name' in column 2 and 'phone' in column 5. A column item not to be encrypted is 'code' in column 1. The encryption key set in this example is entered in the key specification table 416c as key specification information as shown in FIG. 15.

After the setting operation, the database is encrypted as follows.

That is, the data in each row of the database is sequentially read from the first row to the record input memory 426 shown in FIG. 11 (step N15). At this time, a row key is generated at random based on a line number assigned to each row by the row key generation unit 415b of the key generation device 415 and a random number, and is stored in a predetermined area of the data storage device 416 (step N16).

Each column item of the row data read to the record input memory 426 is sequentially specified from the first column (step N17), and the encryption system for the specified column item is determined according to the key specification information stored in the key specification table 416c (step N18), and is encrypted using a row key or a column key (steps N19 through N22).

Practically, since the item 'code' in the first column of the database is set as a non-encryption item as shown on the key specification table 416c shown in FIG. 15, no action is taken (steps N18 through N23). That is, the item 'code' remains original data.

Since a row key is set for the item 'name' in the second row, the row key (specific to each row) corresponding to the row number generated in step N16 is read from a predetermined area of the data storage device 416 (steps N18 through N21), and the data in the second column is encrypted using the row key (step N22).

In addition, since a column key is set for the item 'state' in the third column, the column key (key common among the columns) corresponding to the column number is generated by the column key generation unit 415c of the key generation device 415 (steps N18 and N19), and the data in the third column is encrypted using the column key (step N20).

Similarly, the item 'age' in the fourth column is encrypted using a column key, and the item 'phone' in the fifth column is encrypted using a row key.

The encrypted data of each column item is stored in the encrypted record write memory 428 shown in FIG. 11. When the last item is encrypted, the row key used in encrypting the second and third columns of the data of the line is encrypted using the basic key, and added to the encrypted record write memory 428 (step N25). The basic key is generated by the basic key generation unit 415*a* of the key generation device 415. The basic key generation unit 415*a* reads the parameter value set by the operator in the basic key setting dialog shown in FIG. 12 from the basic key storage unit 416*b*, and generates a basic key based on the parameter value.

When 1-row encrypted data and data obtained by encrypting a row key using a basic key are stored in the encrypted record write memory 428, the data is stored in the encrypted data storage unit 416*d* (step N25).

The above mentioned encrypting process is repeatedly performed on each row (steps N26 through N15). When the data in all rows are encrypted, the final state of the encrypted database is shown in FIG. 20(*b*). In this encrypted database, the row key is encrypted using a basic key, and is added to the last item of each row.

(b) When a database is searched:

The process of searching an encrypted database is described below.

Figure 18B:
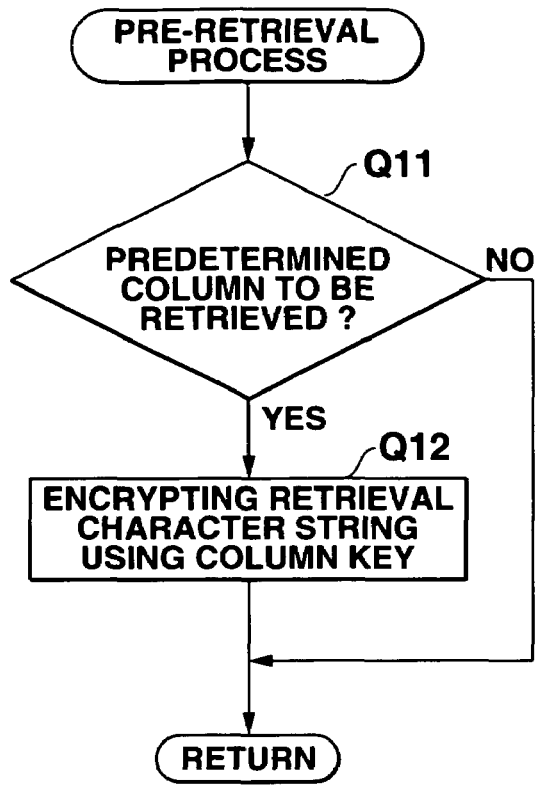

FIGS. 18A and 18B are flowcharts of the operation of the database searching process performed in the present apparatus. Assume that a database is encrypted in the encrypting process shown in (a) above and stored in the basic key storage unit 416*b*.

First, as shown in the flowchart in FIG. 18A, the retrieval information is input on the database search setting screen not shown in FIG. 18A (step P11). An input of the retrieval information refers to inputting a column item to be retrieved and a retrieving character string (keyword). The input information is stored in a predetermined area of the data storage device 416. When the retrieval information is input through the input device 413, the pre-retrieval process is performed (step P12).

In this pre-retrieval process, as shown in the flowchart in FIG. 18B, it is determined whether or not the column item input to be retrieved is a predetermined column item (step Q11). When it is determined that the input item is a predetermined column item (YES in step Q11), the retrieving character string is encrypted using a column key common among the column items (step Q12).

A predetermined column item refers to an item to be retrieved which is set when the database is encrypted. Practically, it refers to each of the items 'state' and 'age'. A column key is set for an item to be retrieved. Therefore, it is determined in step Q11 whether or not an input item is a predetermined column item depending on the type of key set for the corresponding column item by referring to the key specification table 416*c*. If it is a predetermined column item, then a column key corresponding to the column item is generated by the column key generation unit 415*c* of the key generation device 415, and the retrieving character string is encrypted using the column key.

If the input column item input to be retrieved is not a predetermined column item (NO in step Q11), then the retrieving character string is not encrypted as described above.

After the above mentioned pre-retrieval process, the database is searched (refer to FIGS. 19A and 19B) (step P13), and the data obtained as a retrieval result is displayed on the display device 412 (step P14).

Figure 19A:
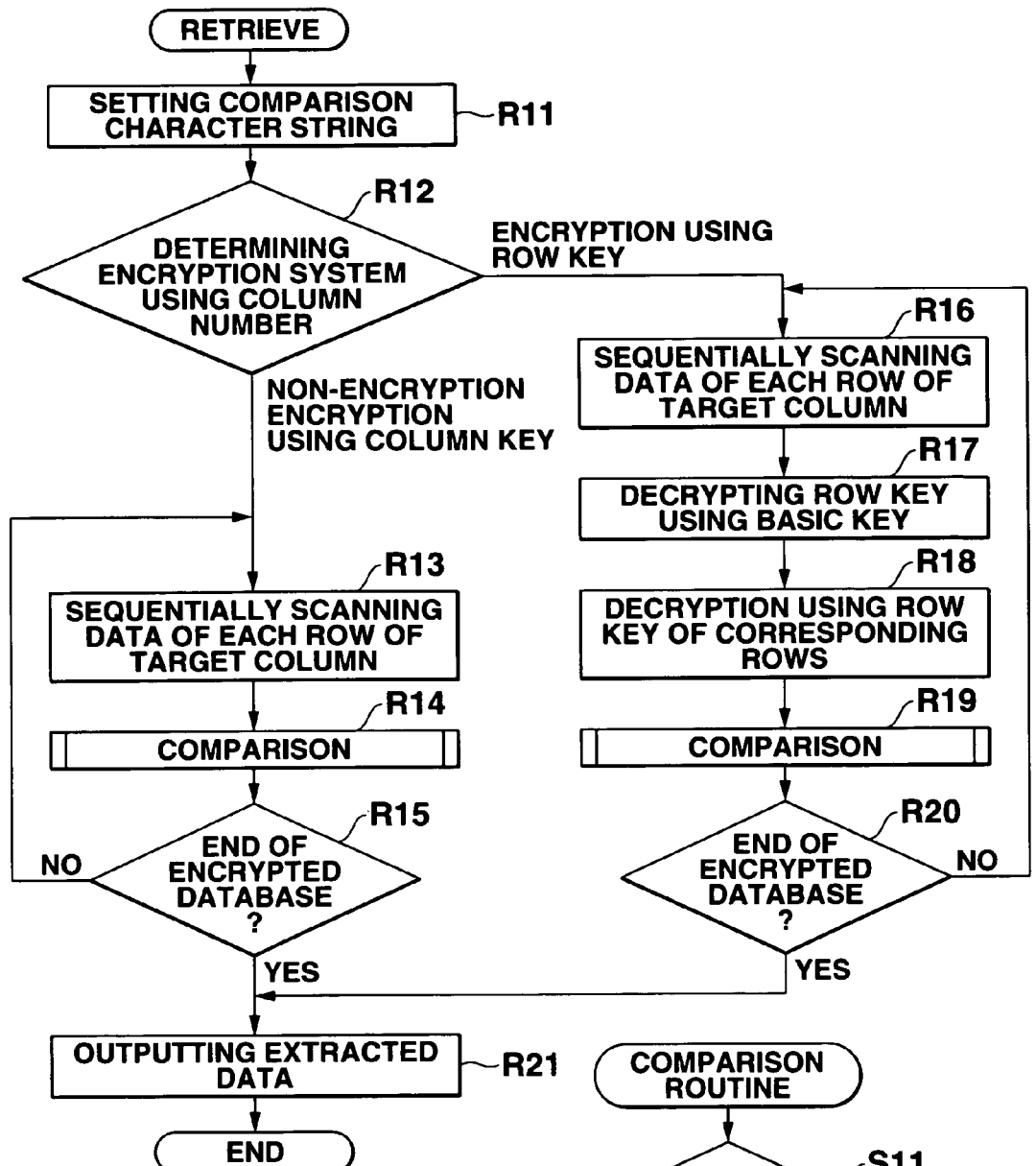
FIGS. 19A and 19B are flowcharts of the practical operations of the retrieving process in step P13 shown in FIG. 18A.
Figure 19B:
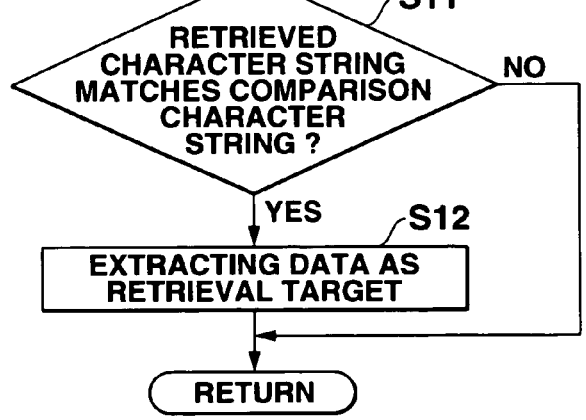

FIGS. 19A and 19B shows the process of searching a database.

FIGS. 19A and 19B are flowcharts of practical operations of the searching process in step P13.

First, as shown in the flowchart in FIG. 19A, a retrieving character string is set as a character string to be compared with the database in the retrieval character string storage unit 416*e* of the data storage device 416 (step R11). In this case, if the input item is a column item to be retrieved ('state', 'age'), then the retrieving character string is encrypted using a column key corresponding to the column item in the pre-retrieval process, and the result is set in the retrieval character string storage unit 416*e*. If the input item is not the column item to be retrieved, then it is not encrypted, but is set as is in the retrieval character string storage unit 416*e*.

Then, the encryption system of the encrypted database stored in the basic key parameter table 416*a* of the data storage device 416 is determined based on the column number (step R12). If an item to be retrieved is a predetermined column item encrypted using a column key, then each row data in a target column is sequentially scanned (steps R12 and R13), and an encrypted character string in the row is compared with a retrieving character string (encrypted character string) set in the retrieval character string storage unit 416*e* (step R14).

In this comparing process, the encrypted character string in the row, which is retrieved from the database, is compared with the retrieving encrypted character string as shown in the flowchart in FIG. 19B, and it is determined whether or not they match each other (step S11). If they match each other (YES in step S11), then the record data including the matching item is extracted as a database retrieval result (step S12).

The process is repeated up to the end of the encrypted database, the corresponding data is sequentially extracted (step R15), and the extracted data is output as a retrieval result (step R21).

Practically, in the example of the encrypted database shown in FIG. 20(*b*), when the data 'Florida' in the item 'state' is specified to be retrieved, the 'Florida' input as retrieving data is encrypted using the column key in row 3 of 'state', thereby obtaining 'h*/fDD'. The data 'h*/fDD' is retrieved from the column of 'state'. Thus, the data corresponding to the code numbers of 1001 and 1008 exists.

When an item to be retrieved is a column item encrypted using a row key, row data of the target column is sequentially scanned (steps R12 through R16). Since each row key used when each piece of row data is encrypted is encrypted using a basic key, it is necessary to decrypt each row key using a basic key (step R17). When each row key is decrypted using a basic key, an encrypted character string in each row is decrypted using a row key (step R18), and the decrypted character string is compared with the retrieving character string (non-encrypted character string) set in the retrieval character string storage unit 416*e* (step R19).

In this comparing process, the encrypted character string in the row, which is retrieved from the database, is compared with the retrieving encrypted character string as shown in the flowchart in FIG. 19B, and it is determined whether or not they match each other (step S11). If they match each other (YES in step S11), then the record data including the matching item is extracted as a database retrieval result (step S12).

The process is repeated up to the end of the encrypted database, the corresponding data is sequentially extracted (step R20), and the extracted data is output as a retrieval result (step R21).

Practically, in the example of the encrypted database shown in FIG. 20(*b*), when the data 'Jhon' in the item 'name' is specified to be retrieved, the row key '9654' (encrypted data) corresponding to the row 1 of the 'name' is decrypted using a basic key, and then 'wJIS' in row 1 is decrypted using the row key, thereby obtaining the data such as 'Jhon'. Similarly, after a row key (encrypted data) corresponding to each row is decrypted using a basic key, the original data is obtained by decrypting the data of each row using the row key. As shown in FIG. 20(c), after the data of each row of the item 'name' is decrypted using each row key, data matching 'Jhon' input as retrieving data is retrieved from the decrypted data. Thus, it is determined that the data corresponding to the code number of '1001' exists.

Thus, when a database is encrypted, a predetermined column item used in a retrieving process is encrypted using a common column key so that the retrieving data can be encrypted using the common column key in the retrieving process, and compared with the encrypted data in the database, thereby realizing a high-speed retrieving process. Furthermore, a column item other than the predetermined column item is encrypted using a key specific to each row, and the row key is encrypted using a basic key, thereby complicating the decryption of the keys and realizing high security.

According to the fourth embodiment, the present invention is designed in device units, but a database system can be designed in terminal units by dividing the terminals into those for database management and those for database search.

Described below is a database system according to the fifth embodiment of the present invention.

Figure 21:
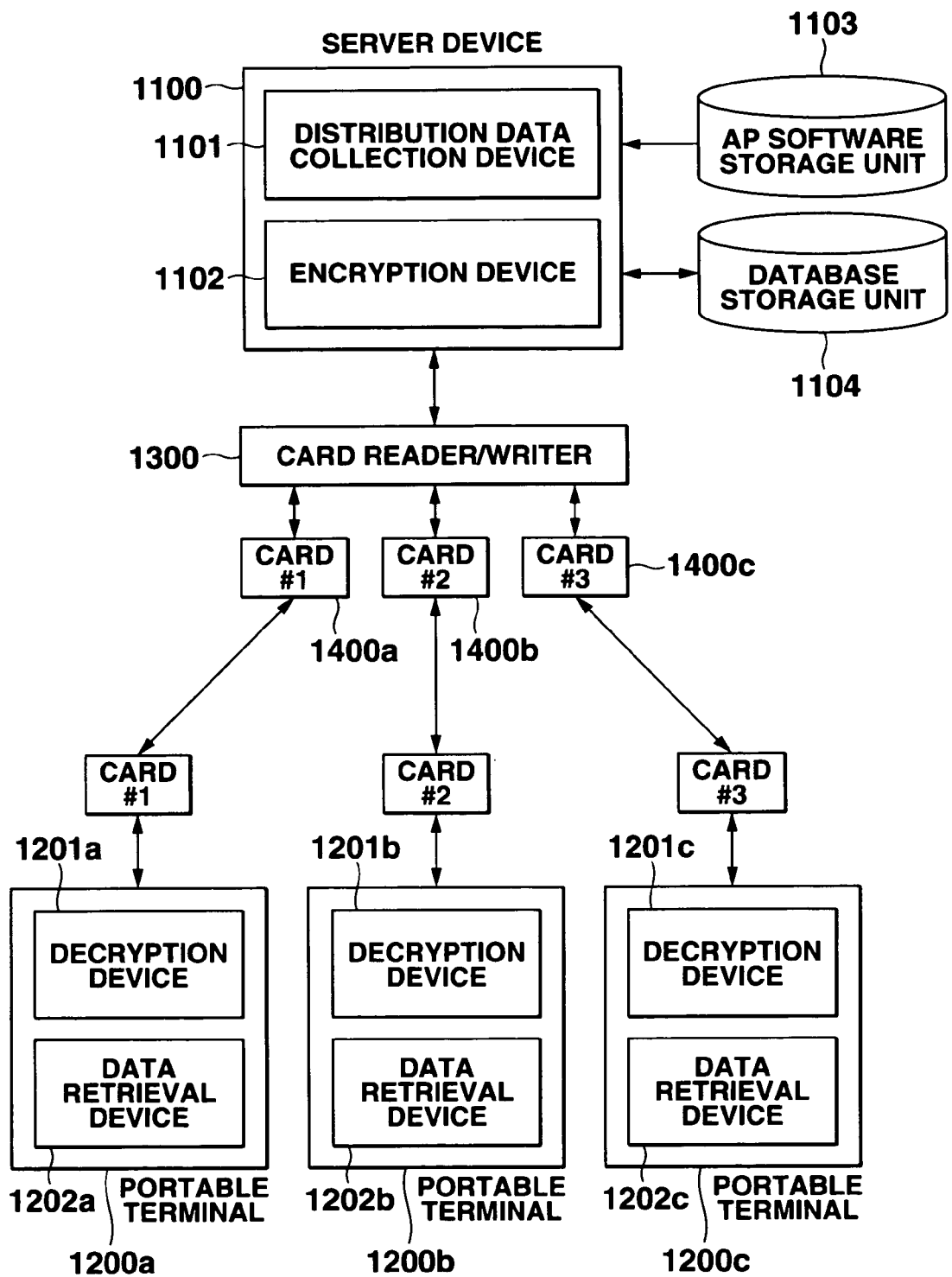
FIG. 21 is a block diagram of the configuration of the database according to the fifth embodiment of the database management apparatus of the present invention.

FIG. 21 is a block diagram of the configuration of the database system according to the fifth embodiment.

The present system comprises a server device 1100 and a plurality of (thee terminals in this example) portable terminals 1200a, 1200b, 1200c, . . . The server device 1100 communicates online with each of the portable terminals 1200a, 1200b, 1200c, . . . , and they communicate data through storage media 1400a, 1400b, 1400c, . . .

The server device 1100 is used as a server computer for providing database services, and comprises a distribution data collection device 1101 for collecting data to be distributed to each terminal, an encryption device 1102 for encrypting a database, a AP software storage unit 1103 for storing various application software (AP), and a database storage unit 1104 for storing various databases. The AP software storage unit 1103 and the database storage unit 1104 can be, for example, a data storage device such as a magnetic disk device, etc. In addition, the server device 1100 can also comprise a display device, an input device, etc. normally provided for a general-purpose computer not shown in the attached drawings.

On the other hand, the portable terminals 1200a, 1200b, 1200c, . . . are used as a client computer for receiving a database from a server device.

The portable terminal 1200a comprises a decryption device 1201a for decrypting an encrypted database, and a database search device 1202a for searching a database. The portable terminals 1200b and 1200c have the similar configuration, and respectively comprise decryption devices 1201b and 1201c, and database search devices 1202b and 1202c. The portable terminals 1200a, 1200b, 1200c, . . . are provided with a medium read device in addition to a display device, an input device, etc. although they are not shown in the attached drawings. These portable terminals 1200a, 1200b, 1200c, . . . are not provided with a browsing function for viewing data online, and are designed to communicate data with the server device 1100 through the storage media 1400a, 1400b, 1400c, . . .

The storage media 1400a, 1400b, 1400c, . . . are portable storage media containing, for example, CF cards (compact flash memory cards). A card reader/writer 1300 is a device for writing and reading data to and from the storage media 1400a, 1400b, 1400c, . . . , and is connected to the server device 1100.

With the configuration, the server device 1100 reads a database specified by an operator from among various databases in the database storage unit 1104, and encrypts it through the encryption device 1102. In this case, the encryption device 1102 encrypts the database in the method similar to that used in the fourth embodiment. That is, a predetermined column item used in a retrieving process is encrypted using a common column key while column items other than the predetermined column item are encrypted using a different key for each row, and the row key is encrypted using a basic key.

Figure 22:
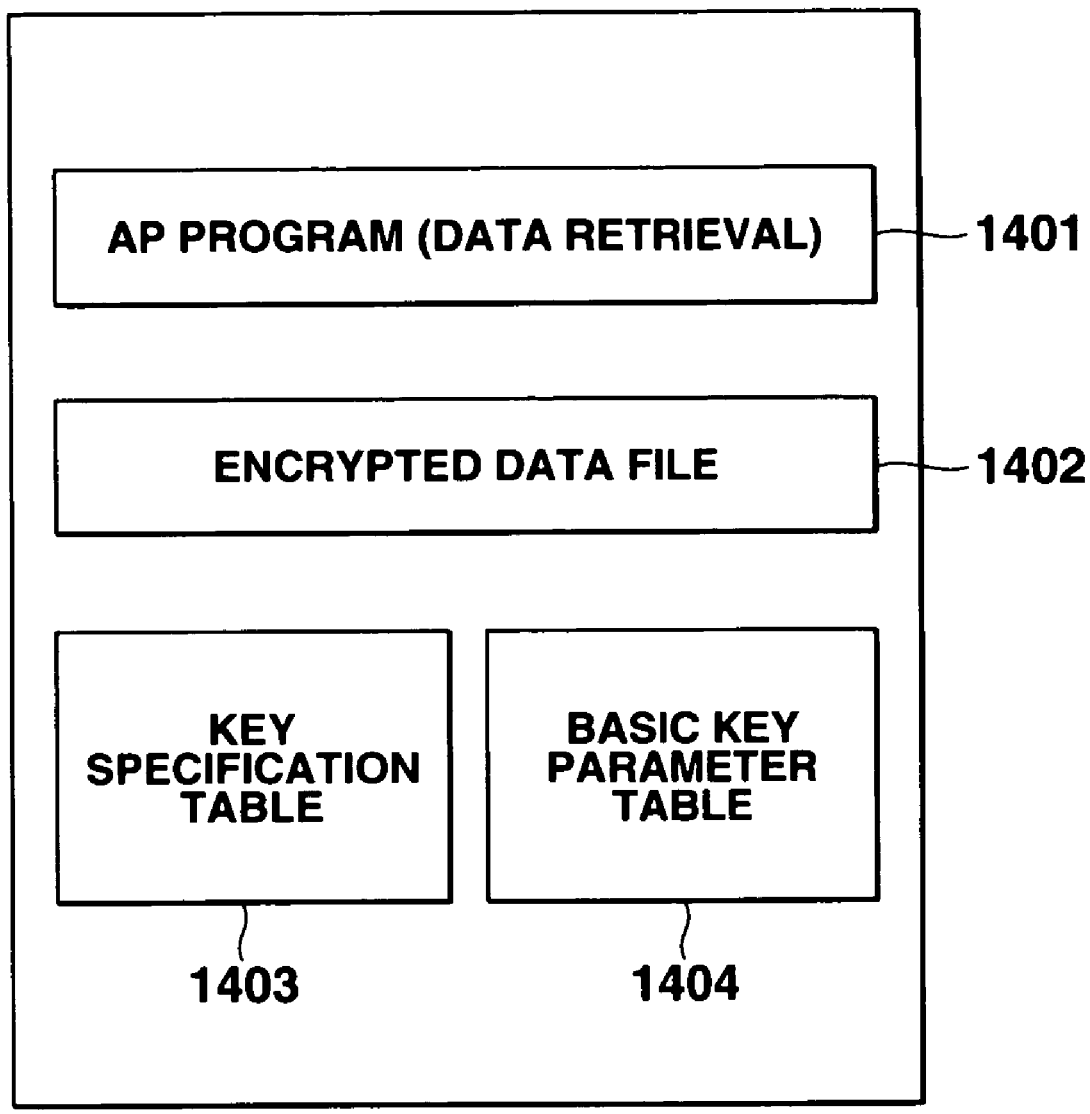
FIG. 22 shows the contents of the data of the storage medium used in the database system.

The database encrypted by the encryption device 1102 is stored in a file, and the encrypted data file is stored in the storage media 1400a, 1400b, 1400c, . . . such as a CF card, etc. using the card reader/writer 1300. In this case, when an encrypted data file is stored in the storage media 1400a, 1400b, 1400c, . . . , a key specification table 1403, a basic key parameter table 1404, and a application program 1401 are stored in addition to an encrypted data file 1402 as shown in FIG. 22.

The key specification table 1403 is a table storing the type (non-encryption, a row key, a column key) of encryption system defined for each column (field) of a database, and has the configuration similar to that of the key specification table 416c according to the fourth embodiment (refer to FIG. 15). The basic key parameter table 1404 is a table in which a parameter value of a basic key is entered, and has the configuration similar to that of the basic key parameter table 416a according to the fourth embodiment (refer to FIG. 13). The key specification table 1403 and the basic key parameter table 1404 are stored in the encryption device 1102. The application program 1401 is used when a database is searched, and is stored in the AP software storage unit 1103.

The storage media 1400a, 1400b, 1400c, . . . are respectively distributed to the portable terminals 1200a, 1200b, 1200c, . . . Each user can retrieve data by inserting the distributed storage media 1400a, 1400b, 1400c, . . . in his or her own terminal.

That is, for example, the portable terminal 1200a inserts the distributed storage medium 1400a, and reads the key specification table 1403 and the basic key parameter table 1404 in addition to the application program 1401 and the encrypted data file 1402 stored in the storage medium 1400a for the data retrieving process. Then, the application program 1401 for a data retrieving process is activated, a predetermined column item is specified, the encrypted data file 1402 is retrieved, and the data obtained as a result of the retrieval is decrypted and displayed.

A data retrieving process is performed by the database search device 1202a provided in the portable terminal 1200a. The database search device 1202a is operated according to the application program 1401, and is similar to the database search device according to the fourth embodiment. Data is decrypted by the decryption device 1201a. The decryption device 1201a performs a database decrypting process as in the fourth embodiment by referring to the key specification table 1403 and the basic key parameter table 1404.

Thus, if a database system is designed with a database management terminal independent of a database retrieval terminal, then a customer managing database can be encrypted and stored in a storage medium, and then distributed to a sales person. Thus, the sales person can use another terminal to retrieve data. In this case, since the database stored in the storage medium is encrypted in the above mentioned method, the security of the data can be guaranteed. The storage medium stores not only an encrypted data file, but also a data retrieving application program. Therefore, it is not necessary for a portable terminal to be provided with a data retrieving application program, and the system can be realized with a simple portable terminal.

According to the database management apparatus, the data of a column item other than a predetermined column item used when a retrieving process is performed is encrypted using a different key for each row, and the key used when the column item is encrypted is encrypted using another key, thereby complicating the decryption of a key and realizing high security.

Described below is the encryption/decryption system used in the database management apparatus.

Figure 23:
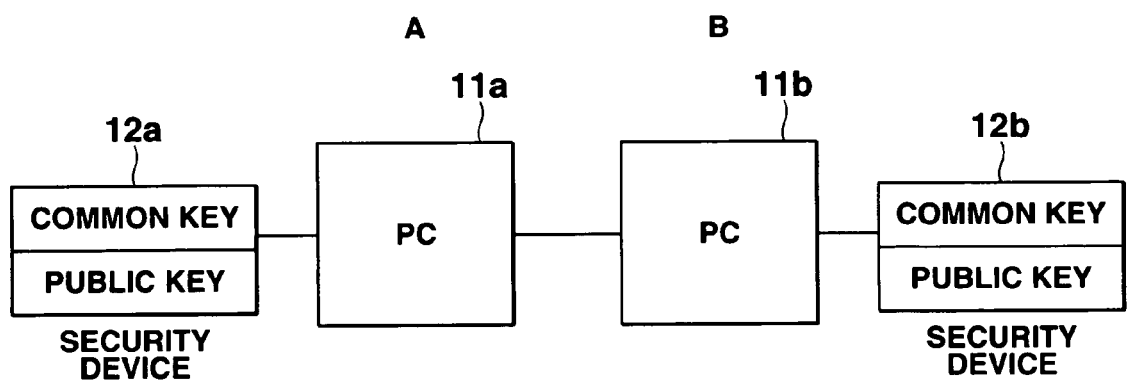
FIG. 23 shows the configuration of the system for performing encrypted data communications according to an embodiment of the present invention.

FIG. 23 shows the concept of the configuration of an encrypted data communications system. In FIG. 23, 11a and 11b are personal computers (hereinafter referred to as PCs), and 12a and 12b are security devices. In this example, data communications are established between the PC 11a of a user A and the PC 11b of a user B.

The PCs 11a and 11b are general-purpose computers, and they can be respectively connected to the security devices 12a and 12b. The security devices 12a and 12b comprises IC cards. Information is written to the security devices 12a and 12b when they are delivered from their factory. The information includes the production number of an IC card, the user ID of each member of a group, and an encryption key (private key P1, P2). The information is common among the members of a group, and is not public.

Figure 24:
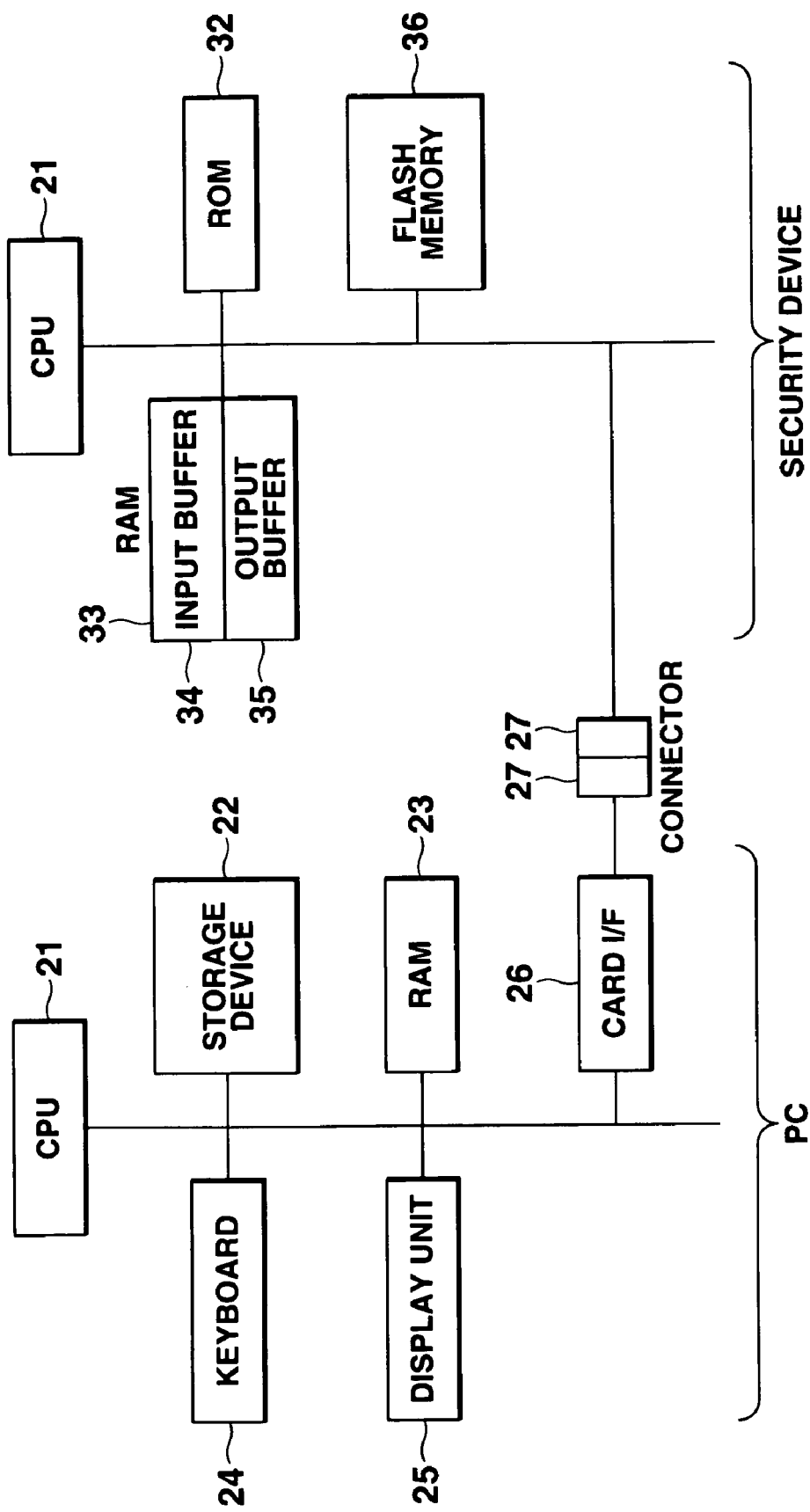
FIG. 24 is a block diagram of the configuration of the circuit of the PC the security device used in the system.

FIG. 24 is a block diagram of the configuration of the circuit of the PC 11a and the security device 12a. The PC 11b and the security device 12b have the same configurations as the PC 11a and the security device 12a.

The PC 11a is a general-purpose computer comprising a CPU 21, and processes data by invoking a primary program. To the CPU 21, a storage device 22, RAM 23, a keyboard 24, a display unit 25, and a card I/F (interface) 26 are connected through a system bus.

The storage device 22 comprises, for example, a hard disk device, a floppy device, a CD-ROM device, etc., and stores various data, programs, etc. In this example, it stores plaintext data to be encrypted, an authentication file described later, etc. In addition, a program stored in a storage medium (a disk, etc.) is installed in the storage device 22. The CPU 21 reads a program installed in the storage device 22, and performs a process according to the program.

The RAM 23 functions as the primary memory of the apparatus according to the present invention, and stores various data required to perform the process for the apparatus. The keyboard 24 is an input device for inputting data and issuing an instruction of various functions. The display unit 25 comprises, for example, a CRT (cathode ray tube), an LCD (liquid crystal display), etc., and is a display device for displaying data.

The card I/F 26 is connected to the security device 12a through a connector 27, and controls input and output of data to and from the security device 12a.

The security device 12a comprises an IC card and a CPU 31, and processes data by invoking a secondary program. ROM 32, RAM 33, and flash memory 36 are connected to the CPU 31 through a system bus.

The ROM 32 stores a secondary program for realizing the function as the security device 12a. The RAM 33 stores various data required for a process performed by the security device 12a. In this example, it comprises an input buffer 34 for temporarily storing data transmitted from the PC 11a, and an output buffer 35 for temporarily storing data to be transmitted to the PC 11a.

Figure 25:
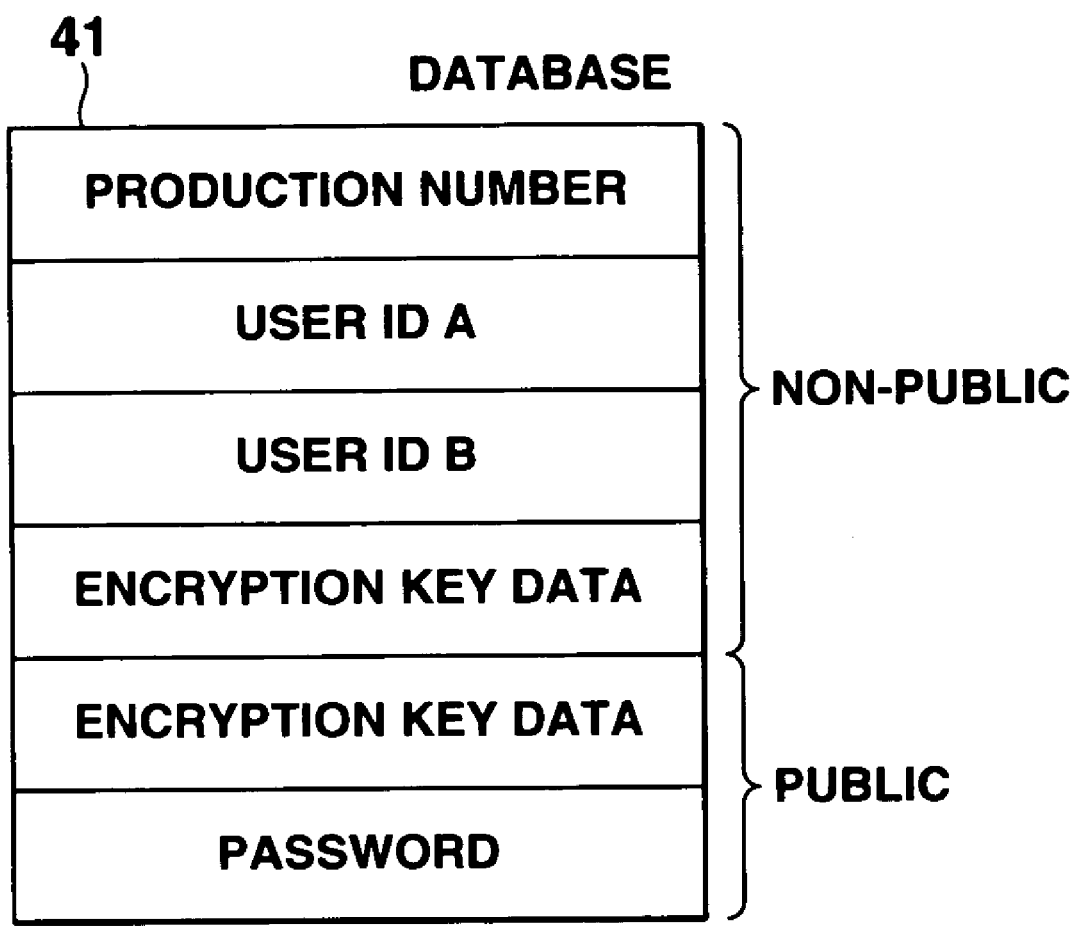
FIG. 25 shows the configuration of the database of the security device.

Flash memory 36 is used as a storage device for storing a database 41 shown in FIG. 25. As shown in FIG. 25, the database 41 comprises information (non-public information) common among the members and information (public information) specific to each member. The information (non-public information) common among the members includes a production number, the user ID of each member of the group, and encryption key data (private key P1, P2). The information (public information) specific to each member includes encryption key data (public key P3, P4), and a password. The password is used as a part of the public key.

A connector 37 is used to electrically connect the security device 12a to the PC 11a. Briefly described below are the operations performed when encrypted data communications are set in the system shown in FIG. 23.

First, the security devices 12a and 12b used as IC cards are transmitted to each member of a group. The security devices 12a and 12b are provided with the database 41 in which a production number, the user ID of each member of a group, and the encryption key data (private key P1, P2) are entered in advance.

Each member writes the encryption key (public key P3, P4) and a password to the security devices 12a and 12b. The written information is stored in the public portion of the database 41.

When encrypted data is transmitted from the PC 11a to the PC 11b, each member (users A and B) inserts the security devices 12a and 12b respectively to the PCs 11a and 11b to perform an encrypting process. In this case, according to the present invention, the encryption algorithm is based on the generation of a vector described later.

At this time, the parameter (hereinafter also referred to as a 'constant') for determination of a nonlinear function for generation of the vector is determined by an encryption key (private and public keys). The encrypted document is transmitted together with a public key to a correspondent. On the reception side, using the received public key and the receiver's private key, the encrypted document is decrypted using a vector generated using the same nonlinear function.

Described below is the operation according to the embodiment. In this embodiment, by referring to the PC 11a and the security device 12a shown in FIG. 23, the operations of the processes are described in each of the two modes of (a) user entry, and (b) data encryption.

(a) User Entry

First, a user makes a user entry when the usee established encrypted data communications using the security device 12a. That is, a member assigned the security device 12a (IC card) enters information about the public portion shown in FIG. 25 in his or her own PC 11a.

Figure 26:
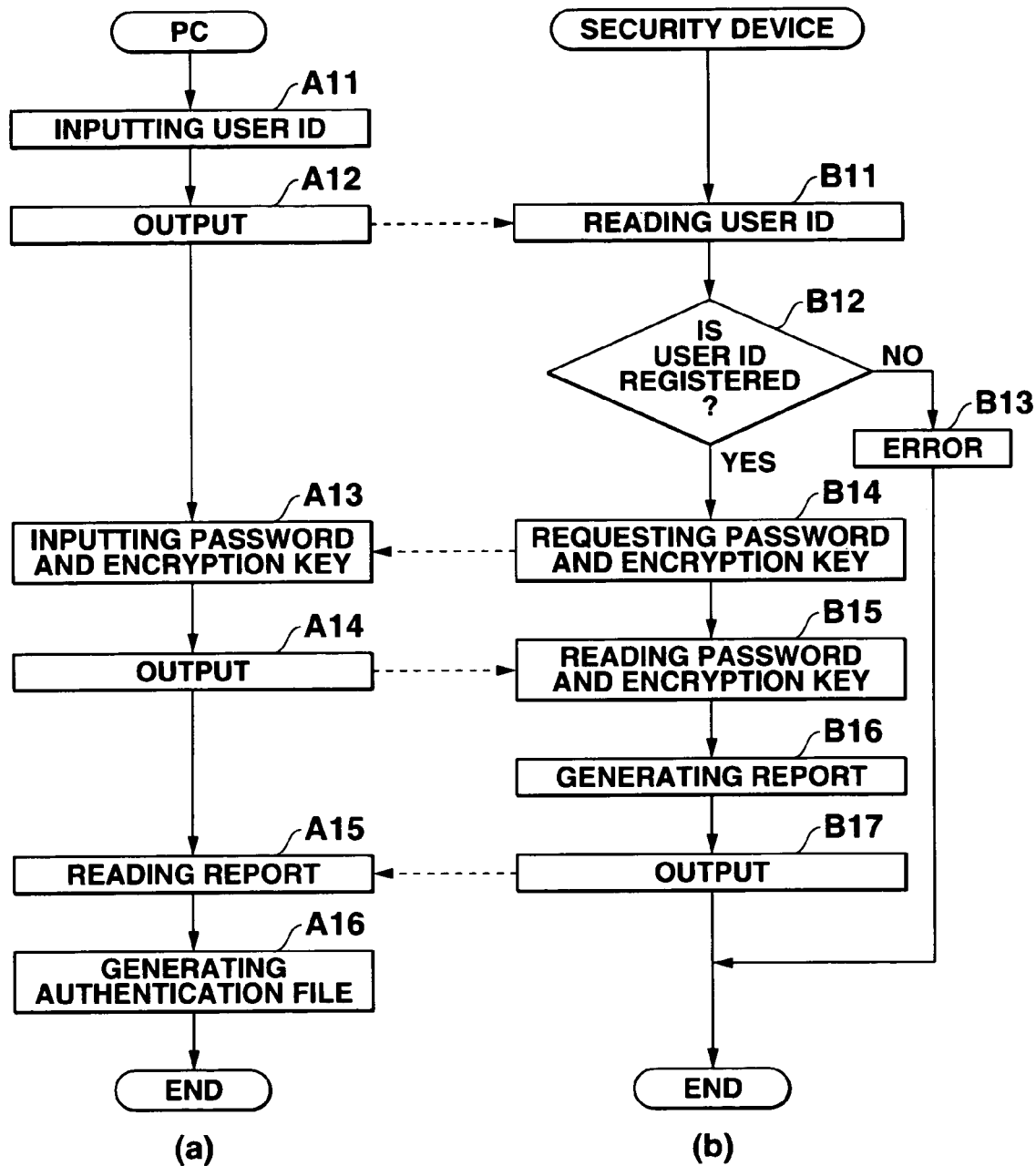
FIG. 26 is a flowchart of the operations of the process of the PC and the security device when a user entry is made in the embodiment.

FIGS. 26(a) and 26(b) are flowcharts of the operations of the processes of the PC 11a and the security device 12a performed when a user entry is made.

A user inputs user authentication data in the PC 11a through the primary program on the PC 11a (step A11). In this case, the user authentication data refers to a user ID. The primary program transfers the input user ID to the input buffer 34 of the security device 12a (step A12). Then, it passes control to the secondary program on the security device 12a.

On the security device 12a side, when the secondary program confirms that the data is stored in the input buffer 34, it reads the data (step B11). Then, the secondary program accesses the flash memory 36 of the security device 12a, and checks whether or not the user ID input as the user authentication data has been entered in the database 41 stored in the flash memory 36. As a result, if the user ID has not been entered in the database 41 (NO in step B12), then it is determined that the user is not a member of the group, and the process terminates (step B13).

If the user ID has been entered in the database 41 (YES in step B12), then it is determined that the user is a member of the group, and the user is requested through the PC 11a to enter his or her password and encryption key (public key)(step B14).

In response to the request, the user inputs his or her password and encryption key (public key) (step A13). The primary program on the PC 11a transfers the input password and the encryption key (public key) to the input buffer 34 of the security device 12a (step A14). The password is used as a part of a public key.

When the password and encryption key (public key) are input from the user authenticated as a group member, the secondary program of the security device 12a reads the input information, encrypts it as necessary, and writes the result to the public portion of the database 41 stored in the flash memory 36 (step B15).

At this time, the nonlinear function used by a user in an encrypting process is determined. A plurality of constants used in the function are fixed by a key. According to an embodiment of the present invention, a multidimensional vector generation function is used as a nonlinear function, which is described later in detail.

After processing the information, the secondary program generates a report of the database 41 (step B16), stores it in the output buffer 35 of the security device 12a, and passes control to the primary program (step B17).

To the above mentioned report, the encrypted data to be used by the primary program when a user authenticating process is performed is written. On the PC 11a side, the primary program confirms that data is stored in the output buffer 35 of the security device 12a, reads the data, and writes it as file data to the storage device 22 (step A15). The written file data is processed as an authentication file, and is used for a user authentication check when encrypted data communications are hereinafter established (step A16).

(b) Data Encryption

Data encryption refers to actually encrypting and transmitting a document.

Figure 27:
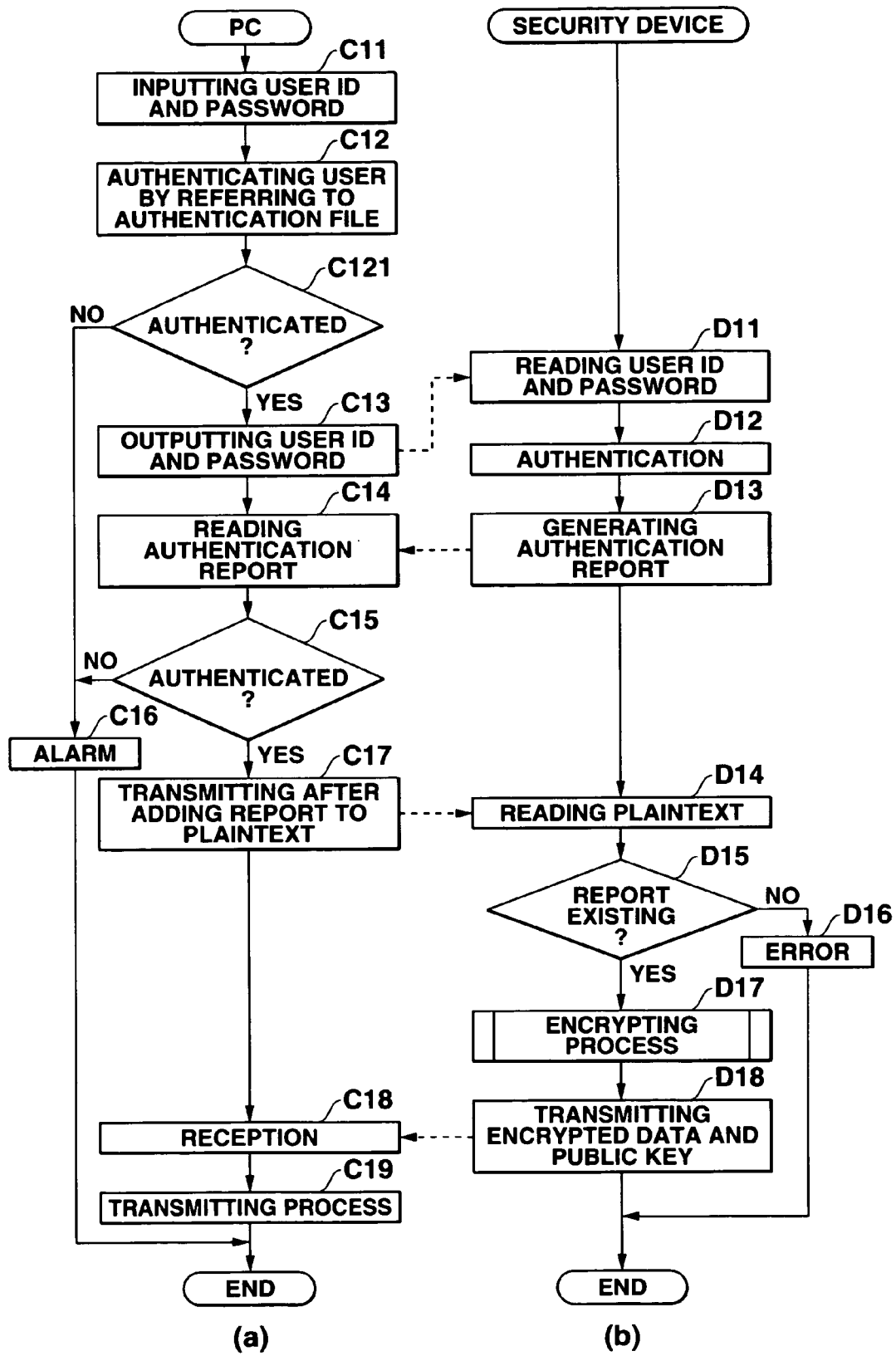
FIG. 27 is a flowchart of the operations of the process of the PC and the security when data is encrypted in the embodiment.

FIGS. 27(a) and 27(b) are flowcharts of the operations of the processes performed by the PC 11a and the security device 12a when data is encrypted. A user inputs his own user ID and password with the security device 12a (IC card) inserted in the PC 11a. By inputting the user ID and password, the primary program of the PC 11a refers to the authentication file, and authenticates the user (step C12).

If the user is not a registered user (NO in step C121) as a result of the authentication check (step C121), then the primary program enters a termination procedure (step C16). If the user is a registered user (YES in step C121), then the primary program transmits the input user ID and password to the security device 12a (step C13).

On the security device 12a, the secondary program reads the user ID and password (step D11). Then, the secondary program compares the information with the contents of the database 41 in the flash memory 36, and authenticates the user (step D12).

As a result of the user authentication check, the secondary program generates an authentication report indicating whether or not the user has been registered in the security system, transfers the authentication report to the security device 12a, and passes it to the primary program of the PC 11a (step D13).

On the PC 11a side, the primary program reads the authentication report transmitted from the security device 12a, and confirms that the user has been authenticated on the security device 12a side (step C14).

If the user is rejected in the user authentication check, that is, if the authentication report indicates that the user is not a registered user (NO in step C15), then the primary program of the PC 11a notifies the user of it, and terminates the process (step C16).

If the user is confirmed as a registered user in the user authentication check, that is, if the authentication report indicates that the user is a registered user (YES in step C15), then the primary program of the PC 11a performs the following encrypted data communications.

That is, the primary program reads the plaintext data (generated document) to be encrypted from the storage device 22, transfers it with the authentication report added to it to the input buffer 34 of the security device 12a, and passes control to the secondary program of the security device 12a (step C17).

A authentication report is added to the plaintext data to allow the security device 12a to confirm that the document has been received from the registered user authenticated by the security device 12a.

On the security device 12a side, the secondary program reads the plaintext data transmitted from the PC 11a (step D14). If no authentication report is added to the plaintext data (NO in step D15), then it is determined that the document is not received from a registered user, thereby terminating the process (step D16).

On the other hand, if an authentication report is added to the plaintext data (YES in step D15), then it is determined that the document is received from a registered user, and the secondary program encrypts the plaintext data by the encryption system using a multidimensional vector described later (step D17). Then, the secondary program stores a decryption key (public key) and encrypted data (encrypted document) in the output buffer 35 of the security device 12a, and transmits them to the PC 11a (step D18).

The primary program of the PC 11a receives the decryption key and the encrypted data (encrypted document) (step C18), outputs them as a file in the storage device 22 of the PC 11a, or passes control to the communications software such as electronic mail, etc., and transmits them externally (to the PC 11b shown in FIG. 1)(step C19).

Described below are the operations of the encrypting process performed by the security device 12a.

FIG. 28A is a flowchart of the operations of an encrypting process.

The plaintext data (message data) to be encrypted is defined as M (step E11). The data M is binary data. The secondary program of the security device 12a first applies a scramble 1 in bit units to the data M (step E12). The obtained data is defined as M' (step E13).

The secondary program XORs (obtains an exclusive logical sum) by adding the data M' to the random numbers generated mathematically and sequentially, and then performs an encrypting process (step E14). At this time, a generation function of a multidimensional vector r is used as a random number generation function. In this case, the function for generation of the multidimensional vector r, or a constant used for the function is determined by an encryption key (private and public keys).

That is, the secondary program reads a private key (P1, P2) and a public key (P3, P4) from the database 41 when an encrypting process is performed, generates a multidimensional vector r according to the function using the encryption keys as a parameter constant, and performs a logical operation such as M' XOR r, thereby performing an encrypting process. Thus, the obtained encrypted data is defined as C (step E15).

Figure 29:
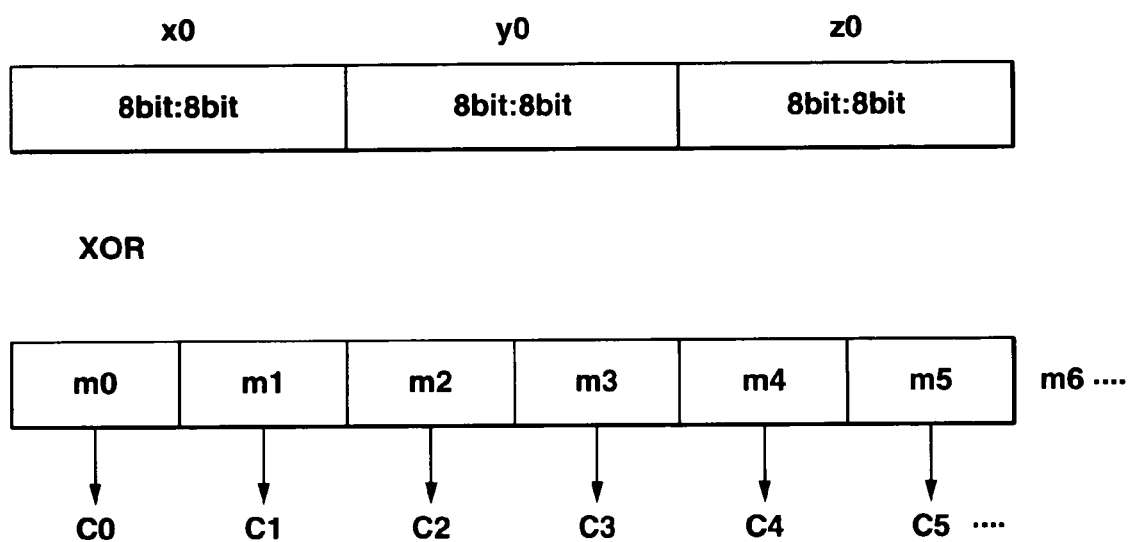
FIG. 29 shows the method of encryption operations using multidimensional vectors according to the present invention.

Practically, assume that, as shown in FIG. 29, r is a three-dimensional vector (x, y, z) and the computation precision of the vector components x, y, and z is 16 bit. According to the equation (1) described later, the three-dimensional vectors r (x, y, z) are sequentially generated as r0, r1, r2, r3, When the data M is given as m0 m1 m2 m3 m4 m5 m6 . . . as a sequence of 8-bit data (a character string having 8 bits for each character), M is decomposed in two-element (8 bits) units based on the computation precision (16 bits). If the three-dimensional vector is r0, then the data M and r0 (x0, y0, z0) are XORed (obtained as an exclusive logical sum), thereby performing computation by (x XOR m0 m1)(y XOR m2 m3)(z XOR m4 m5) . . . , etc. As a result of the computation, the encrypted data C such as C0 C1 C2 C3 C4 C5 etc. can be obtained.

The secondary program furthermore applies a scramble 2 in bit units to the data C obtained as described above (step E16). The obtained data is defined as C', and output as the final encrypted data (step E17).

In the above mentioned process, the unreadableness level of illegal deciphering can be raised by repeatedly performing the similar encrypting process with the C' defined as M'. If the form of the function for generation of the multidimensional vector r is changed, the unreadableness level can be furthermore raised.

Described below is the operation of the decrypting process performed by the security device 12*a*.

FIG. 28B is a flowchart of the operation of the decrypting process.

The decrypting process can be performed simply by inversely performing the encrypting process. That is, assuming that the encrypted data is defined as C' (step F11), the secondary program of the security device 12*a* first applies an inverse scramble 2 which is inverse to the scramble 2 applied in the encrypting process in bit units onto the data C (step F12). Thus, the data C can be obtained as the data before applying the scramble 2 (step F13).

Then, the secondary program decrypts the data C by performing a computing process such as C XOR r, etc. (step F14), thereby obtaining the data M' before performing an encrypting process (step F15).

The secondary program applies an inverse scramble 1 which is inverse to the scramble 1 applied in the encrypting process in bit units onto the data M1 (step F12). Thus, the data can be obtained as the data before applying the scramble 1, that is the plaintext data M can be obtained (step F17).

If the process of repeating an encrypting process with the C' defined as the M', changing the form of a function for generation of a multidimensional vector r, etc. has been added in the encrypting process, then a decrypting process is performed corresponding to the added process.

According to the present invention, a set P of parameters (constants) determining the function for a multidimensional vector r in the encrypting process performed using a multidimensional vector r is divided into two portions, and expressed as follows.

$$P=\{Ps, Pp\}$$

where Ps is a private parameter, and corresponds to the encryption key (private key P1, P2) stored in the non-public portion of the database 41, and Pp is a public parameter, and corresponds to the encryption key (public key P3, P4) stored in the public portion of the database 41. Ps together with Ps is used in authenticating a user, and encrypting and decrypting data.

According to the present embodiment, there are two Ps and two Pp, but it is obvious that the number of parameters is not limited to this application.

Described below is the encryption system according to an embodiment of the present invention.

Assume that the vector in the n(n≧1)-dimensional space is r, and the matrix sequentially generating new vectors $r_j$(j=0, 1, 2, 3, . . . ) from the initial value $r_0$ is R. At this time, the vector $r_j$ is expressed by a nonlinear function of the following quation (1).

$$r_j = a \cdot R(P, r_{j-1}) r_{j-1} + c \qquad (1)$$

where a is an appropriate constant coefficient, P is a set of constants used in the matrix, and an encryption key (private key P1, P2) stored in a non-public portion of the database 41 and an encryption key (public key P3, P4) stored in a public portion of the database 41 are used. c is a constant vector for spatial translation of a vector.

In equation (1) above, the coefficient a sets a condition for each vector to be in the closed space area of a multidimensional space when an appropriate restriction (for example, |R|≦1) is placed on the matrix R. The constant vector c guarantees that the vector $r_j$ will not converge into a trivial point (for example, an insignificant point having r=0) (c=0 is obviously allowed).

In the n-dimensional space, the vector r has n components (r=(x1, x2, . . . , xn)). In computation, a numeral data is generally represented by the precision of bit length (m) (for example, 8 bytes or 64 bytes) as defined by a compiler. Therefore, if the vector r cannot be regenerated with data precision of n×m at a moment in the sequential vector generation method, the subsequent vector r cannot be correctly regenerated (or the matrix R is so defined). This holds true with the initial value $r_0$ of the vector r. That is, only when the initial value $r_0$ can be regenerated with data precision of n×m, the subsequent vectors $r_1$, $r_2$, $r_3$, . . . can be guaranteed.

In the encrypting process according to an embodiment of the present invention, one or more components, depending on the defined data length, of the vector r obtained in the equation (1) above are arranged, and are XORed (processed in an exclusive logical operation) on each bit with the character string (normally 8 bits per character) corresponding to the total bit length. This is referred to as the first encrypting process which has been described above by referring to FIG. 29.

The procedure can be performed in a duplex process as a countermeasure against decryption. In this case, the matrix R of the equation (1) above can be changed again to generate a new vector so that another encrypting process can be performed in the same method as the first encrypting process. This is referred to as the second encrypting process.

In a practical example, n equals 2 (n=2). First, R is defined as an operation in which $r_{j-1}$ rotates by θ round the normal set on the plane. The R is a matrix of 2×2, and can be represented as follows.

$$R(\theta) = \begin{pmatrix} \cos\theta & -\sin\theta \\ \sin\theta & \cos\theta \end{pmatrix} \quad (2)$$

In this case, $\theta$ is a kind of parameter. That is, the parameter is given as a function of $r_{i-1}$ and can be represented by the following equation.

$$\theta(r)=f(P,r) \quad (3)$$

At this time, the transformation represented by the equation (2) above can be formally represented by the equation (1) above. In this case, the nonlinearity complicates the vector generating process.

In the equation (3) above, P is defined as a set of constants used in the nonlinear function f, and the encryption key (private key P1, P2) stored in the non-public portion of the database 41 and the encryption key (public key P3, P4) stored in the public portion of the database 41 are used.

Thus, by using the vectors r sequentially generated in a multidimensional space in an encrypting process, the encrypting process can be performed independent of the precision or performance of a computer as compared with such an encrypting process as the RSA.

In addition, an application can be easily added and amended. Furthermore, the present embodiment disables a decrypting process to be successfully performed because of the constant coefficient a, the constant P (private and public keys), the constant vector c, and the initial value $r_0$ of the vector all of which should be completely obtained in a decrypting process.

For example, assuming that the P contains five constants with a three-dimensional vector, the number of values to be given as the initial value $r_0$ can be obtained by the following equation.

$$1(A)+5(P)+3(r0)+3(c)=12$$

If each of the values is a 8-digit real number, then all vectors can be regenerated at the probability of $10^{-96}$. The probability nearly equals 0, thereby hardly permitting successful decryption.

Furthermore, in the method according to the present invention, it is necessary to explicitly indicate the function f for determining E of the rotation matrix R ($\theta$), thereby furthermore complicating illegal decryption.

Additionally, according to the above mentioned embodiment, a vector is generated using a function determined by defining a private key and a public key, but a vector can also be generated using a function determined by defining at least a public key.

Furthermore, each constant (a, P, c) for determination of a function used to generate a vector is fixed when it is used, and the function is also fixed. However, a constant for determination of a function can be dependent on a password (an encryption key to be used as a part of a public key) as described below.

It is possible to allow each constant for determination of a function to be dependent on a password in an encrypting process in which the function can be determined such that vectors sequentially generated in a closed area of the $n(n \geq 1)$-dimensional space cannot match each other. The password is used as a part of a public key. The function should be fixed. That is, in the equation (1) above, $a \rightarrow a(K)$ $P \rightarrow P(K)$ $c \rightarrow c(K)$ where a is a constant coefficient, P is a set of constants (private and public keys) to be used in a matrix, c is a constant vector for spatial translation of a vector, and K is a password.

The password K is input by a user, and is stored in the public portion of the database 41. The secondary program reads the password K from the database 41, and determines each constant (a, P, c) of the equation (1) above based on the password K. Then, using the function based on the constants, a multidimensional vector is generated, and data is encrypted.

Thus, by making each constant for determination of a function dependent on a password, the security of the encryption can be improved as compared with the case where each constant is fixed.

It is also possible in an encrypting process where vectors defined in the closed area of a $n(n \geq 1)$-dimensional space are sequentially generated, and a function is set such that generated vectors cannot match each other, each constant for determination of the function can be dependent on a password and a real time. A password is used as a part of a public key. The function is fixed. That is, in the equation (1) above, $a \rightarrow a(K,t)$ $P \rightarrow P(K,t)$ $c \rightarrow c(K,t)$ where a is a constant coefficient, P is a set of constants (private and public keys) to be used in a matrix, c is a constant vector for spatial translation of a vector, K is a password, and t is a real time.

The password K is input by a user, and is stored in the public portion of the database 41. The secondary program reads the password K from the database 41, and determines each constant (a, P, c) of the equation (1) above based on the password K, and the real time t. Then, using the function based on the constants, a multidimensional vector is generated, and data is encrypted.

Thus, by making each constant for determination of a function dependent on a password, and additionally making each constant depending on a real time, each constant depends not only on a password, but also on a real time, thereby furthermore improving the security of the encryption.

It is also possible in an encrypting process where vectors defined in the closed area of a $n(n \geq 1)$-dimensional space are sequentially generated, and a function is set such that generated vectors cannot match each other, each constant for determination of the function can be dependent on a password and a real time, and additionally the selection of function matrix can be dependent on a password. A password is used as a part of a public key. That is, in the equation (1) above, $a \rightarrow a(K,t)$ $P \rightarrow P(K,t)$ $c \rightarrow c(K,t)$ and $R \rightarrow R_K$ where a is a constant coefficient, P is a set of constants (private and public keys) to be used in a matrix, c is a constant vector for concurrent movement with a vector, K is a password, t is a real time, and R is a matrix.

The password K is input by a user, and is stored in the public portion of the database 41. The secondary program reads the password K from the database 41, and determines each constant (a, P, c) of the equation (1) above based on the password K, and the real time t.

The secondary program selects the matrix R using these constants depending on the password K. Based on the selected matrix R, a multidimensional vector is generated, and data is encrypted.

Thus, by making each constant for determination of a function dependent on a password, additionally making each constant depending on a real time, and by selecting a matrix depending on a password, each constant depends not only on a password, but also on a real time, and the function using the constants are also selected depending on a password, thereby furthermore improving the security of the encryption.

It is also possible in an encrypting process where vector defined in the closed area of a n(n≧1)-dimensional space are sequentially generated, and a function is set such that generated vectors cannot match each other, each constant for determination of the function can be dependent on a password and a real time. A password is used as a part of a public key. A function type is selected depending on a password and a real time. That is, in the equation (1) above, $a \to a(K,t)$ $P \to P(K,t)$ $c \to c(K,t)$ and $R \to R_{K,t}$ where a is a constant coefficient, P is a set of constants (private and public keys) to be used in a matrix, c is a constant vector for spatial translation of a vector, K is a password, t is a real time, and R is a matrix.

The password K is input by a user, and is stored in the public portion of the database 41. The secondary program reads the password K from the database 41, and determines each constant (a, P, c) of the equation (1) above based on the password K, and the real time t.

The secondary program selects the matrix R using these constants depending on the password K and the real time t. Based on the selected matrix R, a multidimensional vector is generated, and data is encrypted.

Thus, by making each constant for determination of a function dependent on a password, additionally making each constant depending on a real time, and by selecting a matrix depending on a password, each constant depends not only on a password, but also on a real time, and the function using the constants are also selected depending on a password and a real time, thereby furthermore improving the security of the encryption.

It is also possible in an encrypting process where vectors defined in the closed area of a n(n≧1)-dimensional space are sequentially generated, and a new function is generated by linearly combining a plurality of functions such that the generated vectors cannot match each other, a constant for determination of the function can be dependent on a password and a real time. A password is used as a part of a public key. A function type is selected depending on a password and a real time. Furthermore, a linear combination coefficient is dependent on a password and a real time.

That is, assuming that a matrix generating a new vector $r_j$ (j=0, 1, 2, 3, . . . ) from the initial value $r_0$ of the vector r in a n(n≧1)-dimensional space is $R_d$ (d=0, 1, 2, 3, . . . ), a new vector can be generated by the following equation.

$$r_j = \sum_d W_d(K, t)\{a_d(K, t)R_{d,K,t}(P_j(K, t), r_{j-1}) + c_j\} \quad (4)$$

In the equation (1) above, a is a constant coefficient, P is a set of constants (private and public keys) to be used in a matrix, c is a constant vector for spatial translation of a vector, K is a password, t is a real time, R is a matrix, and W is a linear combination coefficient.

The password K is input by a user, and is stored in the public portion of the database 41. The secondary program reads the password K from the database 41, and determines each constant (a, P, c) of the equation (4) above based on the password K, and the real time t. The secondary program selects a matrix R obtained by linearly combining a plurality of matrices.

The linear combination coefficient $W_d$ used in the matrix R is determined by the password K and the real time t. Depending on the selected nonlinear function (4), a multidimensional vector is generated to encrypt data.

Thus, using a new matrix obtained by linearly combining a plurality of matrices, a constant determining each matrix is made to be dependent on a password and a real time, matrix selection is made to be dependent on a password and a real time, and a linear combination coefficient is made to be dependent on a password and a real time, thereby furthermore improving the security of encrypted data.

Furthermore, in an encrypting process in which the function can be determined such that vectors sequentially generated in a closed area of the n(n≧1)-dimensional space cannot match each other, the type of function can be optionally defined by a user, and can be dynamically combined with others when it is applied to the main encryption algorithm.

That is, a user-defined function is compiled to a compiled basic encryption program to sequentially generating multidimensional vectors, and the compilation result is used through dynamic linking when the entire program is executed. Thus, a malicious user such as a hacker, etc. can be rejected almost completely.

As described above, vectors defined in a closed area of an n(n≧1)-dimensional space can be sequentially generated, and encrypted data can be generated in a logical operation using plaintext data to be encrypted and the components of the vectors. Therefore, an encrypting process can be performed without high precision or performance required in the RSA method, etc. Furthermore the encrypting process can be performed with high reliability, and with an application easily added or amended. Thus, by applying various keys to a parameter set P in the equation (1), an optional encrypted data communications system can be defined. Therefore, it is sufficient only to describe the encryption/decryption algorithm using a common key (private key). Described below in detail is the encryption/decryption system according to an embodiment of the present invention.

Figure 30:
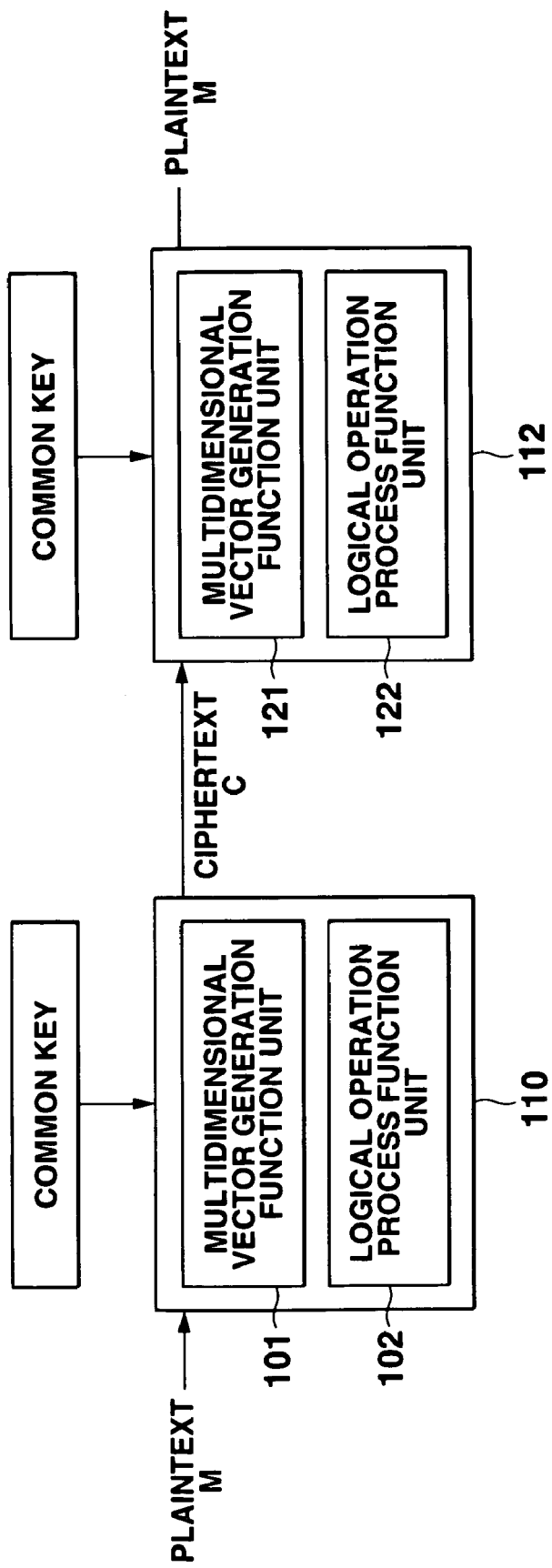
FIG. 30 shows the configuration of the system showing the principle of the encryption/decryption system according to the present invention.

FIG. 30 shows the principle of the encryption/decryption system according to an embodiment of the present invention.

In FIG. 30, the security devices in devices 110 and 112 respectively on the transmission and reception sides, that is, encryption/decryption engines store common keys (private keys). When encrypted data communications are established from one device 110 to another device 112, the primary program of the device 110 passes control to the secondary program of the security device of exclusive hardware.

The security device for performing an encrypting process on the transmission side uses a nonlinear function variable according to a parameter corresponding to a common key. That is, vectors are generated chaotically and sequentially using a nonlinear function for translation and rotation of n-dimensional vectors defined in a closed area of an n-dimensional space, and encrypted data is generated by performing a logical operation in bit units between plaintext data and the generated vectors.

The security device for performing a decrypting process on the reception side generates the vectors as on the transmission side, performs an inverse operation on the generated vectors, and easily decrypts the received encrypted data into the plaintext data.

In the encryption/decryption system according to the present invention, a parameter for determination of a non-linear function used to generate the above mentioned multidimensional vector is secret to the third party. Therefore, according to the present invention, the generation of the n-dimensional vector is determined by defining at least a common key (private key), thereby sequentially generating the n-dimensional vectors using a nonlinear function capable of generating chaos such that each of the generated n-dimensional vectors cannot match each other.

That is, the present invention comprises: a vector generation unit for generating a vector $r_j$ using each component of a vector defined in a closed area of the $n(n \geq 1)$-dimensional space, and an angle $\Omega_n$ determined by a parameter set P in such a way that each of the vectors sequentially generated using a non-linear function (corresponding to equation (1)) containing at least the n-dimensional rotation matrix $R_n(\Omega_n)$ (corresponding to R in equation (1)) for rotation of the vector cannot match each other in the n-dimensional space; in an encrypting process, a binary operation unit for generating encrypted data using a binary operation of plaintext data and the component of the vector generated by the vector generation unit; and, in a decrypting process, an inverse binary operation unit for generating the plaintext data in an inverse binary operation corresponding to an inverse operation of the binary operation using the vector $r_j$ generated by the vector generation unit and the encrypted data.

Especially, the present invention comprises: a rotation matrix generation unit for generating the n-dimensional rotation matrix $R_n(\Omega_n)$ for rotation of the vector using the $(n-1)$-dimensional rotation matrix $R_{n-1}(\Omega_{n-1})$ as an $(n-1)$-dimensional small matrix by using each component of a vector defined in a closed area of the $n(n \geq 1)$-dimensional space, and an angle $\Omega_n$ determined by a parameter set P; a vector generation unit for generating vectors $r_j$ such that each of the vectors $r_j(j \geq 0)$ sequentially generated using a nonlinear function containing at least the rotation matrix $R_n(\Omega_n)$ cannot match each other in the n-dimensional space; and a binary operation unit for generating encrypted data using a binary operation of plaintext data and the component of the vector generated by the vector generation unit.

The encryption/decryption system according to the present invention relates to an encrypting/decrypting process performed when a transmitter and receiver of data establish data communications using a common security device (encryption device).

According to the present encryption system, a data transmitter (encryption side) generates ciphertext by performing a predetermined logical operation (normally, an exclusive logical sum operation) in bit units using a key sequence with which a plaintext data message has been generated based on a predetermined common key. A data receiver (decryption side) obtains an original plaintext by performing a predetermined logical operation (same operation as on the encryption side) in bit units using the same key sequence as on the encryption side based on a predetermined common key.

In this encryption system, a multidimensional vector generation device is used as a random number generation device for generating the above mentioned key sequence. In this case, various parameters and initial state for determination of a vector generation function of the multidimensional vector generation device are provided as common keys FIG. 30 shows an example of the configuration of the encryption system to which the present invention is applied. The encryption device 110 comprises a multidimensional vector generation function unit 101 and a logical operation process function unit 102.

Similarly, the decryption device 112 comprises a multidimensional vector generation function unit 121 and a logical operation process function unit 122.

In FIG. 30, between the encryption device 110 on the encryption side and the decryption device 112 on the decryption side, for example, a common key is distributed using an IC card, etc. in a security state, and the common key is shared. The encryption device 110 on the encryption side generates a multidimensional vector based on the function determined by a predetermined common key, obtains an exclusive logical sum using a plaintext and the component data of the vector as a random number sequence to transform the plaintext message into ciphertext, and transmits the ciphertext to the decryption device 112.

The decryption device 112 which has received the ciphertext generates a vector from the ciphertext through the logical operation process function unit 122 having the same function as the multidimensional vector generation function unit 101 provided in the encryption device 110, obtains an exclusive logical sum of the vector and the generated random number sequence, and restores the original plaintext message.

In addition, since the processes performed by the encryption device 110 and the decryption device 112 are practically the same as each other, the processing devices such as a computer, etc. can have the functions of both encryption device 110 and decryption device 112.

Figure 31:
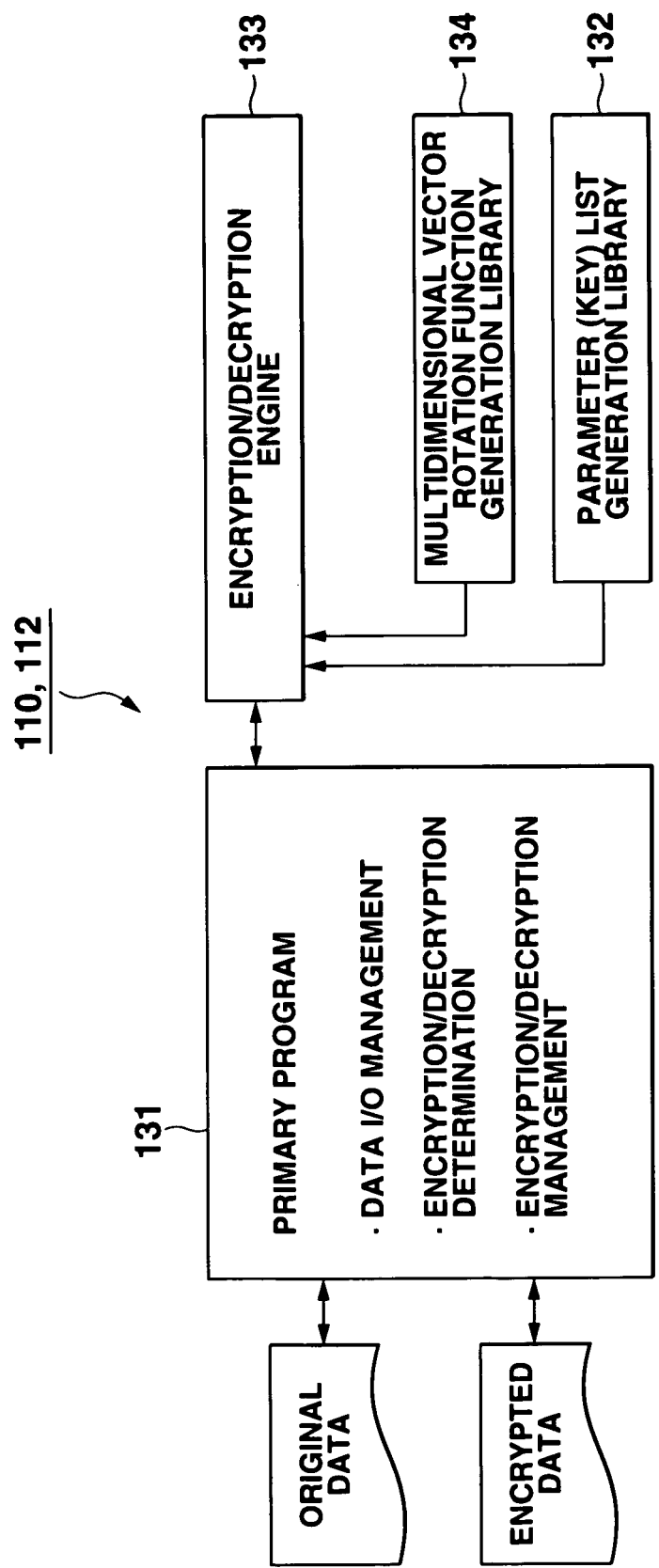
FIG. 31 shows an example of the internal functions of devices 110 and 112 shown in FIG. 8.

FIG. 31 shows the configuration of the encrypting and decrypting programs of the encryption device 110 and the decryption device 112.

A primary program 131 manages input and output of data, determines whether or not the data is to be encrypted or decrypted, and manages the entire encrypting and decrypting processes. A parameter list generation library 132 stores a common key distributed using an IC card, etc. An encryption/decryption engine 133 receives a common key as a parameter from the parameter list generation library 132, generates a rotation vector based on a matrix determined by a multidimensional vector rotation function generation library 134, and encrypts plaintext or decrypts ciphertext using a component of the vector.

Described below in detail is the generation of a multidimensional vector.

Considering the rotation for the vector $r_{j-1}$ defined in a multidimensional (n-dimensional) space, a generalized rotation angle is represented by $\Omega_n$, and the operation corresponding to the rotation is represented by $R_n(\Omega_n)$ as a matrix of n×n. That is, $R_n(\Omega_n)$ acts on $r_{j-1}$, and rotates the vector.

The equation (1) is rewritten into the following equation (5), that is, a general equation of a rotation vector, thereby defining a new vector $r_j$.

$$r_j = a R_n(\Omega_n) r_{j-1} + c \quad (5)$$

where a is a constant satisfying $|a| \leq 1$. c is a n-dimensional constant vector. The equation above indicates that a new vector $r_j$ is generated from the vector $r_{j-1}$ through rotation and spatial translation.

According to the present invention, nonlinear sequence can be generated such that the sequence of generated r vectors cannot be chaotic, that is, the original sequence in a closed space by setting the rotation angle $\Omega_n$ dependent on r. That is, $\Omega_n$ can be formally represented by a function of a parameter P and a vector r as shown in the following equation (6) (corresponding to equation (3)).

$$\Omega_n = \Omega_n(P, r_{j-1}) \quad (6)$$

where P indicates a set of any number of parameters used in the function for $\Omega_n$.

$$P = \{p_i | i = 1, 2, 3, \dots\} \quad (7)$$

For example, in a two-dimensional vector, a two-dimensional rotation angle $\Omega_n$ is represented by the components x and y of the two-dimensional vector $r = (x, y)$ as follows.

$$\Omega_2 = p_1 x + p_2 y + p_3$$

where the parameters $p_1$, $p_2$, and $p_3$ are optionally given.

Figure 32:
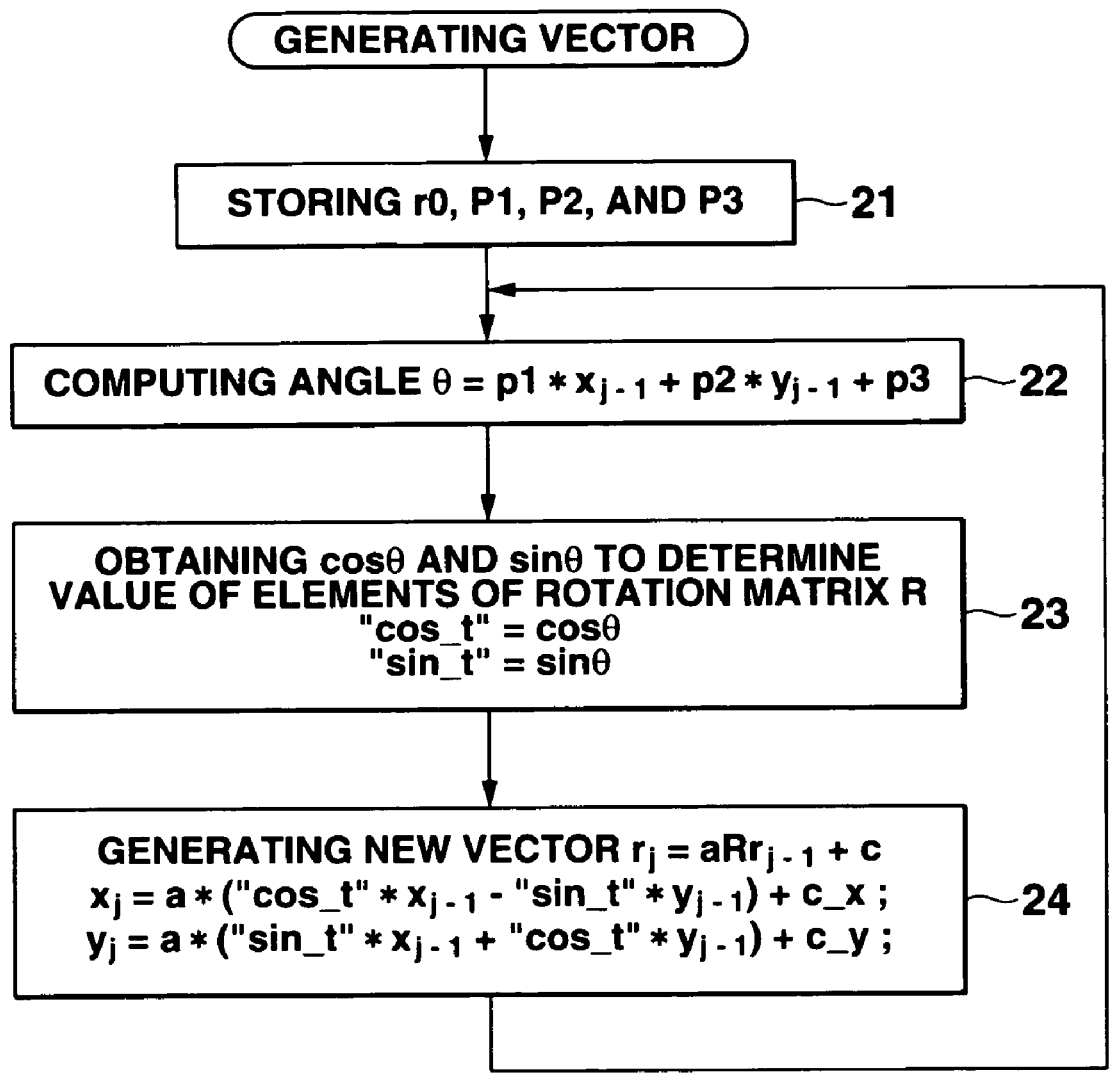
FIG. 32 is a flowchart of the process of generating a multidimensional vector.

The practical operations performed when the above mentioned two-dimensional vector is processed by the encryption devices 110 and 112 used in the system shown in FIG. 30 is described by referring to the flowchart shown in FIG. 32.

The two-dimensional vector r is represented by $r = (x, y)$ using the components x and y of an orthogonal coordinate system. The rotating operation of the angle $\Omega_n = \theta$ for the vector is represented by a two-dimensional matrix as follows.

$$R_2(\theta) = \begin{pmatrix} \cos\theta & -\sin\theta \\ \sin\theta & \cos\theta \end{pmatrix} \quad (8)$$

Assuming that the function for a rotating operation of a vector using a function $\theta = p_1 x + p_2 y + p_3$ and an obtained rotation angle is stored in the multidimensional vector rotation function generation library 134 (refer to FIG. 31), and the initial value $x_0$, $y_0$ of $r_0$ and the value of P, that is, $p_{1=1}$, $p_{2=1}$, $p_3 = 1$, are stored in the parameter list generation library 132 in advance (refer to FIG. 31) as common keys, an example is described below by referring to FIG. 32.

To generate a two-dimensional vector, the initial value $r_0$ (including component data $x_0$, $y_0$) and the parameter $p_1$, $p_2$, $p_3$ of the function defining a rotation angle $\theta$ are read from the parameter list generation library 132 (refer to FIG. 31), and stored in the work area of the memory of the devices (110, 112) (step 21). Based on the value $x_0$, $y_0$ of $r_0$, the angle $\theta = p_1 * x_{j-1} + p_2 * y_{j-1} + p_3 (\theta = p_1 * x_0 * p_2 * y_0 + p_3)$ is computed, and the computation result is stored as the value $\theta$ (step 22).

Then, to determine the value of the element od the rotation matrix R, $\cos \theta$ and $\sin \theta$ are obtained, and are stored as cos_t and sin_t respectively (step 23).

Next, a new vector $r_j$ is computed by the equation $r_j = aR_2(\Omega_2) r_{j-1} + c$ (step 24). That is, the following computation is performed to generate a new vector $r_j$ (component $x_j$, $y_j$).

$$x_j = a*(\text{``cos\_t''}*x_{j-1} - \text{``sin\_t''}*y_{j-1}) + c\_x;$$

$$y_j = a*(\text{``sin\_t''}*x_{j-1} - \text{``cos\_t''}*y_{j-1}) + c\_y;$$

Then, the subsequent rotation angle E is obtained based on the components of the vector $r_j$ (step 22), and the above mentioned steps 23 and 24 are repeated, thereby sequentially generating vectors.

In the encryption/decryption system according to the present invention, since a trigonometric function is introduced using the rotation, and a product of the trigonometric functions are used, the nonlinearity is improved more than a normal chaos function, thereby furthermore complicating the decryption.

Described below is the process of encrypting data by generating a multidimensional vector.

Figure 33:
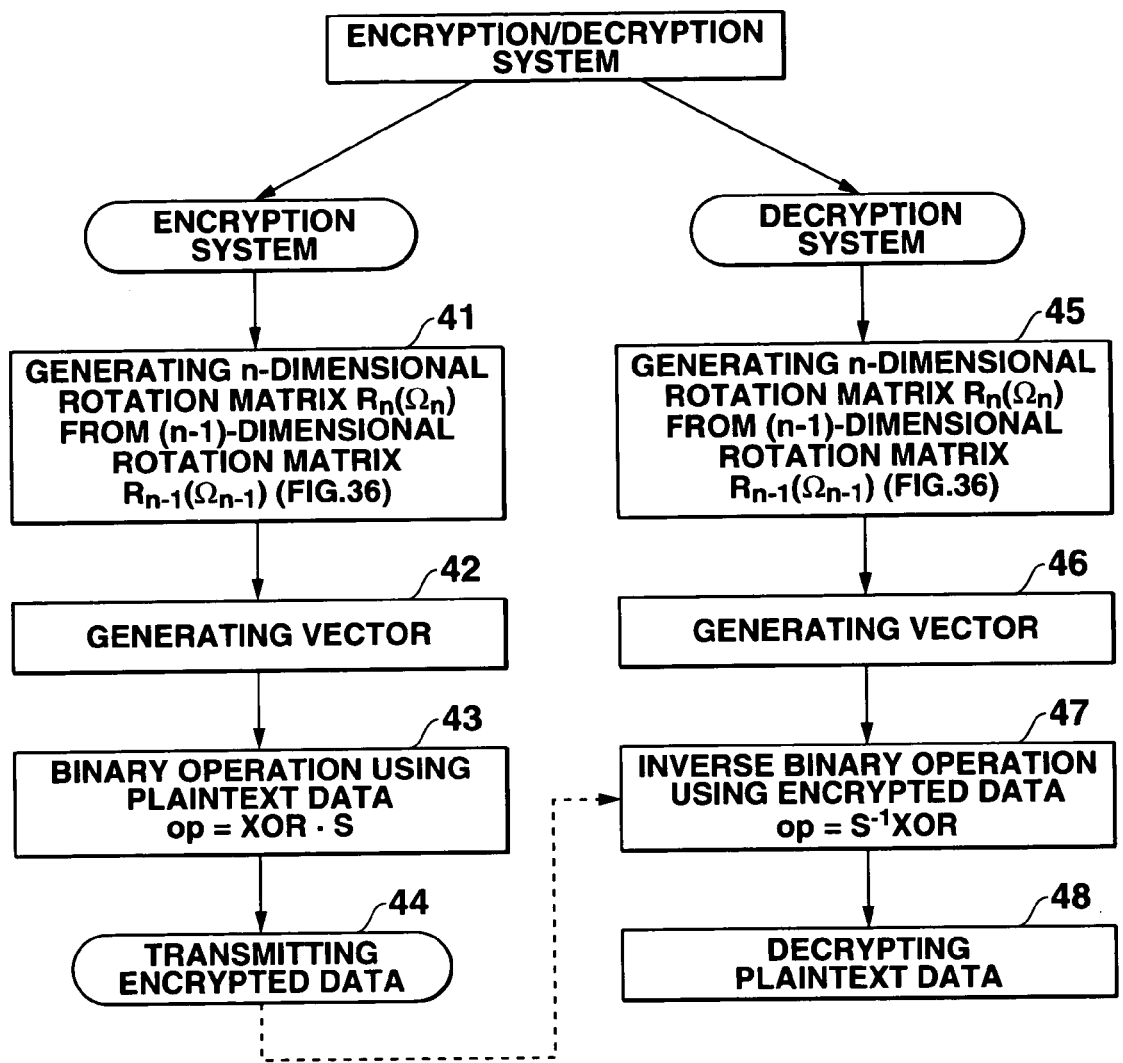
FIG. 33 is a flowchart of the encryption/decryption system using the process of generating a multidimensional vector.

As shown in FIG. 33, an n-dimensional rotation matrix $R_n(\Omega_n)$ is first generated in the encrypting process (step 41). The method of generating the matrix is described later in detail.

Then, a vector is generated using a nonlinear function containing the n-dimensional rotation matrix $R_n(\Omega_n)$ (step 42). The vectors $r_j$ are sequentially generated such that they cannot match each other in the n-dimensional space. A binary operation is performed using the plaintext data and the components of the vectors generated by the vector generation unit, thereby generating encrypted data (step 43). Then, the encrypted data is transmitted to the reception device of the receiver (step 44).

Described below is a binary operation in step 43.

Assume that each of the sequentially generated vectors r is represented by N bits. For example, when a two-dimensional vector is expressed by components x and y, each of the data values of the x and y is represented by 16 bits, the data of x and y is arranged in N bits (for example, 32 bits).

The vector string $r_j (j = 1, 2, 3, \dots)$ obtained in the procedure and the data string $M_j (j = 1, 2, 3, \dots)$ represented in N bit units by dividing plaintext data M to be encrypted are used as binary operators to obtain an exclusive logical sum (XOR), and the result $C_j (j = 1, 2, 3, \dots)$ is obtained as encrypted data. That is, the following computation is performed.

$$C_j = r_j \text{ op } M_j \quad (9)$$

The above mentioned binary operator op is normally an exclusive logical sum for each. However, since an exclusive logical sum is reversible, it is not desired to use it as an operator for encryption. To compensate for this demerit of the exclusive logical sum, it is recommended to introduce an operation of scrambling an exclusive logical sum with the bits of $M_j$ as binary operators. In this case, the following equation exists.

$$op = XOR * S \quad (10)$$

where S indicates a scrambling operation for scrambling the bits of $M_j$, and XOR indicates the definition as an operation of the subsequent exclusive logical sum. Then, encrypted data is obtained by $C_j = r_j \text{ op } M_j$.

The decrypting process is described below by referring to FIG. 33.

In the decrypting process, as in the encrypting process, a rotation matrix $R_n(\Omega_n)$ for rotation of a vector defined in a closed area of an $\Omega_n$ dimensional process is first generated (step 45). Vectors $r_j$ are sequentially generated such that each of the vectors generated using a nonlinear function containing the rotation matrix $R_n(\Omega_n)$ matches each other in the n-dimensional space (step 46).

Then, decrypted data is generated by performing an inverse binary operation corresponding to the inverse operation of the binary operation performed in step 43 using the received encrypted data and the components of the vector $r_j$ generated in the vector generating step 46 (steps 47 and 48).

Figure 34:
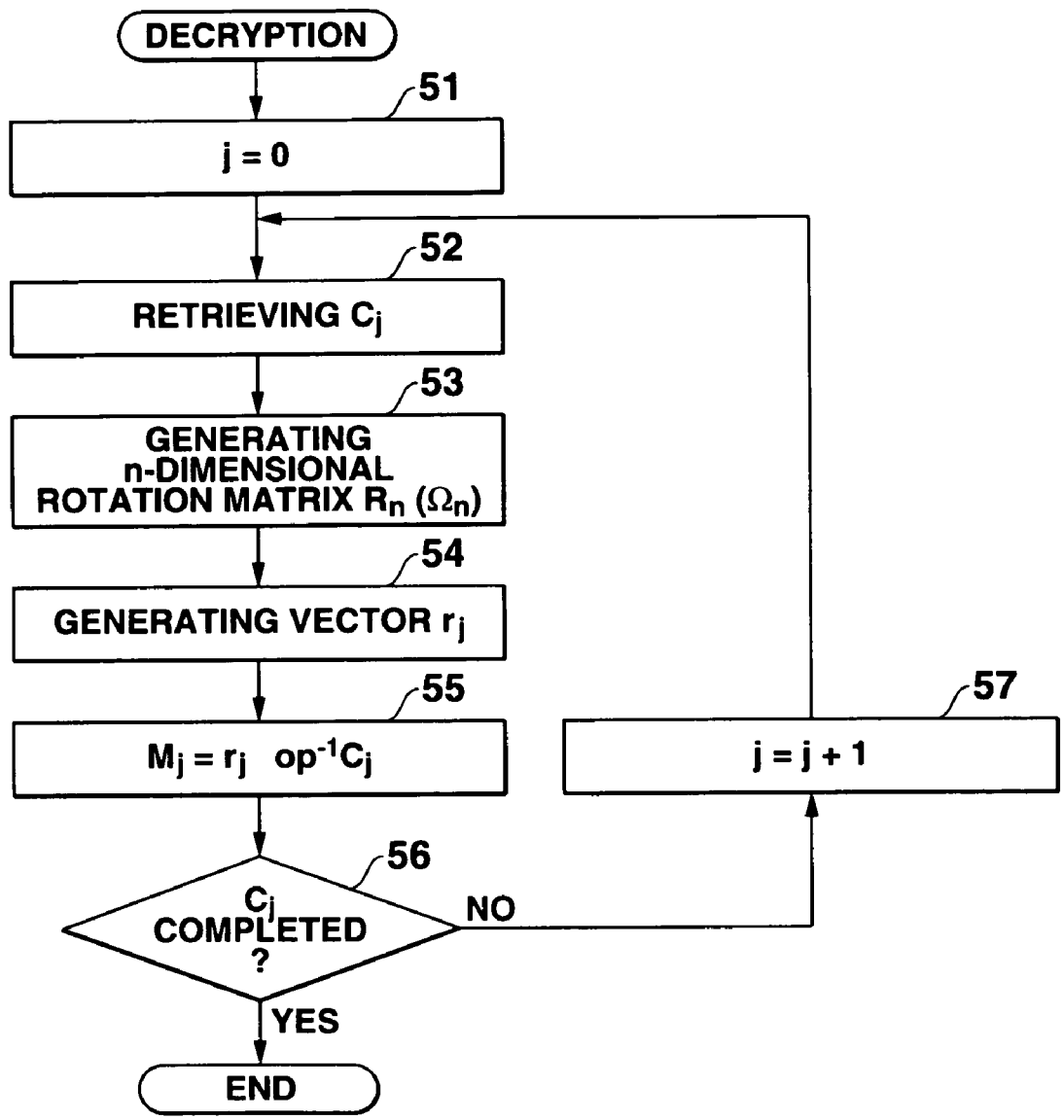
FIG. 34 is a flowchart of the decrypting process according to an embodiment of the present invention.

In this decrypting process, the received encrypted character strings $C_j$ (j=1, 2, 3, ...) are sequentially retrieved to perform a decrypting operation while generating a vector corresponding to $C_j$. This process is described below by referring to the flowchart shown in FIG. 34.

The decrypting process starts with j=0 (step 51), the encrypted data $C_j$ is retrieved (step 52), an n-dimensional rotation matrix $R_n(\Omega_n)$ is generated (step 53), and a vector $r_j$ is generated (step 54). Then, an operation is performed by $M_j = r_j \, op^{-1} \, C_j$ to yield decrypted data (plaintext $M_j$) (step 55). If the encrypted data C has not been completely processed, then the next encrypted data is retrieved with j=j+1 (steps 56 and 57) to generate $R_n(\Omega_n)$, and repeat the process of generating the subsequent vector $r_j$. The process of repeating steps 52 through 56 is performed until the encrypted data $C_j$ is completely processed.

Then, the above mentioned first encrypting and decrypting embodiment is extended into a more practical procedure of encrypting data, and is described below as the second embodiment.

First, the following equation is performed.

$$C_0 = r_0 \, op \, M_0 \tag{11}$$

Then, a check sum $\Sigma_0$ for $C_0$ is computed. Furthermore, the equation (9) above is rewritten into the following equation for j where $j \geq 1$.

$$C_j = (r_j \, op \, \Sigma_{j-1}) \, op \, M_j \tag{12}$$

The check sum is represented by, for example, the number of is contained in the computed value of C as a binary indicating the number of bits equal to the number of bits of $r_j$. In the equation, $\Sigma_0$ is obtained from the value of encrypted data $C_0$, $E_1$ is obtained from $C_1$, and $E_2$ is obtained from $C_2$ in the following computation order.

| plaintext | $M_0$ | $M_1$ | $M_2$ | $M_3$ | ... |
| (keystring) | $r_0$ | $r_1$ | $r_2$ | $r_3$ | ... |
| ciphertext | $C_0$ | $C_1$ | $C_2$ | $C_3$ | ... |
| | $\Sigma_0$ | $\Sigma_1$ | $\Sigma_2$ | $\Sigma_3$ | ... |

That is, the transmitter obtains $C_0$ by $C_0 = r_0 \, op \, M_0$ for the encrypted data $C_0$ for $M_0$, thereby obtaining the check sum $\Sigma_0$ of $C_0$. For the encrypted data $C_1$ for $M_1$, $C_1$ is computed by $C_1 = (r_1 \, op \, \Sigma_{j-1}) \, op \, M_1$, thereby obtaining the check sum $E_1$ of $C_1$. The subsequent data $M_j$ is encrypted by $C_j = (r_j \, op \, \Sigma_{j-1}) \, op \, M_j$ with $\Sigma_{j-1}$ obtained by the previous data taken into account. $r_j$ and $\Sigma_{j-1}$ are computed with the same data width (number of bits).

The receiver for decrypting the data receives $C_0$, $C_1$, $C_2$, ..., and computes $M_0 = r_0 \, op^{-1} C_0$, and has to obtain the check sum $\Sigma_0$ from the received $C_0$. Using this, $M_1$ is computed for $C_1$ by the following equation.

$$M_1 = (r_1 \, op \, \Sigma_0) \, op^{-1} C_1 \tag{13}$$

The subsequent data $M_j$ is decrypted by the following equation using the check sum $\Sigma_{j-1}$ obtained for the received $C_{j-1}$.

$$M_j = (r_j \, op \, \Sigma_{j-1}) \, op^{-1} C_j \tag{14}$$

The encrypted data obtained in the above mentioned procedure has been processed by different keys, it is assumed that the data is durable against an attempt to decrypt the data using an assumed key.

If the number of dimensions becomes large in a multidimensional space rotation system, the number of elements of a rotation matrix R also becomes large, thereby causing the problem that an operation load is large in an encrypting/decrypting process. To solve the problem, a method of computing a multidimensional space rotation matrix in an encryption system using a multidimensional space rotation system from a pseudo space rotation matrix having a smaller number of dimensions.

Described below is deriving a rotation matrix $R_n(\Omega_n)$ for the multidimensional space rotation.

The first method is to generate an n-dimensional rotation matrix $R_n(\Omega_n)$ from the (n−1)-dimensional rotation matrix $R_{n-1} (\Omega^{n-1})$. Since a method for a multidimensional space rotation is complicated, a two-dimensional space rotation is described below for simple explanation. A two-dimensional vector r is represented by the following equation using the components x and y of an orthogonal coordinate system.

$$r = (x, y)$$

The rotating operation of the angle $\Omega_n = \theta$ for the vector is represented as a two-dimensional matrix as follows.

$$R_2(\theta) = \begin{pmatrix} \cos\theta & -\sin\theta \\ \sin\theta & \cos\theta \end{pmatrix} \tag{16}$$

where the subscript of 2 on the left side indicates that the operation is defined in a two-dimensional space. The operation satisfies the conditions of the following equations.

$$|R_2(\theta)| = 1 \tag{17}$$

$$R_2(-\theta) = R_2(\theta)^{-1} \tag{18}$$

The equation (17) guarantees that the size of the vector of the rotation in the rotating operation remains constant, and the equation (18) indicates that there is an rotating operation to restore the vector of the rotation to the original state.

For extension to a three-dimensional rotation, the description on the right side of the equation (16) is simplified and formally represented as follows.

$$R_2(\theta) = \begin{pmatrix} \alpha_{11} & \alpha_{12} \\ \alpha_{21} & \alpha_{22} \end{pmatrix} \tag{19}$$

where $\alpha_{11} = \alpha_{22} = \cos\theta$ and $\alpha_{21} = -\alpha_{12} = \sin\theta$. In the case of a three-dimensional rotation, it is reasonable to start with the rotation using each of the three orthogonal axes as a rotation axis. It can be represented by any of the following three matrices.

$$R_{3,1}(\theta) = \begin{pmatrix} 1 & 0 & 0 \\ 0 & \alpha_{11} & \alpha_{12} \\ 0 & \alpha_{21} & \alpha_{22} \end{pmatrix} \tag{20-1}$$

$$R_{3,2}(\theta) = \begin{pmatrix} \alpha_{11} & 0 & \alpha_{12} \\ 0 & 1 & 0 \\ \alpha_{21} & 0 & \alpha_{22} \end{pmatrix} \tag{20-2}$$

$$R_{3,3}(\theta) = \begin{pmatrix} \alpha_{11} & \alpha_{12} & 0 \\ \alpha_{21} & \alpha_{22} & 0 \\ 0 & 0 & 1 \end{pmatrix} \quad (20\text{-}3)$$

Figures 37A, 37B, 37C:
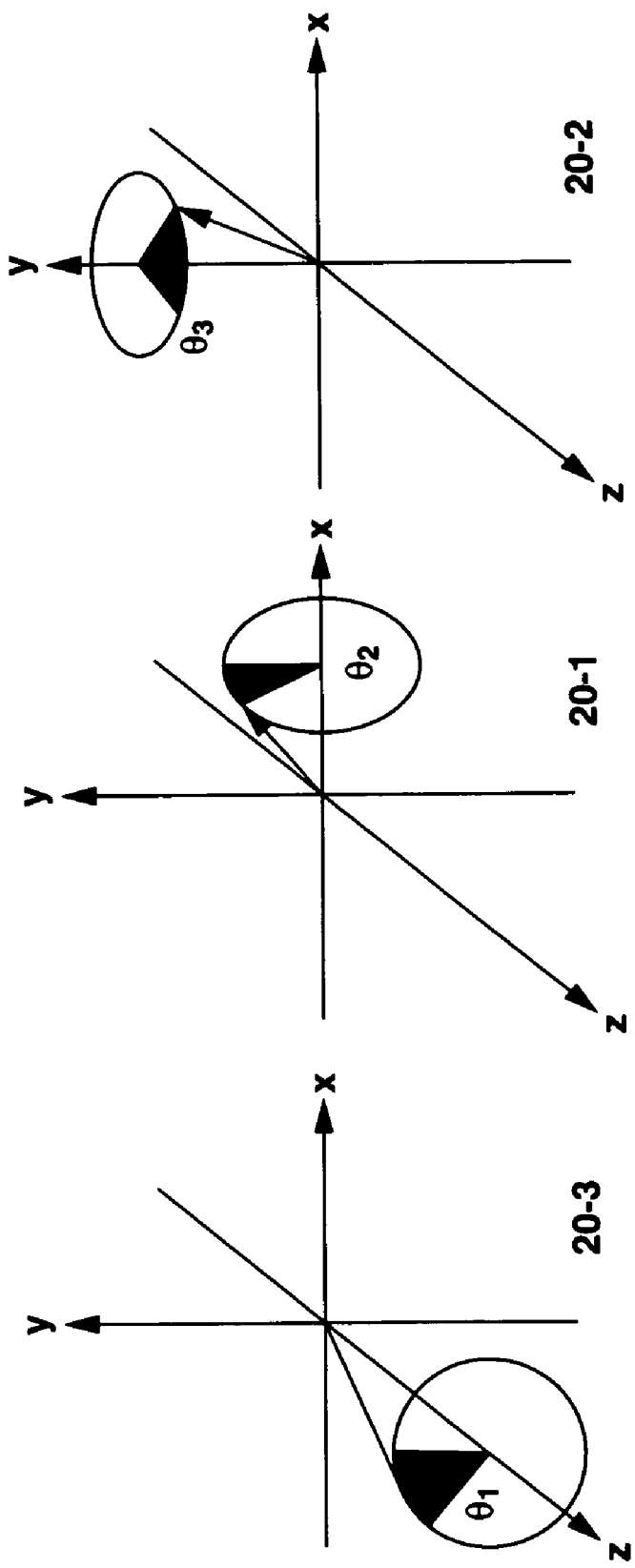
FIGS. 37A through 37C show the rotating operation of the three-dimensional vector according to an embodiment of the present invention.

Note that they can be obtained by adding 1 as a diagonal element in the two-dimensional space rotating operation provided by the equation (19). In addition, it is obvious that the rotation of the three-dimensional vector in the operation is shown in FIGS. 37A through 37C.

The above mentioned matrices (20-1), (20-2), and (20-3) are three-dimensional matrices including two-dimensional matrices indicating the rotating operation in a two-dimensional space. A generalized three-dimensional rotation is obtained by retrieving three matrices (which can be duplicate) from the above mentioned matrices, and sequentially multiplying one by each other. A generalized rotation angle in a three-dimensional space can be represented by the following equation.

$$\Omega_3 = (\theta_1, \theta_2, \theta_3)$$

where the rotating operation $R_3(\Omega_3)$ for a three-dimensional vector is represented by the following equation.

$$R_3(\Omega_3) = R_{3,i}(\theta_i) R_{3,j}(\theta_j) R_{3,k}(\theta_k) \quad (21)$$

where i, j, and k can be any of 1, 2, and 3, and can be normally duplicate on condition that the operation does not continue on the same axis. For example, i, j, and k can be 1, 2, and 1.

If an 'inverse rotation angle' is represented by $-\Omega_3 = (-\theta_1, -\theta_2, -\theta_3)$, then the inverse rotating operation of the rotating operation represented by the equation (21) can be represented by the following equation with the significance taken into account.

$$R_3(-\Omega_3) = R_{3,k}(-\theta_k) R_{3,j}(-\theta_j) R_{3,i}(-\theta_i) \quad (22)$$

The rotating operation defined by the equation (21) normally takes the following form.

$$R_3(\Omega_3) = \begin{pmatrix} \beta_{11} & \beta_{12} & \beta_{13} \\ \beta_{21} & \beta_{22} & \beta_{23} \\ \beta_{31} & \beta_{32} & \beta_{33} \end{pmatrix} \quad (23)$$

where matrix element is uniquely determined from the equations (16), (19), (20-1) through (20-3), and (21). For $R_3(\Omega_3)$, the following two features are satisfied.

$$|R_3(\Omega_3)| = 1 \quad (24)$$

$$R_3(-\Omega_3) = R_3(\Omega_3)^{-1} \quad (25)$$

Described below is the generation of a vector in an actual three-dimensional space.

In a three-dimensional space, a vector $r_j$ can be generated by storing the order of multiplication of rotation matrices. If a rotation angle is represented by $x_{j-1}=x$, $y_{j-1}=y$, $z_{j-1}=z$ for simple explanation of three-dimensional rotation, the following equations exist.

$$\theta_1 = p_{11}x + p_{12}y + p_{13}z + p_{14}$$

$$\theta_2 = p_{21}x + p_{22}y + p_{23}z + p_{24}$$

$$\theta_3 = p_{31}x + p_{32}y + p_{33}z + p_{34}$$

Figure 35:
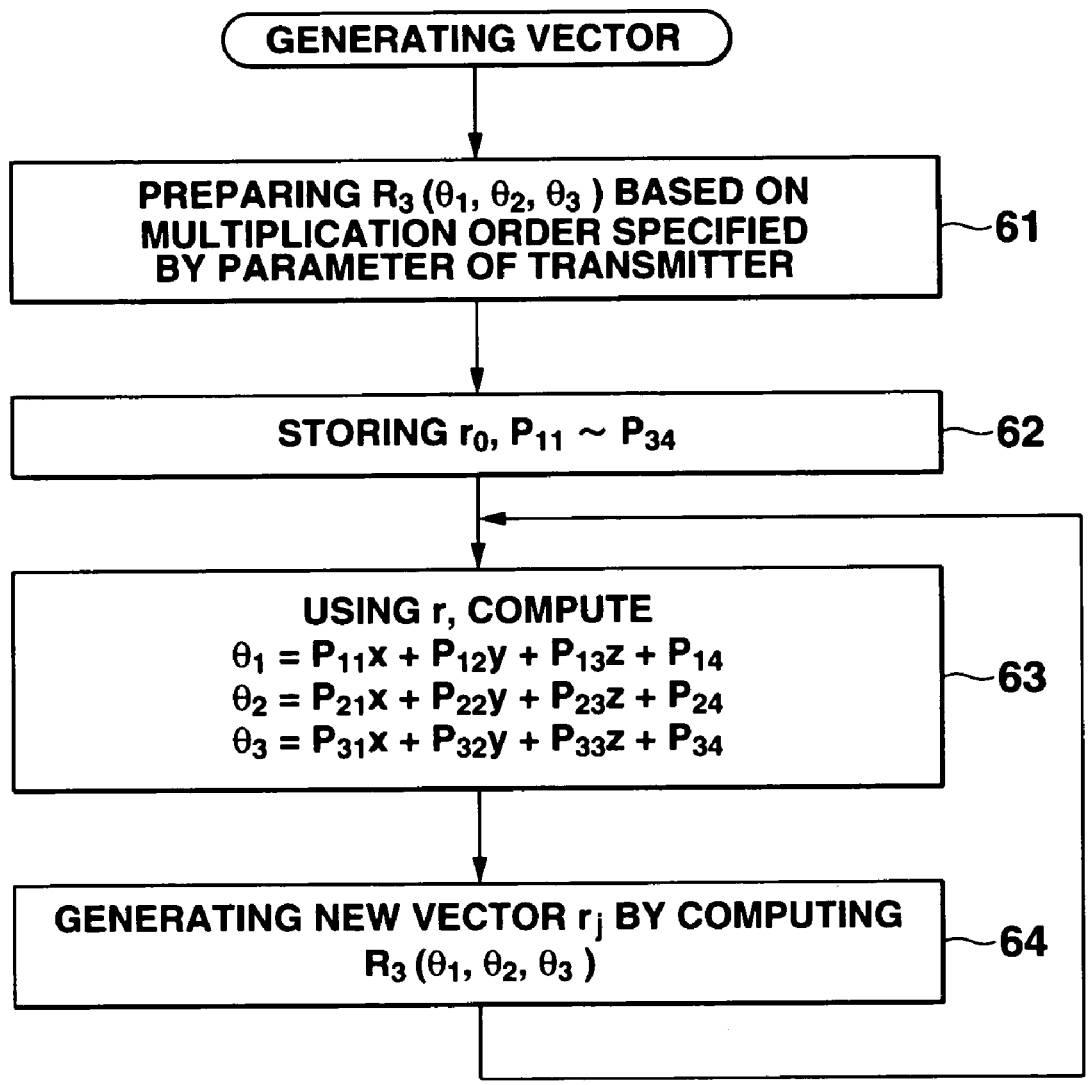
FIG. 35 is a flowchart of the process of generating a three-dimensional vector $r_j$ according to an embodiment of the present invention.

The three-dimensional rotating operation $R_3(\Omega_3)$ is represented by the multiplication of the following three rotation matrixes as shown by the equation (21) above in the method described later, that is, $$R_3(\Omega_3) = R_{3,i}(\theta_i) * R_{3,j}(\theta_j) * R_{3,k}(\theta_k)$$

where integers i, j, and k are any of 1, 2, and 3, and normally can be duplicate. That is, there are 3×2×2 (=12) methods of multiplication of $R_{3,1}(\theta_1)$, $R_{3,2}(\theta_2)$, $R_{3,3}(\theta_3)$, and the order of the multiplication depends on the parameter of the transmitter. In this encrypting process, the flow of the vector $r_j$ generating process in the three-dimensional space is shown in FIG. 35.

That is, $R_3(\Omega_3)$ is prepared based on the order of multiplication specified by the parameter of the transmitter (step 61). Then, the initial value $r_0$ of the vector, and the parameters $p_{11}$ through $p_{34}$ of the function for computation of the rotation angles $\theta_1$, $\theta_2$ and $\theta_3$ are stored (step 62). Then, using the components (x, y, z) of $r_0 (r_{j-1})$, the following operations are performed (step 63).

$$\theta_1 = p_{11}x + p_{12}y + p_{13}z + p_{14}$$

$$\theta_2 = p_{21}x + p_{22}y + p_{23}z + p_{24}$$

$$\theta_3 = p_{31}x + p_{32}y + p_{33}z + p_{34}$$

Then, $R_3(\Omega_3)$ is computed, and a new vector $r_j$ is generated by the equation (5). At this time, the order of multiplication is specified depending on the parameter of a transmitter as described above, for example, on the employee number, etc. of the transmitter. As for the rotation matrix $R_3(\Omega_3)$, the transmitter (and the receiver) does not compute the rotation matrix $R_3(\Omega_3)$ based on the order specified each time data is transmitted, but 12 functions are stored in advance, and any of the functions can be specified.

Described below is the method of applying the procedure of extending the above mentioned two-dimensional rotation to the three-dimensional rotation, and the three-dimensional rotation to the four-dimensional rotation.

In this case, four two-dimensional matrices, that is, $R_{4,i}(\Omega_3)$ (i=1, 2, 3, 4,), are obtained by adding 1 to the equation (23) as a diagonal element. That is, the following equations are obtained.

$$R_{4,1}(\Omega_3) = \begin{pmatrix} 1 & 0 & 0 & 0 \\ 0 & \beta_{11} & \beta_{12} & \beta_{13} \\ 0 & \beta_{21} & \beta_{22} & \beta_{23} \\ 0 & \beta_{31} & \beta_{32} & \beta_{33} \end{pmatrix} \quad (26\text{-}1)$$

$$R_{4,2}(\Omega_3) = \begin{pmatrix} \beta_{11} & 0 & \beta_{12} & \beta_{13} \\ 0 & 1 & 0 & 0 \\ \beta_{21} & 0 & \beta_{22} & \beta_{23} \\ \beta_{31} & 0 & \beta_{32} & \beta_{33} \end{pmatrix} \quad (26\text{-}2)$$

$$R_{4,3}(\Omega_3) = \begin{pmatrix} \beta_{11} & \beta_{12} & 0 & \beta_{13} \\ \beta_{21} & \beta_{22} & 0 & \beta_{23} \\ 0 & 0 & 1 & 0 \\ \beta_{31} & \beta_{32} & 0 & \beta_{33} \end{pmatrix} \quad (26\text{-}3)$$

$$R_{4,4}(\Omega_3) = \begin{pmatrix} \beta_{11} & \beta_{12} & \beta_{13} & 0 \\ \beta_{21} & \beta_{22} & \beta_{23} & 0 \\ \beta_{31} & \beta_{32} & \beta_{33} & 0 \\ 0 & 0 & 0 & 1 \end{pmatrix} \quad (26\text{-}4)$$

Furthermore, the rotating operation for the rotation angle $\Omega_4$ in a four-dimensional space is defined by the following equation.

$$R_4(\Omega_4)=R_{4,i}(\Omega_{3,i})R_{4,j}(\Omega_{3,j})R_{4,k}(\Omega_{3,k})R_{4,l}(\Omega_{3,l}) \quad (27)$$

$\Omega_{3,i}$ (i=1, 2, 3, 4) is another three-dimensional rotation angle $\Omega_3$ different from the angle defined above.

By repeating the definition, the rotating operation $R_n(\Omega_n)$ for the rotation angle $\Omega_n$ in the n-dimensional space can be normally represented by the following equation.

$$R_n(\Omega_n) = \prod_{i=1}^{n} R_{n,i}(\Omega_{n-1,i}) \quad (28)$$

It is easily confirmed that the obtained rotating operation satisfies the features of the equations (29) and (30) by taking the order of the product on the right side of the equation (28) into account.

$$|R_n(\Omega_n)|=1 \quad (29)$$

$$R_n(-\Omega_n)=R_n(\Omega_n)^{-1} \quad (30)$$

Figure 36:
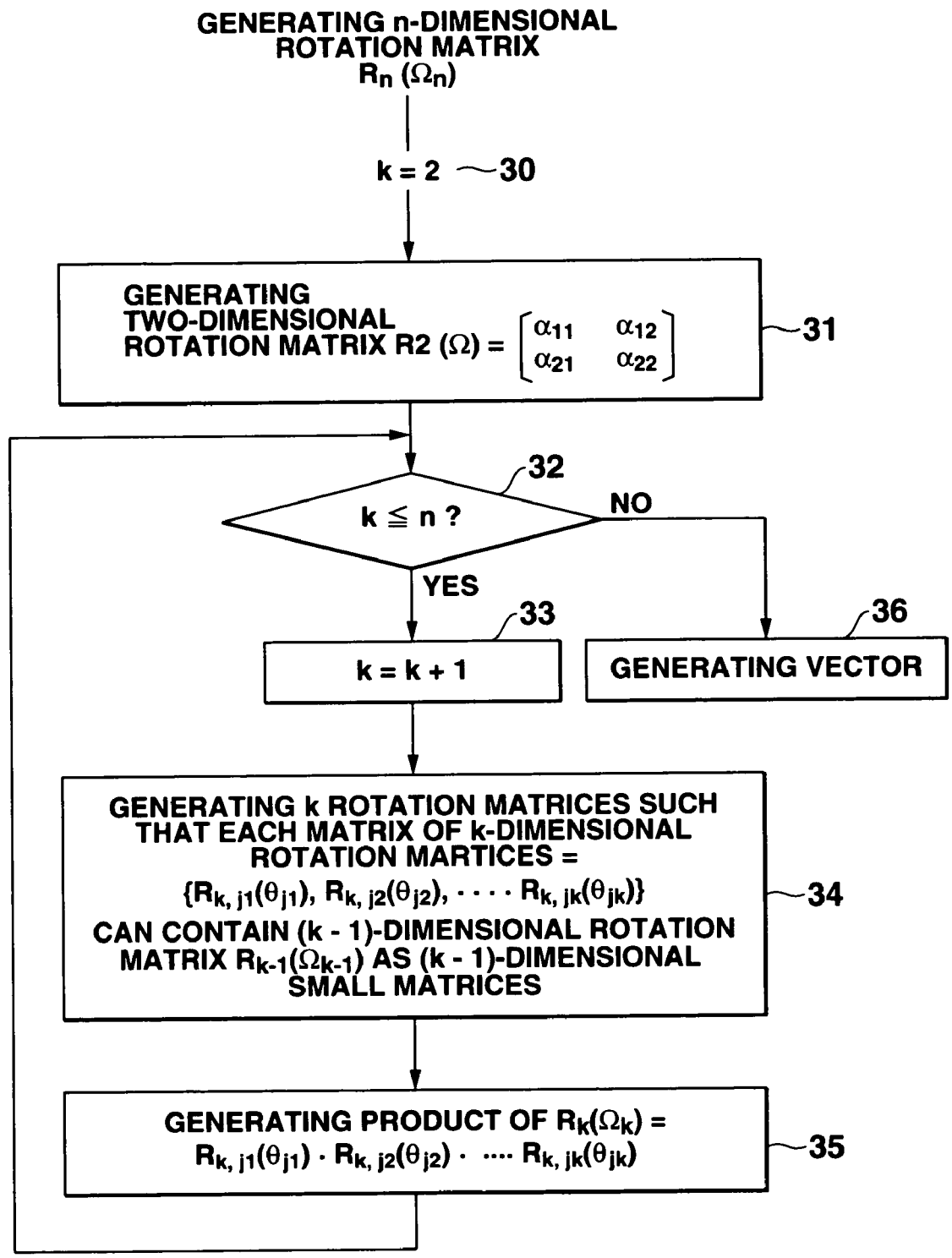
FIG. 36 is a flowchart of the process of generating an n-dimensional rotation matrix $R_n(\Omega_n)$ according to an embodiment of the present invention.

The n-dimensional rotation matrix $R_n(\Omega_n)$ can be generated by performing the processes according to the flowchart in FIG. 36.

That is, k=2 is first set (step 30), and the 2-dimensional rotation matrix $R_2(\Omega_2)$ is generated (step 31). Then, it is determined whether or not the value of k is smaller than n (step 32). If yes, the value of k is incremented by 1 (step 33), and the k-dimensional rotation matrix $R_k(\Omega_k)$ is generated such that it can include the (k−1)-dimensional rotation matrix $R_{k-1}(\Omega_{k-1})$ as a (k−1)-dimensional small matrix (step 34).

Then, a product of the k generated k-dimensional rotation matrix $R_{kj1}(\Omega_{j1})$, $R_{kj2}(\Omega_{j2})$, . . . , $R_{kjk}(\Omega_{jk})$ is obtained to obtain a rotation matrix $R_k(\Omega_k)$ (step 35). Then, by repeating the steps 34 and 35 from k=2 to k=n, the n-dimensional rotation matrix $R_n(\Omega_n)$ can be generated.

In the second method described below, a pseudo-rotation matrix is obtained by arranging a plurality of rotation matrices of smaller number of dimensions as diagonal blocks with remaining elements set to zero. The second method is described below in detail. For example, the elements of the rotation matrix R in a six-dimensional space are as shown by the following equation (37) indicating a large volume of computation.

$$R = \begin{pmatrix} R_{1,1} & R_{1,2} & R_{1,3} & R_{1,4} & R_{1,5} & R_{1,6} \\ R_{2,1} & R_{2,2} & R_{2,3} & R_{2,4} & R_{2,5} & R_{2,6} \\ R_{3,1} & R_{3,2} & R_{3,3} & R_{3,4} & R_{3,5} & R_{3,6} \\ R_{4,1} & R_{4,2} & R_{4,3} & R_{4,4} & R_{4,5} & R_{4,6} \\ R_{5,1} & R_{5,2} & R_{5,3} & R_{5,4} & R_{5,5} & R_{5,6} \\ R_{6,1} & R_{6,2} & R_{6,3} & R_{6,4} & R_{6,5} & R_{6,6} \end{pmatrix} \quad (37)$$

Then, the rotation matrix R is computed by replacing it with a pseudo-rotation matrix. The pseudo-rotation matrix Q is obtained by arranging a plurality of spatial rotation matrices of smaller number of dimensions as diagonal blocks with remaining elements set to zero. For example, in a six-dimensional space, a pseudo-rotation matrix Q as represented by the following equation (38) is used.

$$Q = \begin{pmatrix} A & 0 \\ 0 & B \end{pmatrix} = \begin{pmatrix} A_{1,1} & A_{1,2} & A_{1,3} & 0 & 0 & 0 \\ A_{2,1} & A_{2,2} & A_{2,3} & 0 & 0 & 0 \\ A_{3,1} & A_{3,2} & A_{3,3} & 0 & 0 & 0 \\ 0 & 0 & 0 & B_{1,1} & B_{1,2} & B_{1,3} \\ 0 & 0 & 0 & B_{2,1} & B_{2,2} & B_{2,3} \\ 0 & 0 & 0 & B_{3,1} & B_{3,2} & B_{3,3} \end{pmatrix} \quad (38)$$

where A and B are three-dimensional rotation matrices.

When the elements of the pseudo-rotation matrix Q are compared with the elements of the rotation matrix R, the Q contains more zero elements, thereby requiring smaller volume of computation. In addition, its encrypting function sufficiently works. Normally, a multidimensional spatial rotation matrix Q can be set as represented by the following equation (39).

$$Q = \begin{pmatrix} A_1 & 0 & \cdots & 0 \\ 0 & A_2 & \cdots & 0 \\ \vdots & \vdots & \vdots & \vdots \\ 0 & 0 & \cdots & A_i \end{pmatrix} \quad (39)$$

where A1, A2, . . . , Ai are multidimensional spatial rotation matrices.

Thus, the volume of computation can be considerably reduced and an encrypting process or a decrypting process can be quickly performed by replacing a rotation matrix in a multidimensional spatial rotation system with a pseudo-rotation matrix obtained by arranging a plurality of rotation matrices with smaller number of dimensions set as diagonal blocks with remaining elements set to zero.

In a further method, the value of P obtained in a similar transformation represented by the following equation (40) can be used as a new pseudo-spatial rotation matrix.

$$p=S*Q*S^T \quad (40)$$

In the equation (40), q is the above mentioned pseudo-rotation matrix, and S is a permutation matrix. As shown in the following equation (41), it is a square matrix with each row and column containing a 1 as an element.

$$S = \begin{pmatrix} 0 & 0 & 1 & 0 \\ 0 & 1 & 0 & 0 \\ 0 & 0 & 0 & 1 \\ 1 & 0 & 0 & 0 \end{pmatrix} \quad (41)$$

For example, when the pseudo-rotation matrix Q is represented by the equation (38) above (in a six-dimensional space), the pseudo-spatial rotation matrix P is represented by the following equation (42).

$$P = \begin{pmatrix} A_{1,1} & 0 & A_{1,2} & 0 & A_{1,3} & 0 \\ 0 & B_{1,1} & 0 & B_{1,2} & 0 & B_{1,3} \\ A_{2,1} & 0 & A_{2,2} & 0 & A_{2,3} & 0 \\ 0 & B_{2,1} & 0 & B_{2,2} & 0 & B_{2,3} \\ A_{3,1} & 0 & A_{3,2} & 0 & A_{3,3} & 0 \\ 0 & B_{3,1} & 0 & B_{3,2} & 0 & B_{3,3} \end{pmatrix} \quad (42)$$

A practical example is represented by the following equation (43).

$$S = \begin{pmatrix} 1 & 0 & 0 & 0 & 0 & 0 \\ 0 & 0 & 0 & 1 & 0 & 0 \\ 0 & 1 & 0 & 0 & 0 & 0 \\ 0 & 0 & 0 & 0 & 1 & 0 \\ 0 & 0 & 1 & 0 & 0 & 0 \\ 0 & 0 & 0 & 0 & 0 & 1 \end{pmatrix} \quad (43)$$

Thus, by replacing a rotation matrix in a multidimensional spatial rotation system with a pseudo-rotation matrix obtained by combining permutation matrices having a plurality of rotation matrices with smaller number of dimensions set as diagonal blocks with remaining elements set to zero, the computation process can be complicated, thereby making furthermore difficult decryption.

The feature of the present encryption system is that with an increasing number of spatial dimensions, encrypted data can be decrypted with the more difficulty, that a software process can be quickly performed, thereby requiring no special hardware for encrypting and decrypting processes, and that the privilege (authority) for hierarchy and decryption for personal use, group use, etc. can be minutely prescribed.

Therefore, the application of the present invention includes management of personal and private data, management of confidential mail, management of broadcast communications data, etc., and various other fields. In addition, since the present invention can improve the security of the data in the server of an Internet environment, a system administrator and an Internet service provider can make the most of the present invention.

Furthermore, according to the present invention, the parameter P and the constant vector c can be time dependent, and the P can be represented by the following equation.

$$P(t)=\{p_i(t)|i=1, 2, 3 \ldots\} \quad (31)$$

where the c can be set to c(t). Additionally, the initial value $r_0(t)$ can also be time dependent.

In an actual encrypting process, the initial value $r_0$ of the vector is substituted for $r_{j-1}(j=1)$ on the right side. The obtained new vector $r_1$ is substituted for the $r_{j-1}$ on the right side of the equation (5). By repeating the process, new vectors are sequentially generated. The time dependence represented by the equation (31) indicates that the same encrypted data cannot be obtained even if the same original data is encrypted at different times.

If a parameter set and functions are carefully set in the equation (6), the vectors $r_j$ sequentially generated by the equation (5) can be prevented from converging into a balanced solution.

It is said to be difficult to decrypt data encrypted in a chaos or random system if the key is secret. The encryption system according to the present invention inherits the above mentioned features. The feature of the present encryption system is, in addition to the desired features of the above mentioned conventional encryption system, to be able to freely amend (customize) the encrypting procedure for the following grounds.

1. The representation of the rotation matrix $R_n(\Omega_n)$ according to the equation can be optionally determined.

2. The function $\Omega_n(P, r_{j-1})$ on the right side of the equation (6) and the parameter P can be optionally set on condition that the function value is not dispersed.

3. Various 'initial values' can be optionally set.

4. The vector $r_j$ obtained by optionally repeating the operation of the equation (5) starting with the initial value of an optional vector can be set again as an initial value of the vector used in an encrypting/decrypting process.

5. When an operation with a floating point is performed, an operation result depends on a numeral operation processor and a compiler. Therefore, a decrypting process requires a decryption environment which is the same as an encryption environment.

The procedure according to the present embodiment can be performed using integers. In this case, a multidimensional space can be sectioned by a grid, and a vector indicated by coordinates of a discrete grid point changes by rotation and spatial translation.

The encrypting procedure in the multidimensional rotation vector system of the present encryption system includes a number of options. For example, a multidimensional vector rotating operation cannot be simply set, and a person trying to decrypt encrypted data (system) has to regenerate the system of a rotation generation unit, identify the function system prescribing a generalized multidimensional vector rotation angle, and correctly detect the parameter (key).

According to the present invention, there is the lowest possibility that the vector $r_j$ can be regenerated because there is a very large number of ways of setting nonlinear functions for obtaining a rotation angle $\Omega_n$ from the state of a rotation vector $r_{j-1}$ with a parameter P as a key, and determining the configuration of rotation matrices.

Since the present encryption system generates an n-dimensional rotation matrix from a rotation matrix having a dimension smaller than the n-dimensional rotation matrix, it applies to a sequential process. Furthermore, since a nonlinear function for sequential or chaotic generation of vectors through spatial translation and rotation of a n-dimensional vector defined in a closed area of an n-dimensional space using the n-dimensional rotation matrix is defined by a real number according to the present invention, an encrypting/decrypting process can be performed for optionally and digitally represented data. Therefore, the present invention can be utilized in various applications.

Described below is the application of the encryption/decryption system of the present invention to the above mentioned embodiments of the database management apparatus.

According to the present invention, a multidimensional spatial rotation system (multidimensional spatial vector system) is used as an encryption algorithm of a database. In the multidimensional spatial rotation system, sequential vectors are generated in a multidimensional space based on a predetermined function, and the components of the vectors are key streams for encryption. In the multidimensional spatial rotation system, computation can be performed by an information processing device even with low performance. Therefore, the system can be applied to a portable terminal. That is, in an environment in which a database according to the present invention is externally accessed, the encryption system is desired to process data with the security of the data successfully guaranteed. At this time, to encrypt the database according to the present embodiment, column keys are different from row keys. Therefore, the parameter of the predetermined function is determined using at least one of the column keys and the row keys, thereby generating a key stream for encryption. Thus, a key stream unique to each row and column can be generated.

As described above in detail, according to the database management apparatus of the present invention, data of column items used in a retrieving process is encrypted using a column key common among the column items while data of other column items is encrypted using a row key unique to each row when a database is encrypted. Therefore, the security can be improved by using different keys for respective rows. When a retrieving process is performed, the data input for retrieval is encrypted using a column key common among predetermined column items, and the encrypted retrieving data is compared with the encrypted database, thereby realizing a high-speed retrieving process.

What is claimed is:

1. A database management apparatus comprising:
   a database storage unit which stores a database comprising a plurality of records, each record including a plurality of data segments identified by item category titles that identify respective categories of the data segments;
   an item category title memory for storing at least one item category title for specifying a corresponding at least one data segment group as a target of a data search process;
   a key data memory for storing keys for use in encryption associated with the database, wherein the keys comprise a column key corresponding to the at least one data segment group specified by the at least one stored item category title, and a plurality of different row keys corresponding respectively to the records of the database;
   an encryption unit for encrypting: (i) the data segments of said at least one specified data segment group that is the target of the data search process using the column key corresponding to the at least one specified data segment group, and (ii) data segments of at least one data segment group corresponding to item category titles other than the stored item category title, in units corresponding to the records, using the different row keys of the respective records;
   a functional unit which encrypts a received data set comprising a search process condition using the corresponding column key; and
   a database search unit which performs the data search process by comparing the encrypted search process condition with the encrypted data segments of said at least one specified group;
   wherein the encryption unit sequentially generates vectors in a multidimensional space based on a set of predetermined functions, and the data segments are encrypted in accordance with an encryption method in which components of the sequentially generated vectors form a key stream of a key associated with the encryption method; and
   wherein the row keys and the column key specify constants of the functions.

2. A database system comprising a first information processor terminal storing a database, and a second information processor terminal which is connected to the first information processor terminal via a network and which is adapted to send a request to the first information processor terminal for conducting a search process in the database, wherein the first information processor terminal comprises:
   a functional unit which encrypts: (i) data segments forming data segment groups corresponding to column item category titles of a first kind using a same column key for said data segments forming the data segment groups, and (ii) data segments forming data segment groups corresponding to column item category titles of a second kind, in units of rows of data segments, using respective row keys, said item category titles identifying respective categories of the data segments;
   wherein the second information processor terminal comprises:
   a transmitting unit which transfers via the network an encrypted data set representing conditions to be used for the search process in the first information processor terminal, when the second information processor terminal requests the first information processor terminal to perform the search process on the database, said encrypted data set being formed by encrypting an input data set specifying the conditions of the search process by using the column key;
   wherein the first information processor terminal further comprises:
   a search performing unit that performs the search process on the encrypted database, based on the transmitted encrypted data set; and
   a returning unit that returns an encrypted result data set resulting from the search process, to the second information processing terminal via the network;
   wherein the functional unit sequentially generates vectors in a multidimensional space based on a set of predetermined functions, and the data segments are encrypted in accordance with an encryption method in which components of the sequentially generated vectors form a key stream of a key associated with the encryption method; and
   wherein the row keys and the column key specify constants of the functions.

3. A database management apparatus comprising:
   a key specification memory for storing data specifying a type of encryption system to be used to encrypt data segments of each column of a database, if the column of the database is to be encrypted;
   a first encryption unit that encrypts in accordance with the data stored in the key specification memory: (i) data segments forming data segment groups corresponding to column item category titles of a first kind using a same column key for said data segments forming the data segment groups, and (ii) data segments forming data segment groups corresponding to column item category titles of a second kind, in units of rows of the database, using row keys respectively specified for each of the rows, said item category titles identifying respective categories of the data segments;
   a second encryption unit that encrypts, using a basic key, all of the row keys used by the first encryption unit;
   a key data generating unit that generates the column key, the row keys and the basic key;
   a storing operation unit which stores in a memory the database after encryption by the first encryption unit and the row keys after encryption by the second encryption unit, in a mutually associated manner;
   wherein the row keys are each generated based on a number of the respective rows and a random number;
   wherein a vector generation unit sequentially generates vectors confined to a closed subspace of an n-dimensional space and defined by functions based on the keys; and
   wherein a logical operation unit performs a logical operation in units of a bit involving both the data segments of the database and components of the vectors generated by the vector generation unit, to encrypt the data segments.

4. A method for managing a database system including a first terminal unit for managing the database and a second terminal unit for searching the database independently of the first terminal unit, said method comprising:

encrypting the database by encrypting, on a first terminal side of the system: (i) data segments forming data segment groups corresponding to column item category titles of a first kind using a same column key for said data segments forming the data segment groups, (ii) data segments forming data segment groups corresponding to column item category titles of a second kind, in units of rows of the database, using row keys respectively specified for each of the rows, and (iii) all of the row keys, using another key, said item category titles identifying respective categories of the data segments;

storing, at the first terminal unit side of the system, the encrypted database on portable storage medium units for distribution; and searching the encrypted database stored on any of the distributed storage medium units, decrypting a data set obtained as a search result, and displaying the decrypted data set at a second terminal unit side of the system;

wherein the row keys are each generated based on a number of the respective rows and a random number;

wherein a vector generation unit sequentially generates vectors confined to a closed subspace of an n-dimensional space and defined by functions based on the keys; and wherein a logical operation unit performs a logical operation in units of a bit involving both the data segments of the database and components of the vectors generated by the vector generation unit, to encrypt the data segments.

5. The database management method according to claim 4, wherein each of the storage medium units stores both the encrypted database generated by the first terminal unit, and a predetermined application program for performing a searching process on the encrypted database.

6. A database management apparatus, comprising:

a database storage unit which stores a database comprising a plurality of records each record including a plurality of data segments identified by item category titles that identify respective categories of the data segments;

an item category title memory for storing at least one item category title for specifying a corresponding at least one data segment group as a target of a data search process;

a key data memory for storing keys for use in encryption associated with the database, wherein the keys comprise a column key corresponding to said at least one data segment group specified by the at least one stored item category title, and a plurality of different row keys corresponding respectively to the records of the database; and an encryption unit for encrypting: (i) the data segments of said at least one specified data segment group that is the target of the data search process using the column key corresponding to the at least one specified data segment group, and (ii) data segments of at least one data segment group corresponding to item category titles other than the at least one stored item category title, in units corresponding to the records, using the different row keys corresponding to the respective records and another column key that is assigned commonly to the data segment groups corresponding to item category titles other than the at least one stored item category title;

wherein the encryption unit sequentially generates vectors in a multidimensional space based on a set of predetermined functions, and the data segments are encrypted in accordance with an encryption method in which components of the sequentially generated vectors form a key stream of a key associated with the encryption method; and wherein the row keys and at least one of the column keys specify constants of the functions.

7. A computer program for directing a computer to execute functions comprising:

accessing a database comprising a plurality of records, each record including a plurality of data segments identified by item category titles that identify respective categories of the data segments;

storing at least one item category title for specifying a corresponding at least one data segment group as a target of a data search process;

storing keys for use in encryption associated with the database, wherein the keys comprise a column key corresponding to said at least one data segment group specified by the at least one stored item category title, and a plurality of different row keys corresponding respectively to the records of the database; and encrypting: (i) the data segments of said at least one specified data segment group that is the target of the data search process using the column key corresponding to the at least one specified data segment group, and (ii) data segments of at least one data segment group corresponding to item category titles other than the at least one stored item category title, in units corresponding to the records, using the different row keys of the respective records;

wherein vectors are sequentially generated in a multidimensional space based on a set of predetermined functions, and the data segments are encrypted in accordance with an encryption method in which components of the sequentially generated vectors form a key stream of a key associated with the encryption method; and wherein the row keys and the column key specify constants of the functions.

8. A computer program for directing a computer to execute functions comprising:

storing, in a key specification memory, data specifying a type of encryption system to be used to encrypt data segments of each column of a database, if the column of the database is to be encrypted;

first encrypting in accordance with the data stored in the key specification memory: (i) data segments forming data segment groups corresponding to column item category titles of a first kind using a same column key for said data segments forming the data segment groups, and (ii) data segments forming data segment groups corresponding to column item titles of a second kind, in units of rows of the database, using row keys respectively specified for each of the rows, said item category titles identifying respective categories of the data segments;

second encrypting, with a basic key, all the row keys; and storing in a memory the database after the encryption thereof and the row keys after the encryption thereof, in a mutually associated manner;

wherein the row keys are each generated based on a number of the respective rows and a random number;

wherein vectors are sequentially generated that are confined to a closed subspace of an n-dimensional space and defined by functions based on the keys; and wherein a logical operation is performed in units of a bit involving both the data segments of the database and components of the vectors to encrypt the data segments.

* * * * *